US010002509B2

(12) United States Patent
Savage, Jr. et al.

(10) Patent No.: US 10,002,509 B2
(45) Date of Patent: Jun. 19, 2018

(54) OPTIC FOR A STROBE NOTIFICATION APPLIANCE

(71) Applicant: Tyco Fire & Security GmbH, Neuhausen am Rheinfall (CH)

(72) Inventors: Kenneth Savage, Jr., Fitchburg, MA (US); Steven Varieur, Winchendon, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 101 days.

(21) Appl. No.: 14/514,071

(22) Filed: Oct. 14, 2014

(65) Prior Publication Data
US 2016/0035199 A1     Feb. 4, 2016

Related U.S. Application Data

(60) Provisional application No. 62/031,030, filed on Jul. 30, 2014.

(51) Int. Cl.
*F21V 7/04*     (2006.01)
*G08B 17/06*    (2006.01)
(Continued)

(52) U.S. Cl.
CPC .............. *G08B 17/06* (2013.01); *F21V 17/06* (2013.01); *F21V 17/10* (2013.01); *G08B 3/10* (2013.01);
(Continued)

(58) Field of Classification Search
CPC .. F21S 48/115; F21S 48/1154; F21S 48/1159; G08B 17/103; G08B 17/107; G08B 5/36; G08B 5/38
(Continued)

(56) References Cited

U.S. PATENT DOCUMENTS 5,521,578 A    5/1996  DelValle
5,914,665 A    6/1999  Thorp
(Continued)

FOREIGN PATENT DOCUMENTS

EP    2 711 615 A1    3/2014
GB    2506138 B       11/2014

OTHER PUBLICATIONS

International Search Report from corresponding International Application No. PCT/US2015/042018 dated May 4, 2016, 7 pages.
(Continued)

*Primary Examiner* — Anh Mai
*Assistant Examiner* — Matthew Peerce
(74) *Attorney, Agent, or Firm* — Foley & Lardner LLP

(57) ABSTRACT

A notification appliance is disclosed. The notification appliance may be a strobe notification appliance, such as an LED strobe notification appliance. The notification appliance may be wall-mounted or ceiling-mounted. Further, the notification appliance may include an optic that is configured to shape the light output from the notification appliance. For example, in a wall-mount, the optic may be mounted off-axis of a plane defined by a back plate of the notification appliance. Further, the notification appliance may be composed of a back plate, a driver board, and a front housing, with the front housing being attached to one or both of the back plate and the driver board. Moreover, the notification appliance may be used with an adapter bracket, which may be used to connect the notification appliance with one or more types of junction boxes.

13 Claims, 60 Drawing Sheets

(51) Int. Cl.
*G08B 17/00* (2006.01)
*G08B 5/38* (2006.01)
*G08B 7/06* (2006.01)
*F21V 17/06* (2006.01)
*F21V 17/10* (2006.01)
*G08B 5/36* (2006.01)
*G08B 3/10* (2006.01)
*G08B 17/113* (2006.01)
*H04R 1/02* (2006.01)
*F21W 111/00* (2006.01)
*F21S 8/00* (2006.01)
*F21V 5/08* (2006.01)
*F21V 5/04* (2006.01)
*H04R 5/02* (2006.01)
*G02B 6/42* (2006.01)
*H02G 3/10* (2006.01)
*F21Y 115/10* (2016.01)
*H04S 7/00* (2006.01)
*G08B 25/04* (2006.01)

(52) U.S. Cl.
CPC ............... *G08B 5/36* (2013.01); *G08B 5/38* (2013.01); *G08B 7/06* (2013.01); *G08B 17/00* (2013.01); *G08B 17/113* (2013.01); *H04R 1/02* (2013.01); *H04R 1/025* (2013.01); *H04R 1/028* (2013.01); *F21S 8/033* (2013.01); *F21V 5/041* (2013.01); *F21V 5/08* (2013.01); *F21W 2111/00* (2013.01); *F21Y 2115/10* (2016.08); *G02B 6/428* (2013.01); *G08B 25/04* (2013.01); *H02G 3/10* (2013.01); *H04R 5/02* (2013.01); *H04S 7/00* (2013.01); *H04S 2420/01* (2013.01)

(58) Field of Classification Search
USPC ........................................ 362/516, 555, 551
See application file for complete search history.

(56) References Cited

U.S. PATENT DOCUMENTS

| | | | |
|---|---|---|---|
| 6,133,843 A | 10/2000 | Davidson | |
| 6,238,076 B1* | 5/2001 | Pascale | G02B 5/021 362/276 |
| 6,452,096 B1 | 9/2002 | Childers | |
| 6,838,997 B1 | 1/2005 | Davidson | |
| 6,951,418 B2* | 10/2005 | Rizkin | F21V 5/046 362/153.1 |
| 7,102,079 B1 | 9/2006 | Kurtin | |
| 7,950,832 B2* | 5/2011 | Tanaka | F21V 5/04 362/311.02 |
| 8,723,682 B2 | 5/2014 | Savage, Jr. | |
| 8,760,301 B2 | 6/2014 | Savage, Jr. | |
| 8,773,276 B2 | 7/2014 | Savage, Jr. | |
| 8,796,931 B2 | 8/2014 | Savage, Jr. | |
| 8,890,707 B2 | 11/2014 | Savage, Jr. | |
| 8,890,708 B2 | 11/2014 | Savage, Jr. | |
| 9,035,786 B2 | 5/2015 | Clifford | |
| 2002/0105432 A1 | 8/2002 | Pederson | |
| 2003/0025607 A1 | 2/2003 | Povey | |
| 2005/0007257 A1 | 1/2005 | Rast | |
| 2005/0152128 A1 | 7/2005 | Campman | |
| 2006/0132323 A1 | 6/2006 | Grady | |
| 2007/0206375 A1 | 9/2007 | Piepgras | |
| 2008/0084326 A1 | 4/2008 | Hur | |
| 2008/0093530 A1* | 4/2008 | Hoelen | F21K 9/00 250/201.1 |
| 2009/0034283 A1* | 2/2009 | Albright | F21S 48/215 362/545 |
| 2010/0090857 A1 | 4/2010 | Varieur | |
| 2010/0302786 A1* | 12/2010 | Wilcox | F21V 5/008 362/327 |
| 2011/0012746 A1 | 1/2011 | Fish | |
| 2012/0113642 A1* | 5/2012 | Catalano | F21S 8/02 362/249.02 |
| 2014/0140038 A1* | 5/2014 | Gerets | G03B 21/16 362/84 |
| 2016/0010822 A1* | 1/2016 | Hsu | F21S 48/1154 362/520 |

OTHER PUBLICATIONS

Written Opinion of the International Searching Authority from corresponding International Application No. PCT/US2015/042018 dated May 4, 2016, 9 pages.

Invitation to Pay Additional Fees corresponding to International Patent Application No. PCT/US2015/042018 dated Feb. 24, 2016, 4 pages.

Annex to Form PCT/ISA/206 Communication Relating to the Results of the Partial International Search corresponding to International Patent Application No. PCT/US2015/042018 dated Feb. 24, 2016, 3 pages.

Office Action dated Feb. 15, 2018 in EP Application No. 15750185.9.

* cited by examiner

Required minimum percentage for horizontal dispersion

| Degrees[a] | Percent of rating |
|---|---|
| 0 | 100 |
| 5 – 25 | 90 |
| 30 – 45 | 75 |
| 50 | 55 |
| 55 | 45 |
| 60 | 40 |
| 65 | 35 |
| 70 | 35 |
| 75 | 30 |
| 80 | 30 |
| 85 | 25 |
| 90 | 25 |
| Compound 45 to the right | 24 |
| Compound 45 to the left | 24 |

[a] Tolerance of ±1 degree is permitted

*Fig. 4A*

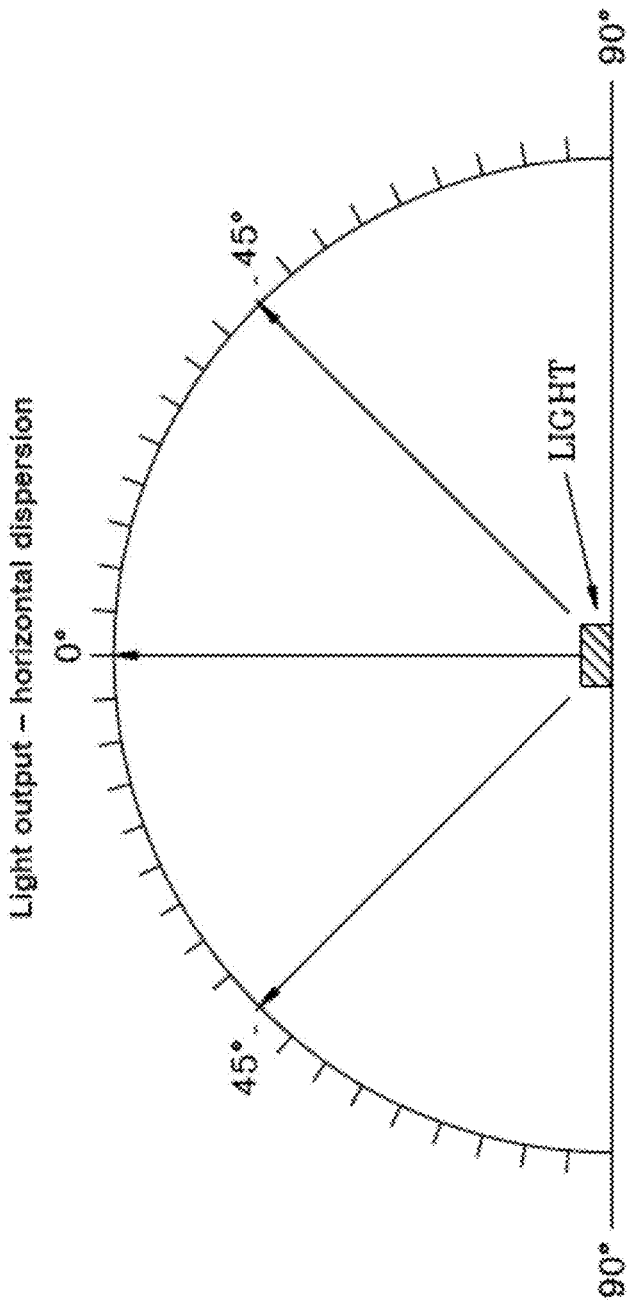

Required minimum percentage for vertical dispersion

| Degrees* | Percent of rating |
|---|---|
| 0 | 100 |
| 5 – 30 | 90 |
| 35 | 65 |
| 40 | 46 |
| 45 | 34 |
| 50 | 27 |
| 55 | 22 |
| 60 | 18 |
| 65 | 16 |
| 70 | 15 |
| 75 | 13 |
| 80 | 12 |
| 85 | 12 |
| 90 | 12 |

* Tolerance of ±1 degree is permitted.

*Fig. 4C*

Required minimum percentage for vertical dispersion in both X and Y planes

| Degrees* | Percent of rating |
|---|---|
| 0 | 100 |
| 5 – 25 | 90 |
| 30 – 45 | 75 |
| 50 | 55 |
| 55 | 45 |
| 60 | 40 |
| 65 | 35 |
| 70 | 30 |
| 75 | 30 |
| 80 | 30 |
| 85 | 25 |
| 90 | 25 |

* Tolerance of ±1 degree is permitted.

*Fig. 5A*

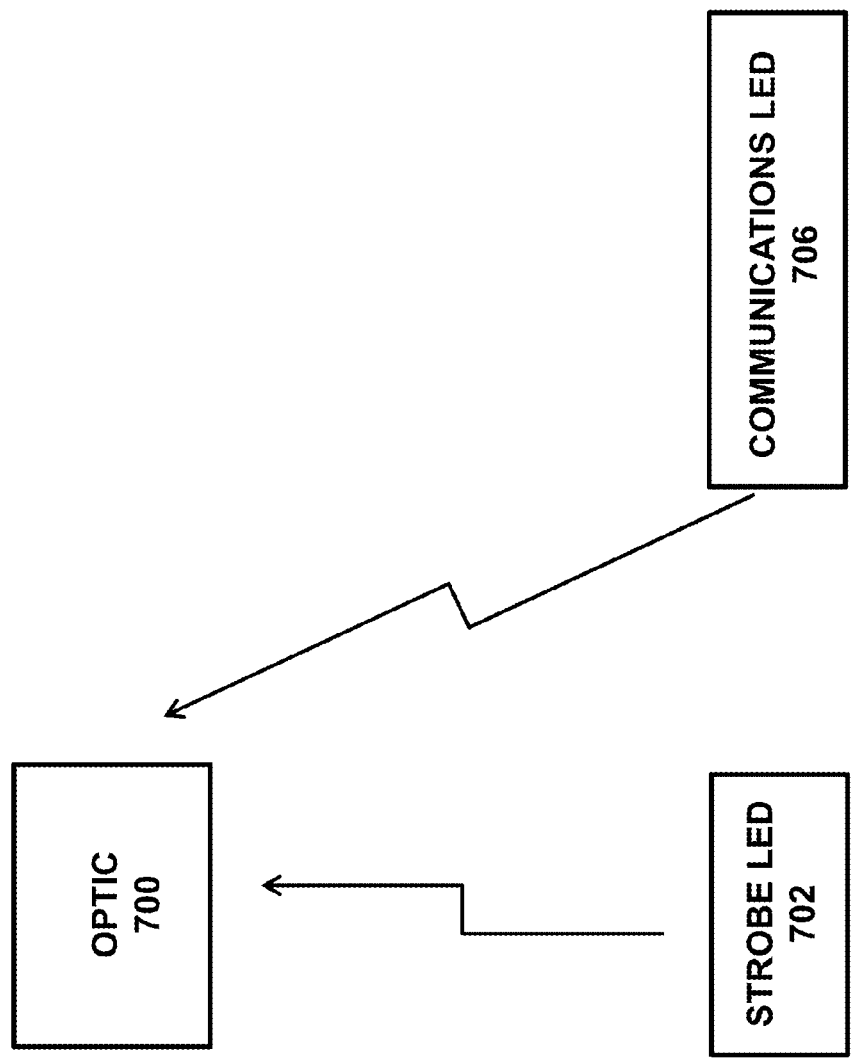

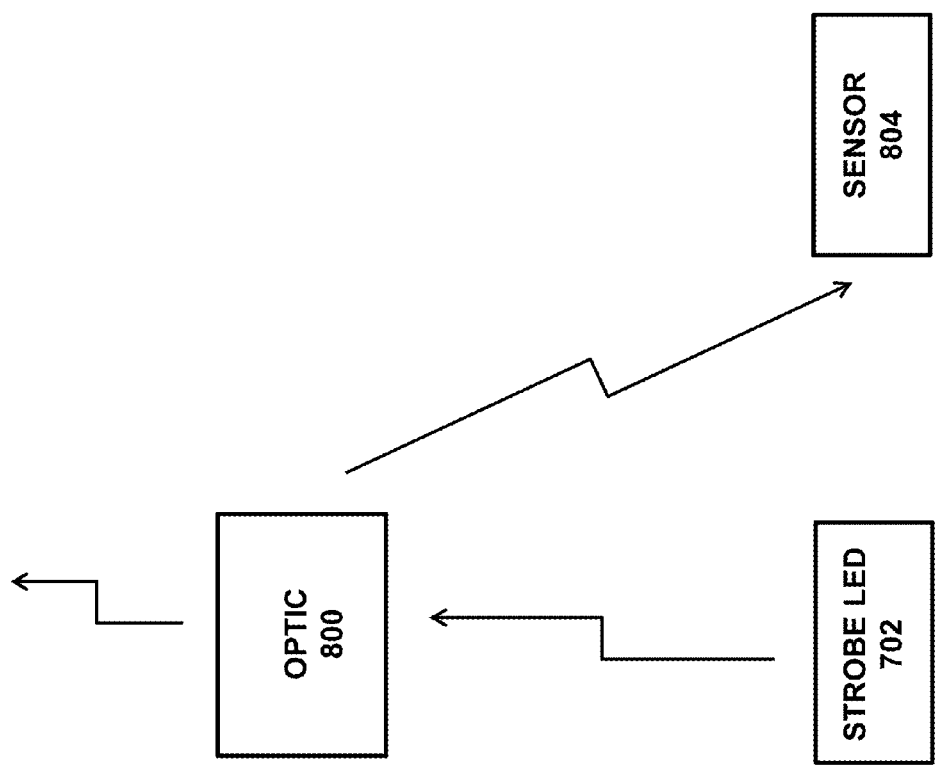

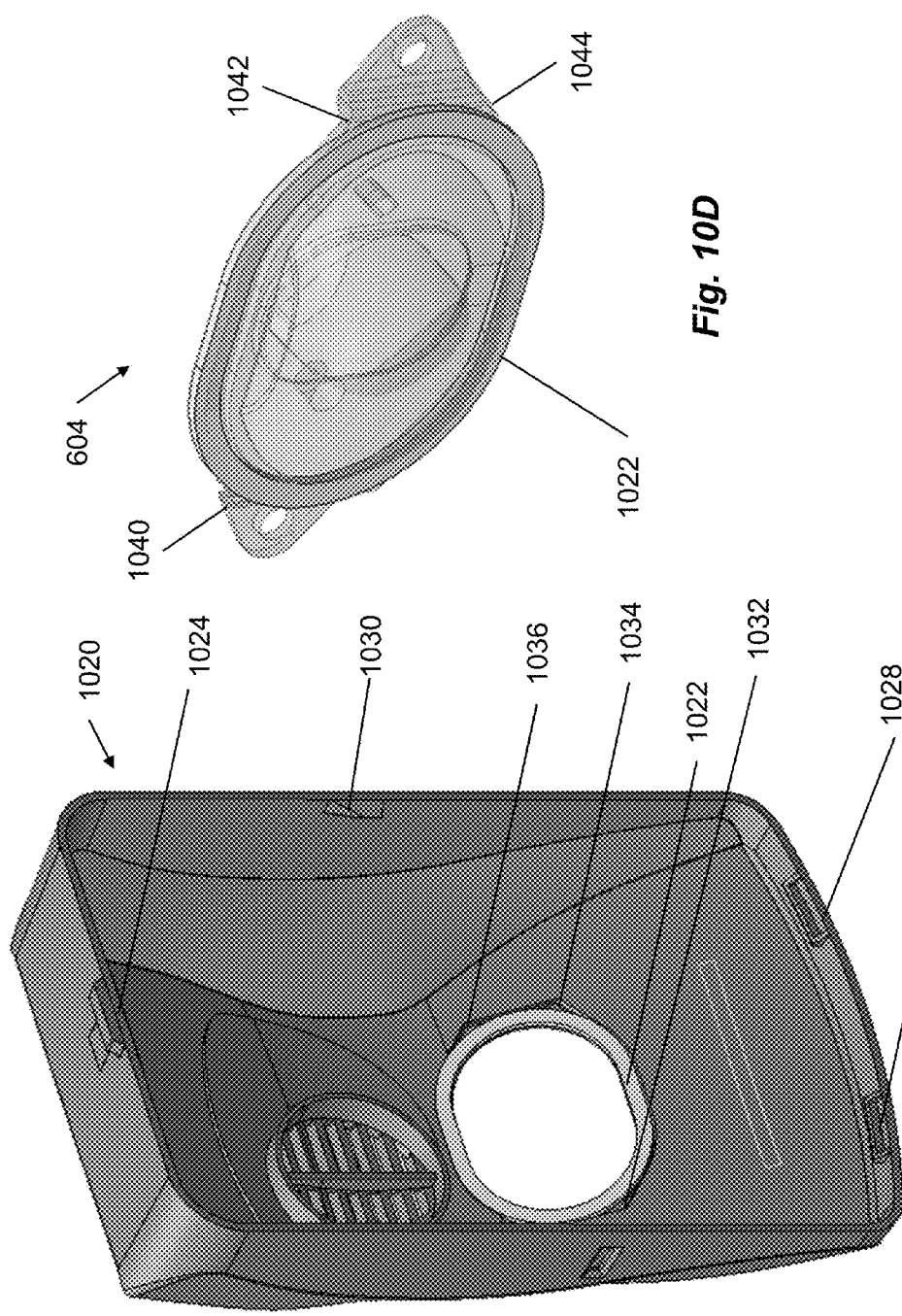

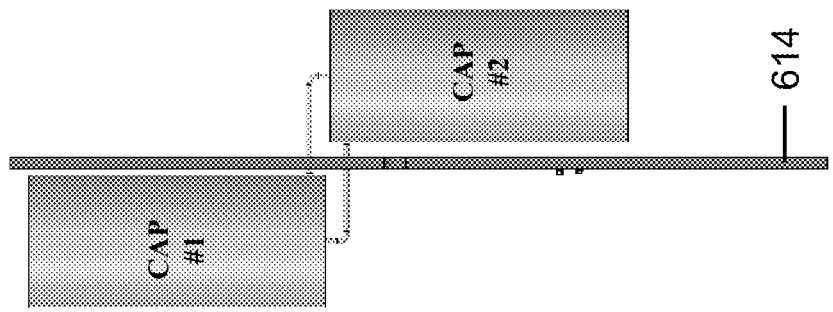

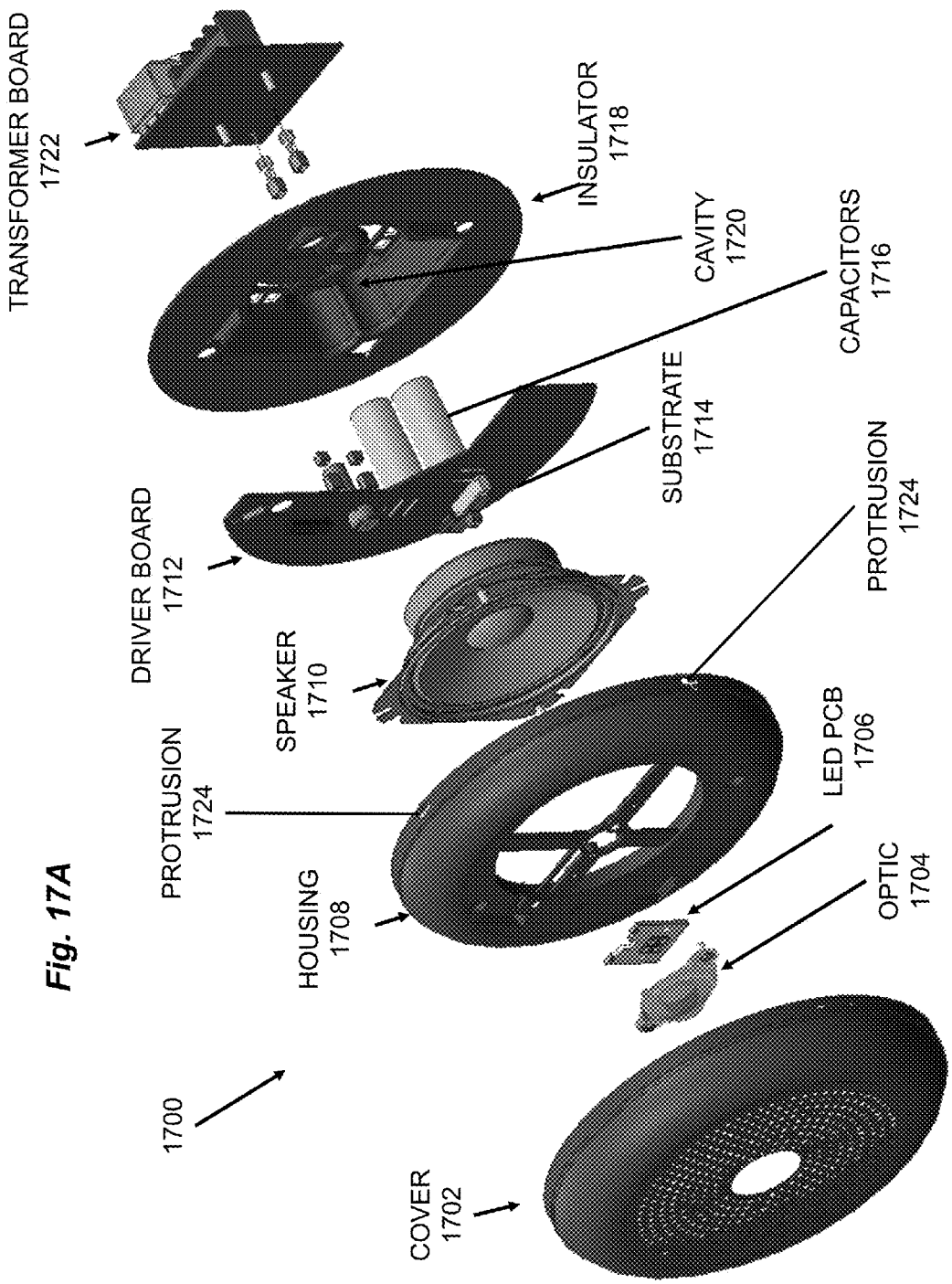

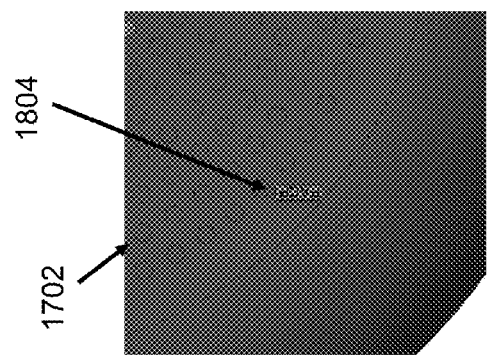
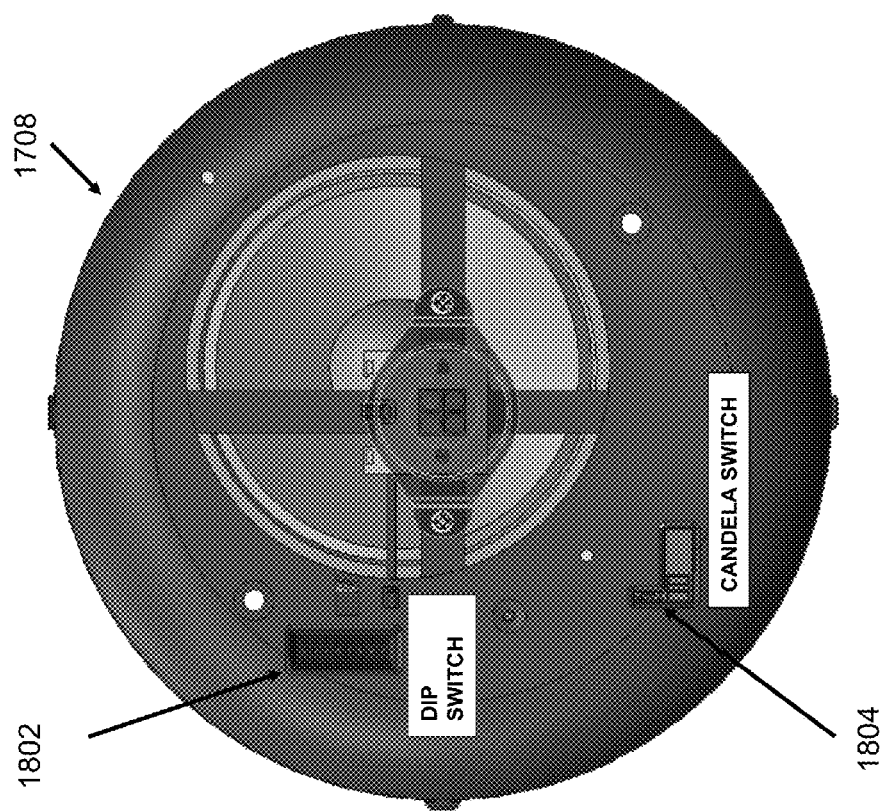
Fig. 18B
Fig. 18A

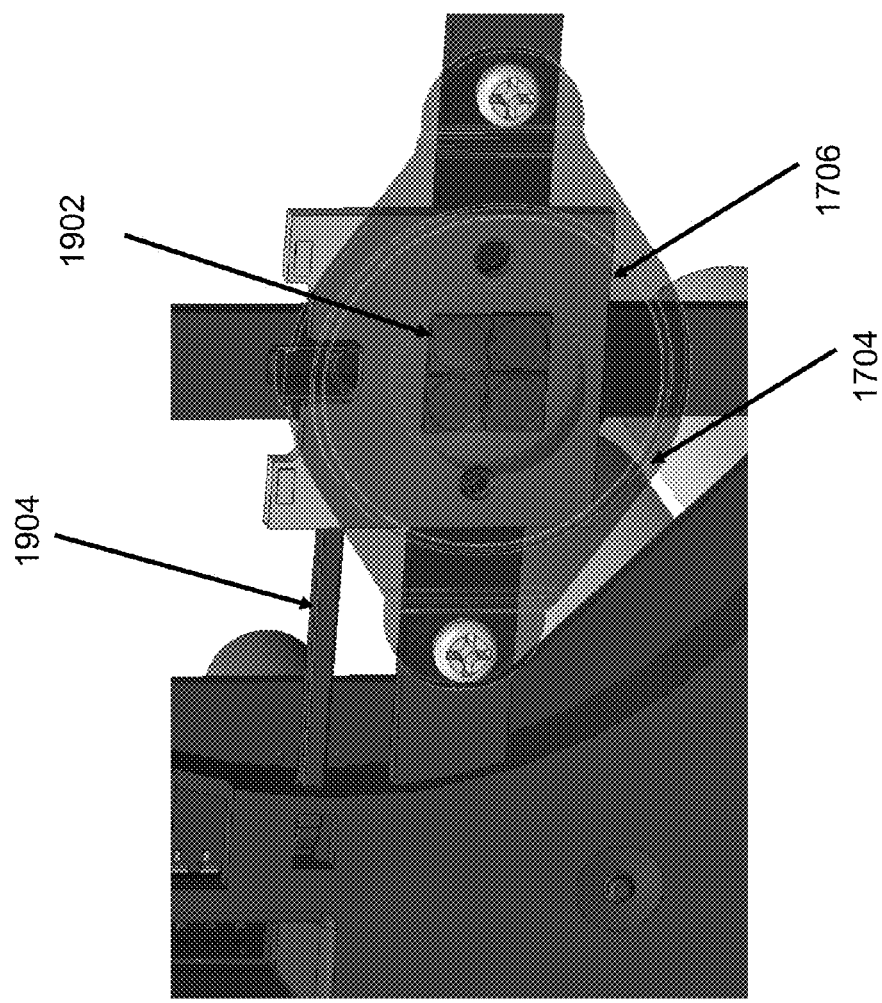
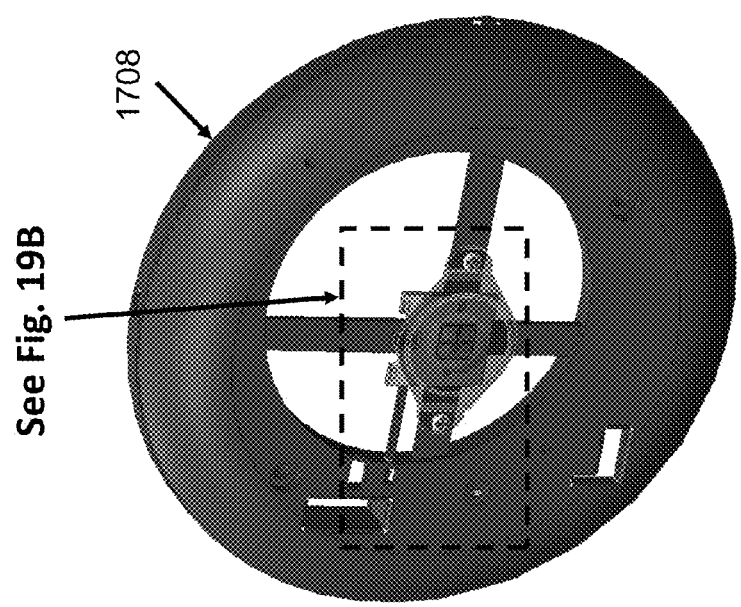
Fig. 19B
Fig. 19A

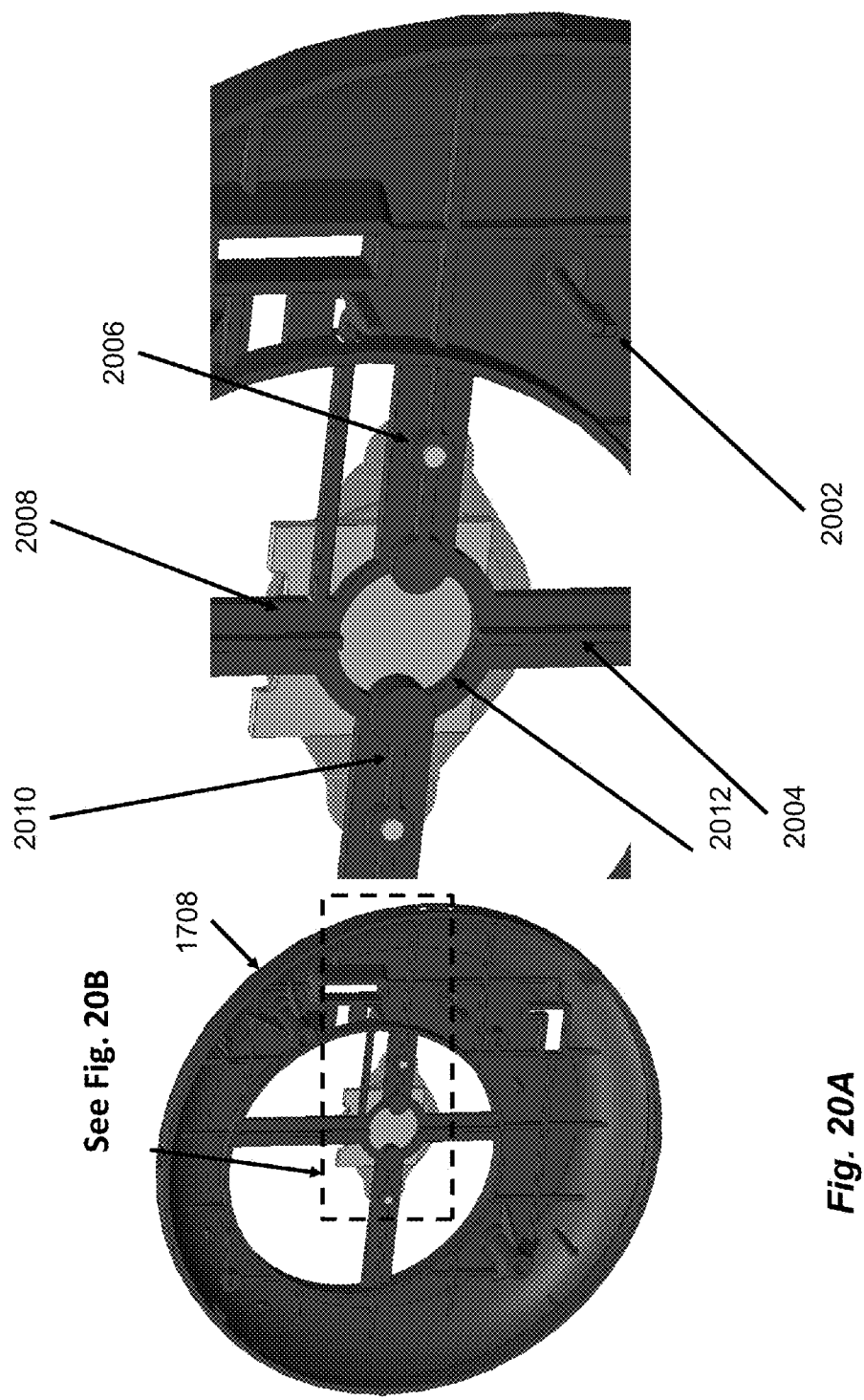

OPTIC FOR A STROBE NOTIFICATION APPLIANCE

REFERENCE TO RELATED APPLICATION

This application claims the benefit of U.S. Provisional Application No. 62/031,030, filed on Jul. 30, 2014, the entirety of which is incorporated by reference herein.

TECHNICAL FIELD

This application generally relates to notification appliances for a fire alarm system, and more specifically to an LED strobe notification appliance in a fire alarm system.

BACKGROUND

Fire alarm devices such as audible horns (audible/visible or A/V), loudspeakers (speaker/visible or S/V) and visible strobes (visible only or V/O), are referred to as "notification appliances." Typically, a fire alarm control panel (FACP) drives these devices over one or more "notification appliance circuits" (NACs). The strobes are used, for example, as an alert for the hearing-impaired, or for those in a high noise environment.

One type of strobe uses a flash tube (also called a flash lamp). Typically, the flash tube is an electric glow discharge lamp designed to produce extremely intense, incoherent, full-spectrum white light for very short durations. Flash tubes are made of a length of glass tubing with electrodes at either end and are filled with a gas that, when triggered, ionizes and conducts a high voltage pulse to produce the light. Xenon is an example of the gas that can fill the flash tube, with a Xenon flash tube producing a high-intensity light (such as hundreds of thousands of lumens) for a very short duration pulse (such as hundreds of milliseconds). Xenon flash tubes use a high voltage storage element, such as an electrolytic capacitor, that can be charged several hundred volts to provide energy for the flash. Xenon flash tubes also use a trigger voltage that is in the several thousand volt range to start the gas discharge.

The lifetime of the flash tube can depend on both the energy level used for the lamp in proportion to its discharge energy, and on the pulse duration of the lamp. Failures can be catastrophic or can be gradual, reducing the performance of the lamp below a usable rating.

Another type of strobe is Light Emitting Diode (LED)-based. An LED-based strobe includes an LED that is high power, and greater than typical display LEDs. However, even with a high power LED, the LED-based strobe cannot generate light at as high of an intensity as a Xenon-based strobe. Instead, LED-based strobes generate a lower intensity light (such as hundreds of lumens) for a longer period of time (such as tens to hundreds of milliseconds). In this way, the LED-based strobes can generate a comparable amount of light energy, as measured in candela, as a Xenon-based strobe. In contrast to flash-tube based strobes, LED-based strobes typically have a longer usable lifetime.

SUMMARY

An optic for a notification appliance is disclosed. In one aspect, the optic is for mounting proximate to an LED board in an LED notification appliance. The optic includes: a shaped inner surface; a shaped outer surface; and one or more locating structures configured to locate the optic relative to the LED board, wherein the one or more locating structures are additionally configured to guide light to and/or from the LED board.

In another aspect, the optic is for mounting proximate to an LED board in an LED notification appliance configured for wall mounting. The optic includes: a connector configured to mount the optic to the LED notification appliance such that the optic is off-axis of a plane defined by a back plate of the LED notification appliance; a shaped inner surface; and a shaped outer surface, wherein a top of the shaped outer surface is substantially flat in order to reduce light being directed toward a ceiling.

In still another aspect, the optic is for mounting proximate to an LED board in an LED notification appliance configured for wall mounting. The optic includes: a shaped inner surface; a shaped outer surface; a racetrack encircling at least a part of the shaped outer surface; and a flange encircling at least a part of the racetrack, wherein, when the optic is installed in a notification appliance, the notification appliance including an escutcheon, the flange is configured to touch an underside of the escutcheon and the racetrack is configured to be flush with at least a part of an upperside of the escutcheon Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

FIGS. 4A-D illustrate various requirements for wall mounted strobe devices.

FIGS. 5A-B illustrate various requirements for ceiling mounted strobe devices.

FIG. 7A illustrates one example block diagram of an optic and multiple light generating devices, such as strobe LED and communications LED.

FIG. 8A illustrates one example block diagram of an optic, strobe LED and sensor.

FIG. 10C illustrates an underside of the escutcheon with a gasket.

FIG. 10D illustrates the sealing of the gasket on the escutcheon with the flange of the optic.

FIG. 14A illustrates a side view of the LED PCB.

FIG. 17A illustrates an exploded view of one example of a notification device configured for ceiling mount.

FIG. 18A illustrates a front view of the notification device with the cover in FIG. 17A removed.

FIG. 18B illustrates a part of the notification device with the front cover in FIG. 17A.

FIG. 19A illustrates front view of the housing of the notification device in FIG. 17A.

FIG. 19B illustrates an expanded view of a portion of FIG. 19A.

FIG. 20A illustrates a back view of the housing of the notification device in FIG. 17A.

FIG. 20B illustrates an expanded view of a portion of FIG. 20A.

DETAILED DESCRIPTION

Figure 1:
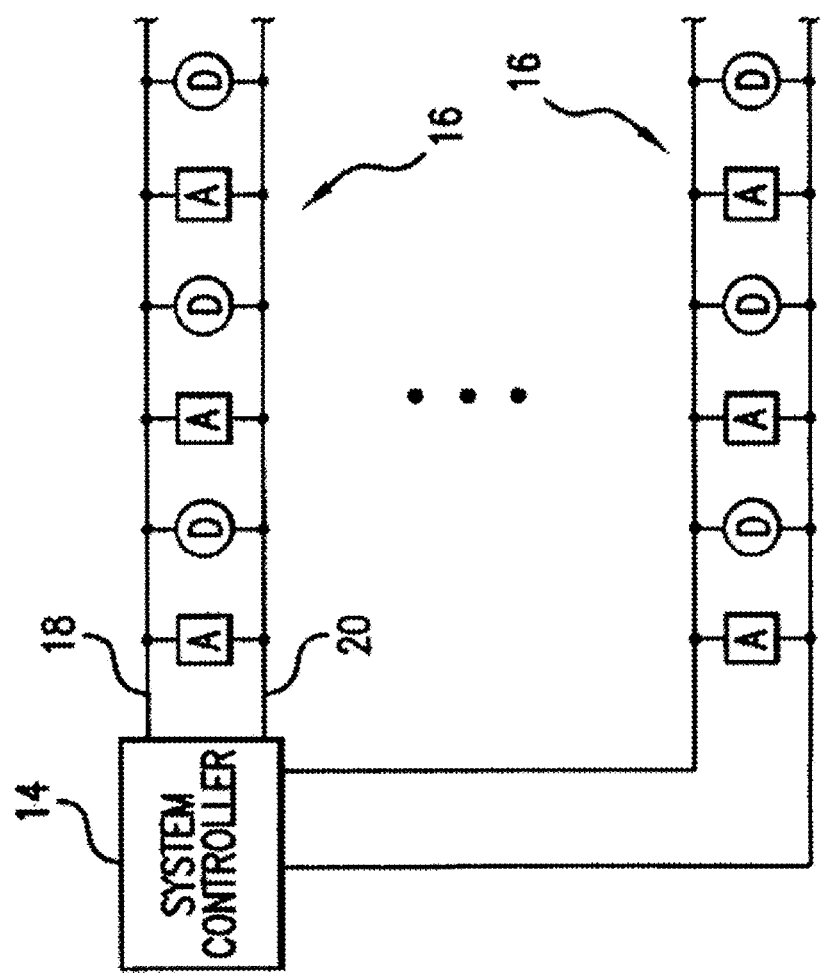
FIG. 1 is a schematic diagram illustrating a fire alarm system.

A system embodying one example of the present invention is illustrated in FIG. 1. The system includes one or more notification appliance circuits (NACs), e.g., networks 16, having alarm condition detectors D and alarm system notification device A. Alternatively, the detectors and notification devices may be on separate networks. A system controller (such as a fire alarm control panel (FACP)) 14 may monitor the detectors D.

The system controller 14 may monitor the alarm condition detectors D. When an alarm condition is sensed, the system controller 14 may signal the alarm to the appropriate notification appliances A through the one or more appliance circuits. Notification devices may include, for example, a visual alarm (such as a strobe), an audible alarm (such as a horn or a speaker), or a combination thereof.

Although not necessary for carrying out the invention, as shown, all of the notification devices in a network are coupled across a pair of power lines 18 and 20 that advantageously also carry communications between the system controller 14 and the detectors D and notification devices A.

The system controller 14 may comprise a fire alarm control panel and may use one or more commands to signal the alarm to the appropriate notification appliances A. Examples of commands issued for a system with addressable notification appliances are disclosed in U.S. Pat. No. 6,426,697, which is hereby incorporated by reference in its entirety. Alternatively, the communication line to the device may be separate from the power line. In still an alternative embodiment, the system may include non-addressable notification appliances. The communications channel may comprise, for example, a wireless link, a wired link or a fiber optic link.

Further, the system controller 14 may send one or more commands relating to diagnostics, status, or other non-alarm type events. For example the system controller 14 may send a command related to the identification, the configuration, and/or the status of the notification appliances A. Moreover, the notification appliances A may respond in kind.

Figure 2:
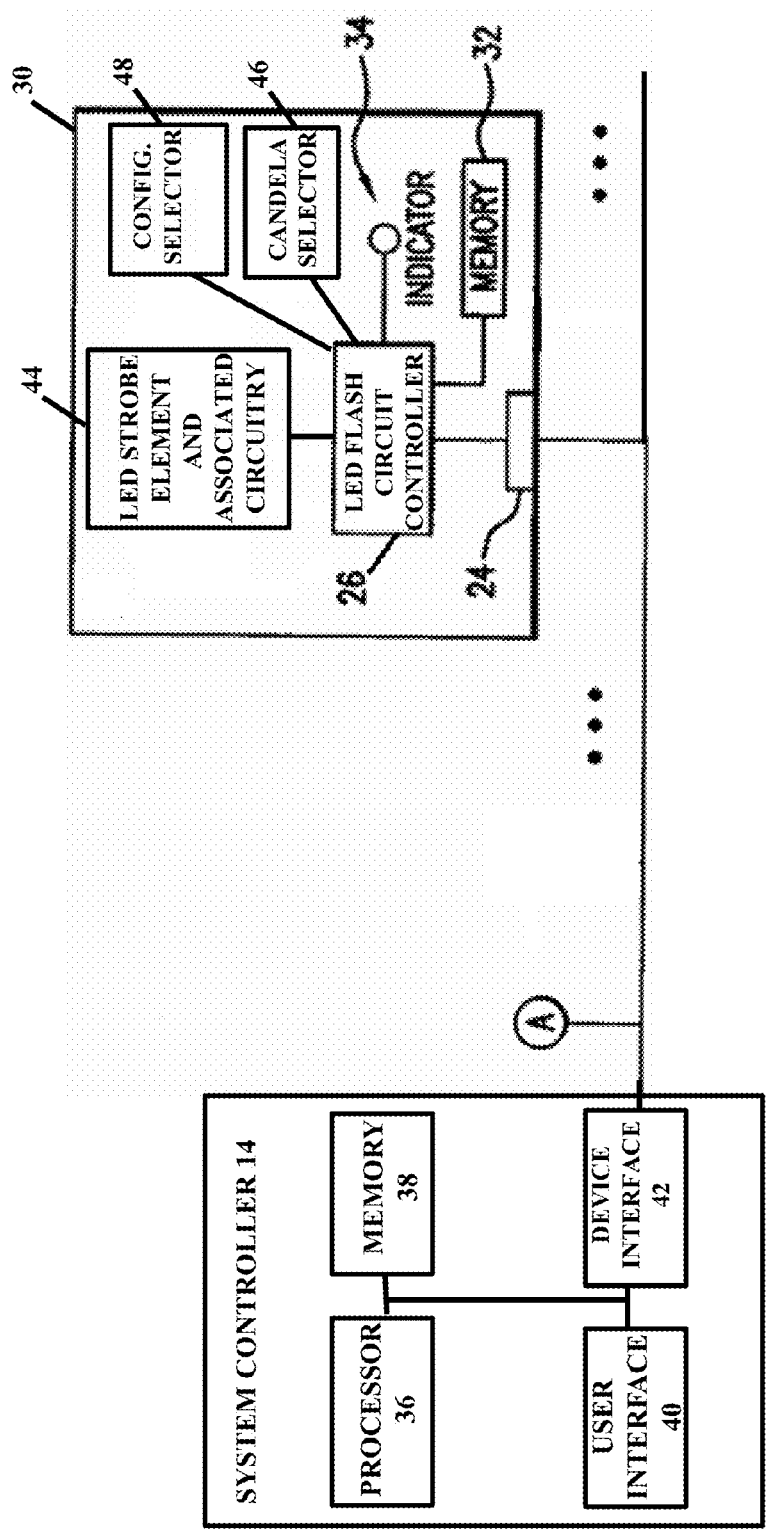
FIG. 2 is a schematic diagram of the system of FIG. 1, further illustrating details of a system controller and a strobe device.

FIG. 2 is a schematic diagram of a part of the system shown in FIG. 1, further illustrating details of the system controller 14 and one of the notification appliances. The system controller 14 includes a processor 36, a memory 38, a user interface 40, and a device interface 42. The processor 36 may comprise a microprocessor, a microcontroller, a digital signal processor, an application specific integrated circuit (ASIC), a field programmable gate array, a logical digital circuit, or other now known or later developed logical processing capability. The processor 36 may work in combination with the memory 38 in order to monitor part or all of the fire alarm system, including one or more of the appliance circuits (such as one or more notification appliance circuits, one or more detector circuits, and/or one or more notification appliance/detector circuits). In addition, the memory may include one or more look-up tables (or other data structures) used for configuration.

User interface 40 may be used by an operator to control configuration and/or operation of the alarm condition detectors D and alarm system notification appliances A. And, device interface 42 may be an example of a communications interface, and may comprise the interface between the system controller 14 and the alarm condition detectors D and alarm system notification appliances A in the one or more appliance circuits.

FIG. 2 further depicts a strobe device 30 in greater detail. The strobe device 30 connects to the network 16 via a network interface (communication connection) 24. The strobe device 30 receives one or more commands from the system controller 14. The controller 26 processes the one or more commands, as discussed in more detail below. Although shown separately, the memory 32 may be integrated with the controller 26.

The strobe device 30 further includes LED strobe element and associated circuitry 44. In some embodiments, in addition to an LED-based strobe element, another output light source may be present. For example, an indicator 34, such as a flashing LED (separate from the LED strobe element and associated circuitry 44), may be used as a visual output, for example during diagnostic testing, on the strobe device 30. The indicator 34 may be activated, for example, upon command from the system controller 14, upon a local manual command such as a pushbutton (not shown). In this regard, the strobe device 30 may include one or more strobe LEDs (shown in FIG. 2 as LED strobe element and associate circuitry 44) and one or more communication LEDs (shown as indicator 34).

After the controller 26 determines to activate the LED strobe element, the controller 26 sends one or more control signals to LED strobe element and associated circuitry 44 in order to control the operation of the LED strobe element. One example of an LED-based strobe element is disclosed in U.S. Patent Application No. 2008/0272911, herein incorporated by reference in its entirety.

Figure 6A:
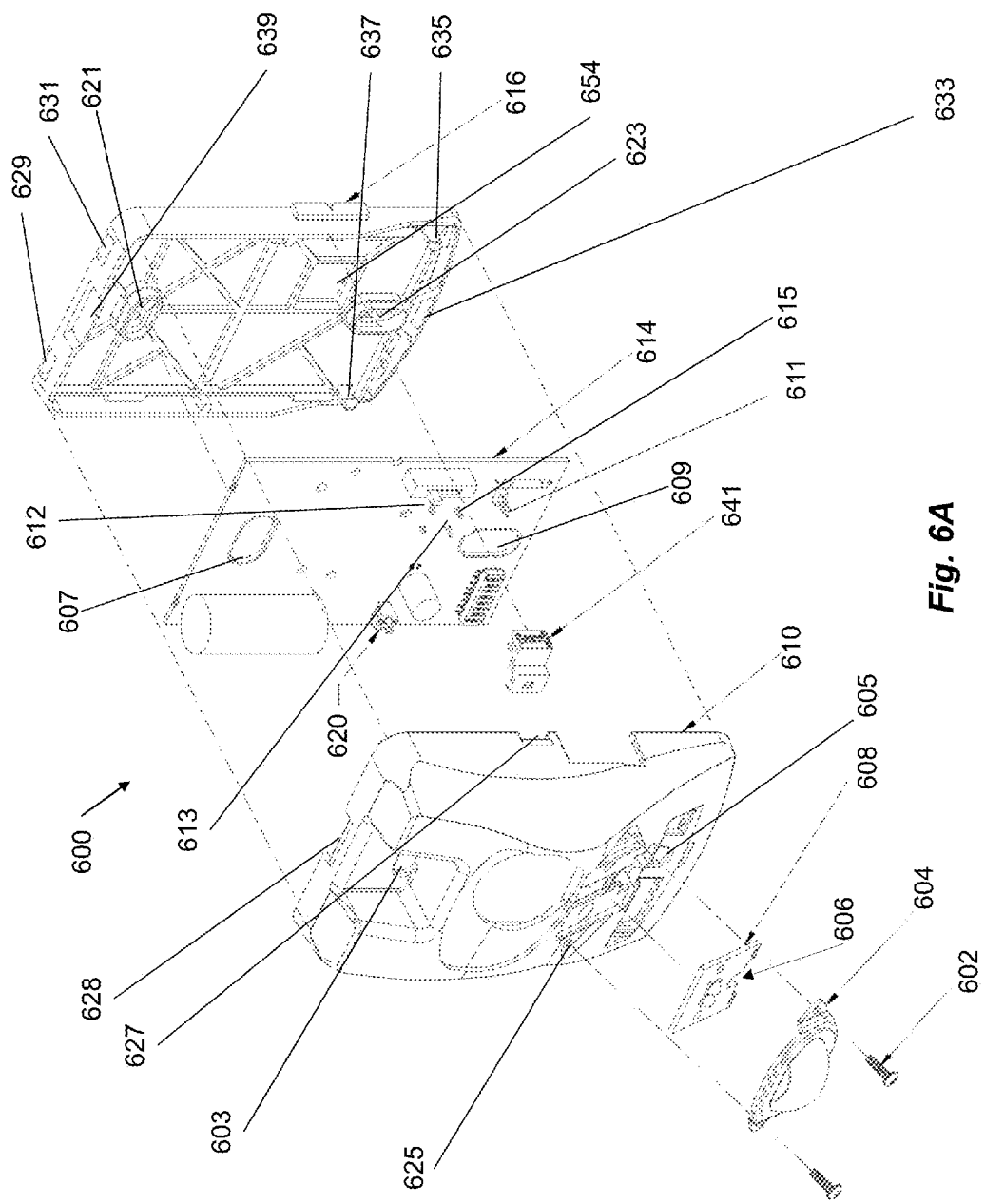
FIG. 6A is an exploded view of various parts of the LED notification device.
Figure 6B:
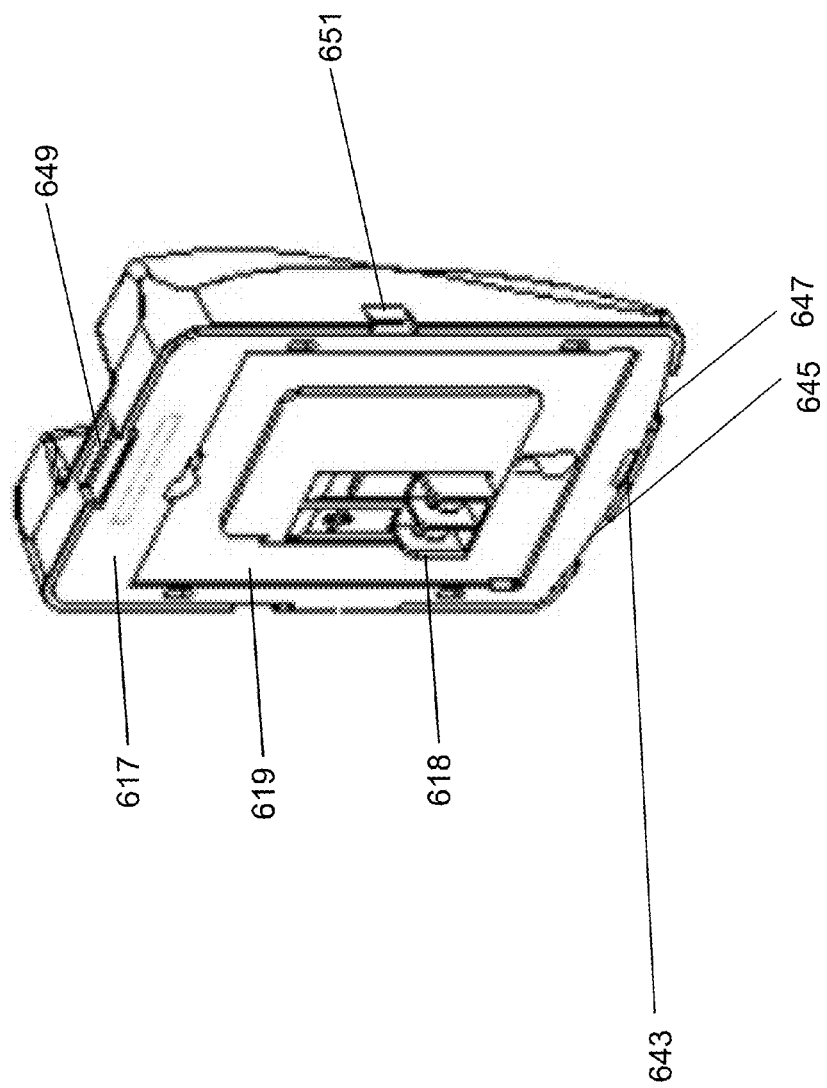
FIG. 6B is a back view of LED notification device.
Figure 6C:
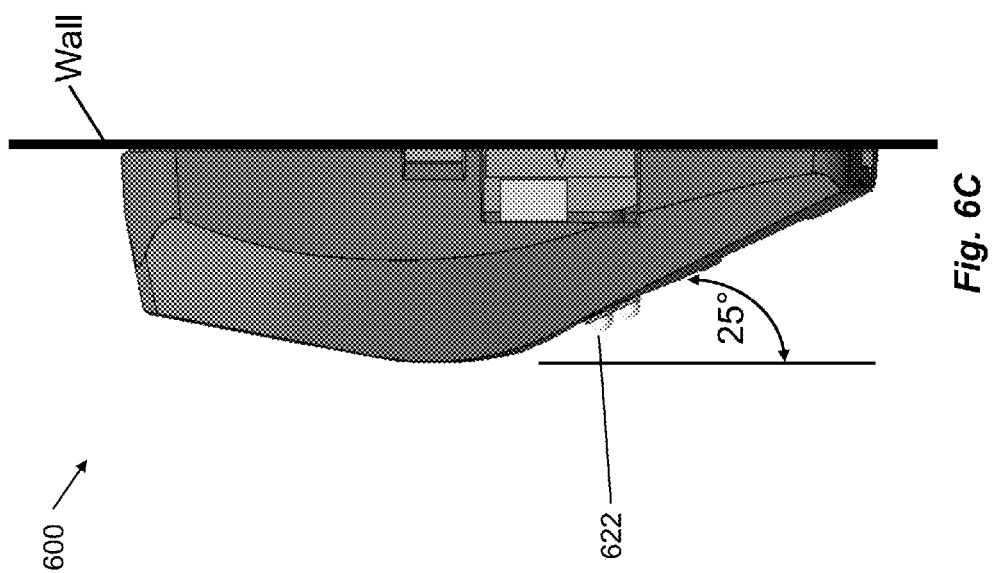
FIGS. 6C-E illustrate side views of a wall mounted notification device in FIG. 6A, with FIG. 6C illustrating the notification device without the optic attached, FIG. 6D illustrating the notification device with the optic attached, and FIG. 6E illustrating an expanded view of FIG. 6D.
Figure 13A:
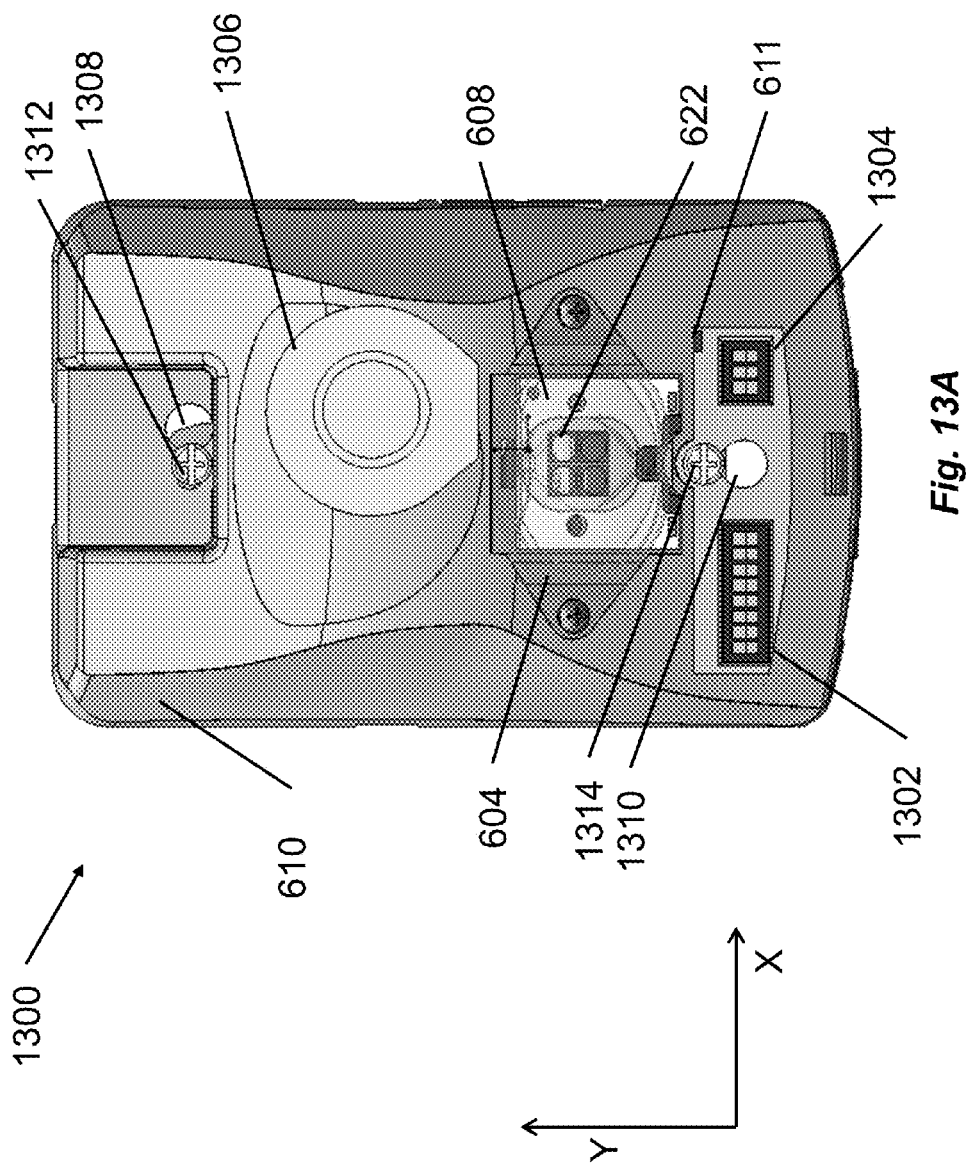
FIGS. 13A-E illustrates the notification device without the escutcheon, which may include front housing, optic, LED PCB, input devices, speaker, and keyhole openings, connected to a junction box, with FIG. 13A illustrating the front view, FIG. 13B illustrating the side view, FIG. 13C illustrating the back view, FIG. 13D illustrating the front perspective view, and FIG. 13E illustrating the back perspective view.

The strobe device 30 may optionally include candela selector 46 and configuration selector 48. Candela selector 46 may be an input device, such as a multi-position switch, on the strobe device 30. An example of the multi-position switch is disclosed in U.S. Pat. No. 7,456,585, incorporated by reference herein in its entirety. Examples of candela settings include 15, 30, 75, and 110. Configuration selector 48 may also be an input device to configure strobe device 30. Configuration selector 48 may comprise a multi-position switch and may input the address of the strobe device, may input the grouping of the strobe device (see for example, U.S. Published Application No. 2012/0154160, incorporated by reference herein), may configure the horn, etc. As discussed in more detail below, the configuration selector 48 may be located on a front side (such as shown in FIG. 13A) or a side of the strobe device 30 (sides of the strobe device are shown in FIGS. 6A-C). Optionally, the configuration selector may be positioned on a backside of the strobe device (the side that abuts the wall) or may be positioned on a top side of the strobe device.

One, some, or all of the notification devices A may comprise a strobe device, a strobe/horn device, a strobe/speaker device, or the like. As discussed herein, a strobe device may include strobe functionality (such as LED strobe functionality) or may include strobe functionality and additional notification functionality (such as horn or speaker functionality). The strobe device may be an addressable strobe notification device (e.g., the strobe notification device has a uniquely assigned address) or a non-addressable strobe notification device.

Figure 3:
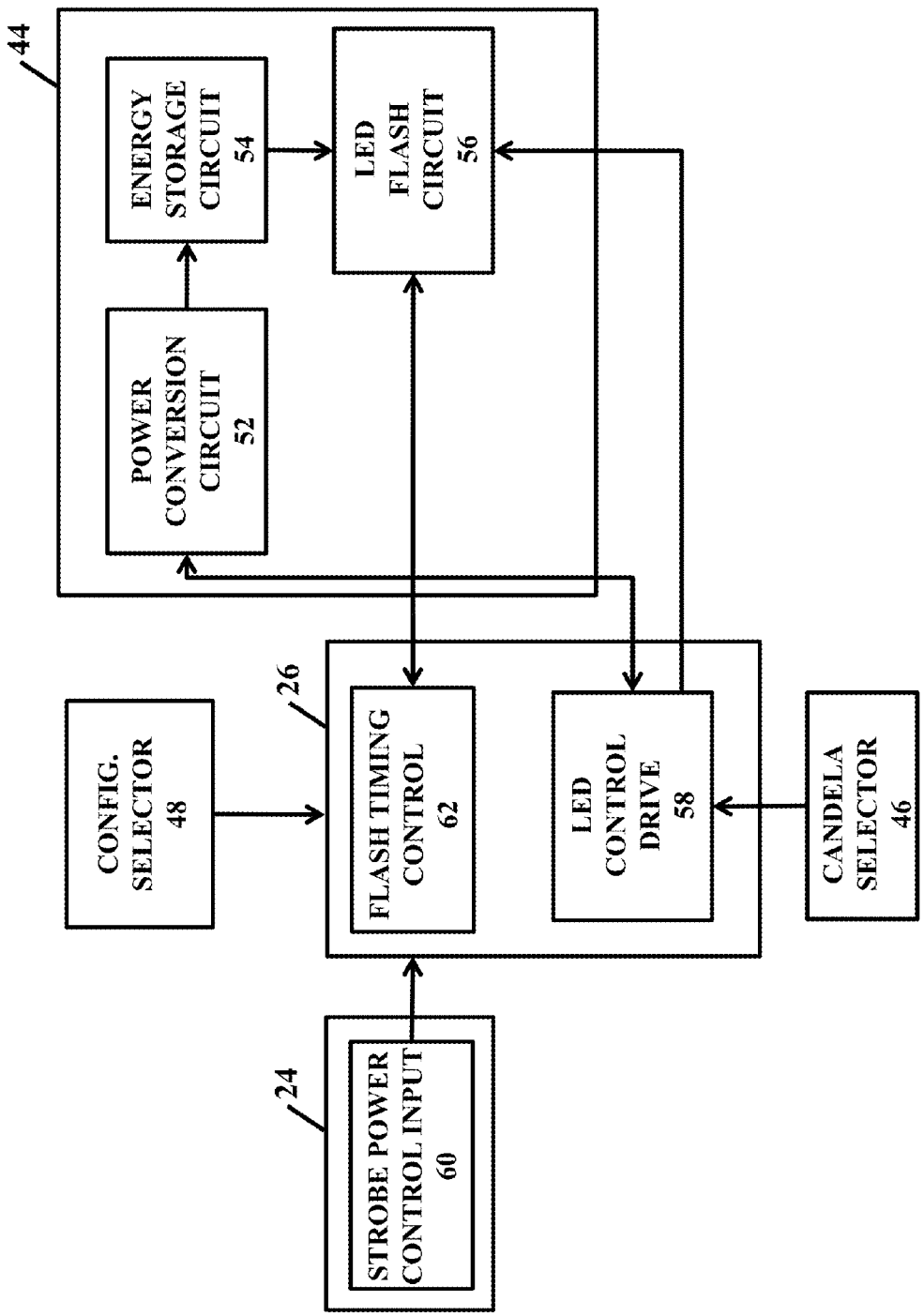
FIG. 3 illustrates an expanded block diagram of the strobe device (including strobe element and associated circuitry) illustrated in FIG. 2.

FIG. 3 illustrates an expanded block diagram of the strobe device illustrated in FIG. 2. The network interface 24 includes a strobe power control input 60 that receives the command to activate the strobe device 30 and receives power to power the strobe device 30. The strobe power control input 60 sends the received command to the LED flash circuit controller 26. The LED flash circuit controller 26 includes LED control drive 58 and flash timing control 62, which controls the timing of the flashes of the LED strobe element. The flash timing control 62 may receive as an input the candela selector 46, which may input the candela setting. Based on the candela setting, the flash timing control 62 may control the strobe element and associated circuitry 44 to generate an output with the desired candela setting. One example of the strobe element and associated circuitry 44 is illustrated in FIG. 3, which includes an LED flash circuit 56, a power conversion circuit 52, and energy storage circuit 54. The power conversion circuit 52 provides the proper regulated voltage to the energy storage circuit 54. An example of the power conversion circuit 52 may be a voltage regulator (such as a DC-DC converter or current regulator), and an example of the energy storage circuit 54 may be a capacitor. The flash timing control circuit 62 generates an output to the LED control drive 58. Based on the output, the LED control drive 58 provides the proper current to the LED flash circuit 56 in order for the LED flash circuit 56 to generate the desired intensity. Further, the flash timing control 62 generates an output to LED flash circuit 56, which dictates the duration of the output of the LED flash circuit 56. Thus, the flash timing control 62 may control both the intensity and the duration in order generate an output with the requested candela rating (as dictated by candela selector 50) and at the fixed pulse width. The flash timing control 62 further may communicate with the power conversion circuit 52 in order for the power conversion circuit 52 to provide the proper voltage to energy storage circuit 54.

Thus, upon receiving the activation signal (such as in the form of a command received by network interface 24), the power conversion circuit 52 may charge up the storage capacitor in energy storage circuit 54. Alternatively, the power conversion circuit 54 may charge up the storage capacitor in energy storage circuit 54 prior to receipt of the activation signal. Regardless, the strobe element may be activated in response to receipt of the activation signal. When the strobe element is activated, the flash timing control 62 may initialize the power conversion circuit 52 to charge the energy storage circuit 54, as well as configure the LED control drive 58. This may be applicable to a notification appliance that is addressable. In a non-addressable notification appliance, the flash timing control may be set directly (such as locally on the non-addressable notification appliance). FIG. 3 further includes the configuration selector 48. The LED flash circuit controller 26 may poll the configuration selector 48 in order to determine one or more settings of the configuration selector 48. As discussed above, the configuration selector 48 may be configured to input a unique address, a grouping, or the like.

Figure 4D:
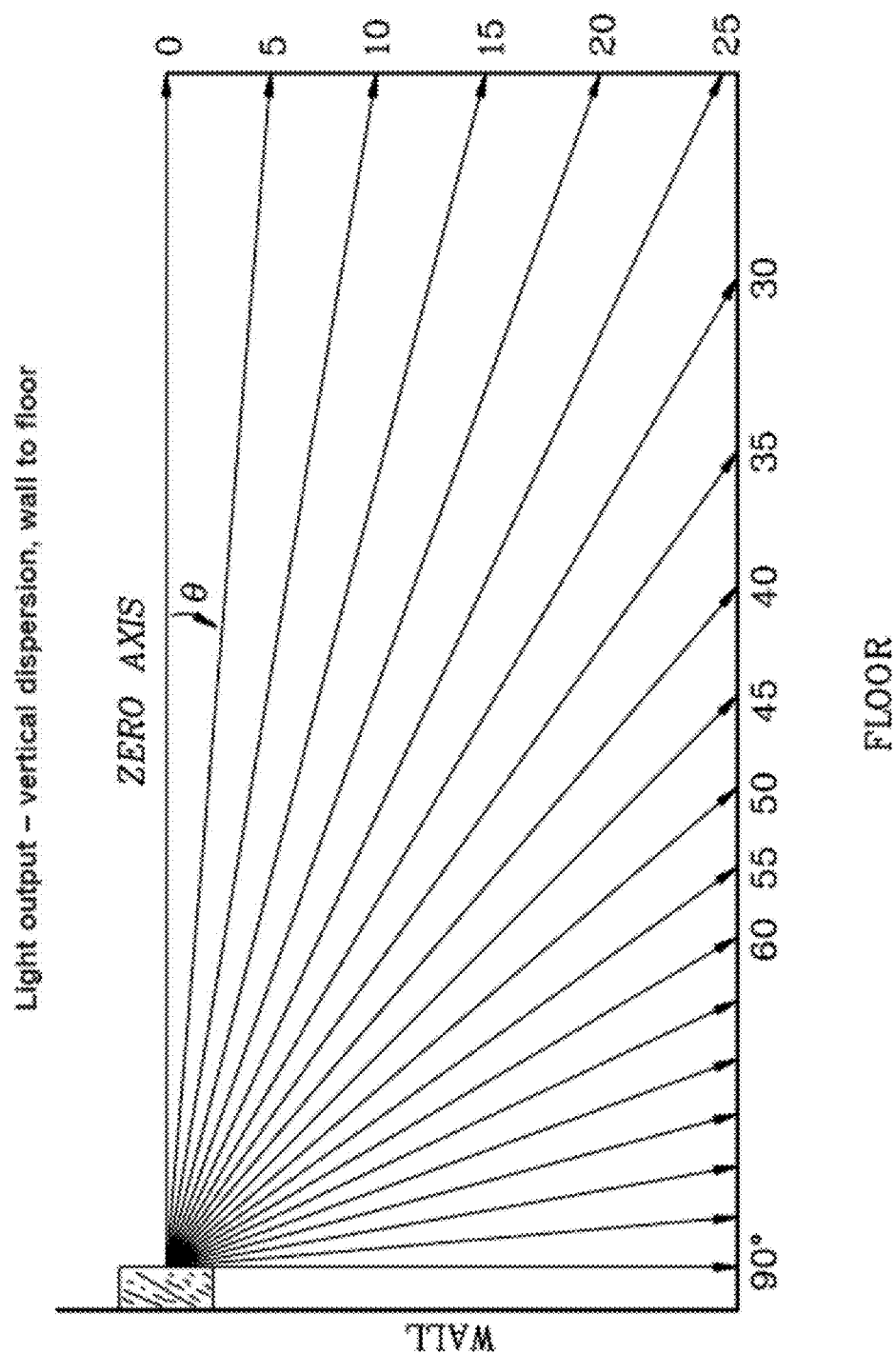

Various standards may be promulgated for strobe devices. One such standard in Underwriting Laboratories (UL) Specification 1971, which relates to requirements that cover emergency-signaling devices for the hearing impaired. FIGS. 4A-D illustrate various requirements for wall mounted strobe devices. For example, FIG. 4A illustrates the required minimum percentage in US Specification 1971 for horizontal dispersion for a wall mounted strobe. As shown, on axis (0°) requires a 100% rating output. As the angle increases off-axis, the percent rating decreases. FIG. 4B illustrates the light output with regard to horizontal dispersion and the various angles depicted in FIG. 4A. FIG. 4C illustrates the required minimum percentage in US Specification 1971 for vertical dispersion for a wall mounted strobe. FIG. 4D illustrates the various angles listed in the chart depicted in FIG. 4C.

Figure 5B:
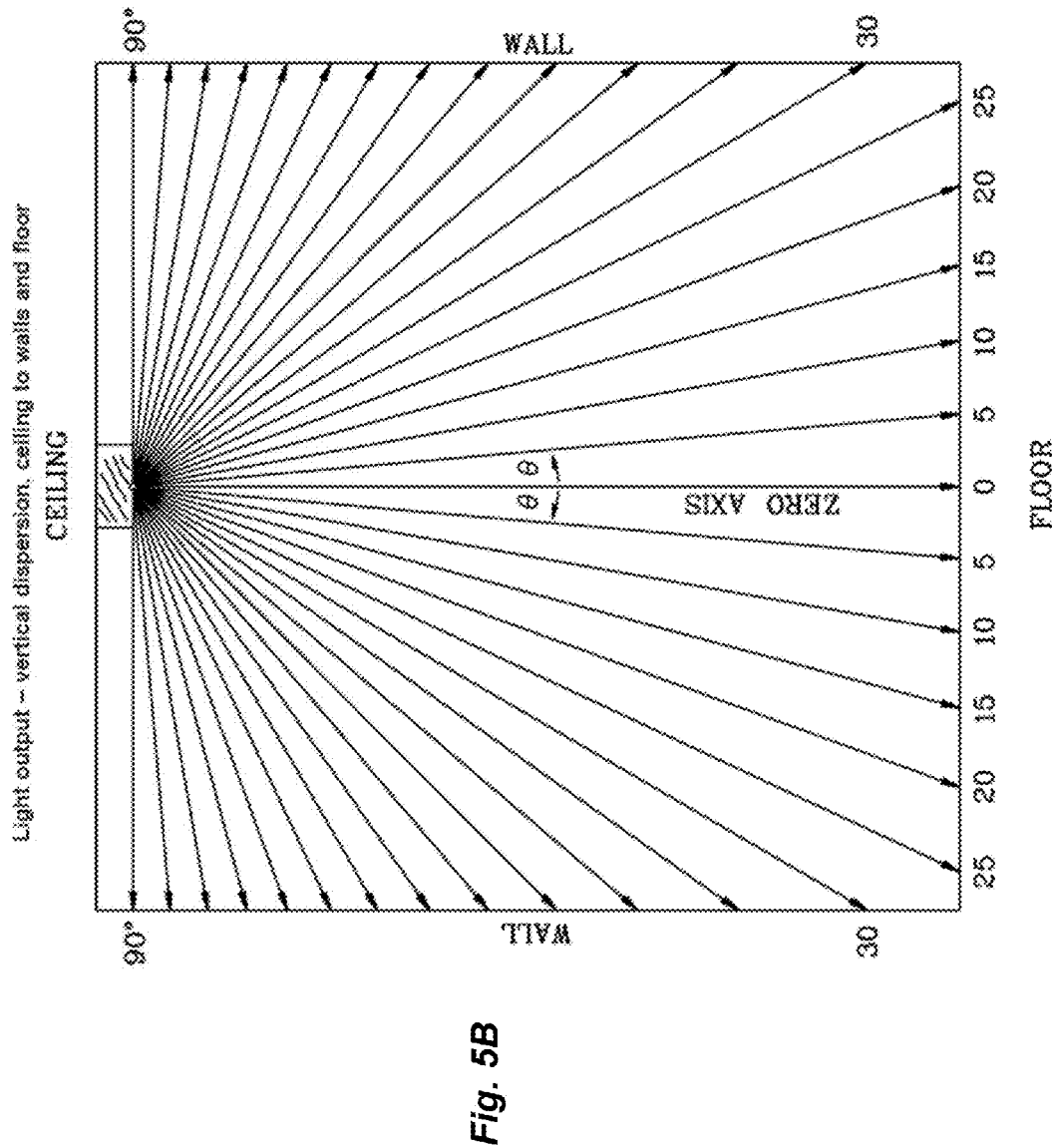

FIGS. 5A-B illustrate various requirements for ceiling mounted strobe devices. FIG. 5A illustrates the required minimum percentage in US Specification 1971 for vertical dispersion in both X and Y planes for a ceiling mounted strobe. FIG. 5B illustrates the light output with regard to vertical dispersion and the various angles depicted in FIG. 5A.

FIG. 6A is an exploded view of various parts of the LED notification device 600. The LED notification device 600 may be configured for mounting to a wall, and may be configured to generate a strobe output. The notification device 600 includes an optic 604 that is attached to front housing 610 via one or more screws, bolts or fasteners 602. When optic 604 is attached to front housing 610, the LED printed circuit board (PCB) 608 is sandwiched between the optic 604 and the front housing 610. As shown in FIG. 6A, LED PCB 608 includes a notch 606, discussed in detail below with respect to FIG. 6J. Further, LED PCB 608 includes 2 LEDs. Different numbers of LEDs, such as 4 LEDs, are contemplated.

FIG. 6A further illustrates cover 641 that may sit over a movable switch 612, which may be moved to one of a plurality of positions to indicate the candela setting for the strobe device 600. Switch 612 is an example of candela selector 46 illustrated in FIG. 2. FIG. 6A also includes main PCB 614, which is discussed in further detail in FIGS. 14A-B. Connector 620 is configured to electrically connect LED PCB 608 with main PCB 614.

Main PCB 614 may comprise the driver board. As discussed in more detail below, the driver board may be configured to drive one or more electronics on main PCB 614 or on other boards. For example, main PCB 614 may include a speaker (such as speaker 1010 illustrated in FIG. 10A). Main PCB 614 may include electronics to drive speaker. As another example, main PCB 614 may drive one or more LEDs (such as LED(s) illustrated in LED PCB 608).

As illustrated in the exploded view of FIG. 6A, main PCB 614 may be connected to back cover 616. For example, main PCB 614 may be connected to back cover 616 via a snap-fit. More specifically, back cover 616 may include one or more structures used to engage main PCB 614, such as one or more tabs and/or one or more snaps. In a more specific embodiment, back cover 616 includes tab 639, so that a part of main PCB 614, such as one side of main PCB 614, may slot into tab 639. Further, back cover 616 may include snaps 635, 637, which may snap onto the front of main PCB 614. As another example, main PCB 614 may be connected to back cover 616 via one or more screws. Back cover 616, in turn, is configured to connect with a junction box, as discussed in more detail below.

In one embodiment, front housing 610 may likewise be connected to back cover 616. Thus, the front cover 610 is connected directly to back cover 616 (instead of in a separate embodiment in which the front cover is indirectly connected to main PCB 614, which is in turn connected to back cover 616). Using the direct connection to the back cover 616, the front housing 610 may be more securely fastened. Similar to main PCB 614, front housing 610 may be connected to back cover in one of several ways, including via snap-fit or via one or more screws. For example, back cover may include an opening 633, into which a tab on the front housing 610 may slot into. As another example, back cover 616 may include holes 629, 631, into which tabs on the front housing may fit into, as discussed in more detail below. In this regard, in one embodiment, the main PCB 614 and the front housing 610 may both be connected to the back cover 616 in a similar manner (e.g., via a snap fit). Alternatively, the main PCB 614 and the front housing 610 may be connected to the back cover 616 in different manners.

Though not illustrated in FIG. 6A, an escutcheon may be attached to front housing 610 (such as via a snap fit, discussed in more detail below). For example, front housing 610 may include snaps 627, 628, into which the escutcheon may attach. In one embodiment, the front housing 610 includes four snaps equally spaced, such as spaced at noon, 3 o'clock, 6 o'clock, and 9 o'clock (with snap 628 illustrating the positioning at noon and snap 627 illustrating the positioning at 3 o'clock). In an alternate embodiment, the front housing 610 includes two snaps equally spaced, such as spaced at noon and 6 o'clock.

The front housing 610 and/or main PCB 614 may be connected to back cover 616 in one or more additional ways. As discussed in more detail below, the notification appliance 600 may be connected to a junction box via one or more screws. In this regard, the screws may screw through holes 603, 605 in the front housing 610, holes 607, 609 in the main PCB 614, and holes 621, 623 in back cover 616 to be received in screw sockets of the junction box (such as holes 1224, 1228, which serve as screw receptacles, in junction box 1220). In order for the screws not to touch main PCB 614 (and potentially short circuit main PCB 614), protrusions 621, 623 on back cover 616 are used. Protrusions 621, 623 may be composed on non-conducting material, such as rubber. When main PCB 614 is attached to back cover 616, protrusions 621, 623 push through holes 607, 609 so that the interior edge of holes 607, 609 are covered by protrusions 621, 623. In this regard, protrusions 621, 623 serve as a buffer so that screws do not touch the interior edge of holes 607, 609. Further, an underside of front housing 610 may have one or more surfaces that mate with protrusions 621, 623. For example, the area on an underside of the front housing 610 around keyholes 1308, 1310 may mate with protrusions 621, 623. The area(s) 1360, 1362, highlighted by dashed circles in FIG. 13F, may be flat surfaces. Thus, the screws inserted into the junction box, which traverse through the front housing 610, the main PCB 614, and the back cover 616, may be isolated from interior electronics of the notification appliance.

When the screws are received in the screw sockets, the front housing 610 is pushed into main PCB 614 and back cover 616, so that the front housing 610 creating a pressing force onto main PCB 614 and back cover 616. With the additional manner in which front housing is connected to the notification appliance 600, the notification appliance 600 may have additional structural integrity.

Main PCB 614 may include jumper 611. Jumper 611 may comprise a wire used to configure Main PCB 614. Jumper 611 may be visible from the front of notification appliance (with the escutcheon removed), such as illustrated in FIG. 13A, discussed below. In this regard, the technician may readily see a configuration of Main PCB 614 by viewing front housing 610 without the need to remove front housing 610.

Jumper may be input into different holes or points in main PCB 614 in order to indicate to the main PCB 614 (such as firmware resident in the main PCB 614) of a particular desired configuration of the notification appliance. Jumper 611 may likewise be selected for a particular color to indicate the particular configuration of the notification appliance. In a more specific example, upon manufacture (or after manufacture), a jumper may be used to connect to a hole on main PCB 614 that indicates to the firmware that the notification appliance is to be configured as a mass notification appliance. As discussed in more detail below, the firmware may modify the operation of the notification appliance in response to the configuration information indicated by the jumper. In order to visually provide this indication, a yellow jumper may be used to indicate to an operator that the notification appliance is configured as a mass notification appliance. Conversely, a jumper may be used to connect to a hole on main PCB 614 that indicates to the firmware of the notification appliance that the notification appliance is to be configured as a fire notification appliance, with the color of the jumper being white to indicate to the operator that the notification appliance is configured as a fire notification appliance. In this regard, jumper 611 may serve one or more purposes. In one purpose, jumper 611 provides a visual indication of the configuration of the notification appliance. In another purpose, jumper 611 is used by main PCB for the configuration.

As discussed above, jumper 611 provides configuration information to the firmware. The firmware may modify the operation of the notification appliance in response thereto. In the example of jumper 611 indicating that the notification appliance is configured for mass notification (which can result in the light output being yellow in color), the firmware may drive the LED(s) 622 differently than if the firmware determines that the mass notification appliance is configured for fire notification. More specifically, since the light output for mass notification is yellow in color (with the yellow light output potentially resulting from filtering, thereby reducing the spectrum of light output as compared to light output for fire notification), the firmware may drive the LED(s) 622 differently (e.g., at a greater current and/or at a higher PWM rate) in a mass notification configuration than for a fire notification appliance in order to meet the desired candela setting. For example, for a setting of 30 candela, the firmware may drive a notification appliance in a fire notification configuration at a lower drive current and/or at a lower PWM rate than a 30 candela setting for a notification appliance configured for mass notification. As discussed below, the firmware may determine the drive currents and/or the PWM rates for the different configurations based on a lookup table, which may correlate an indication of the drive currents and/or PWM rates at which to operate the one or more strobe LEDs with different configurations.

As discussed above, the notification appliance may be configured for a candela output. In one embodiment, the notification appliance is configured for a discrete number of candela outputs. Typical candela ratings include, but are not limited to, 15, 30, 75, and 110 candela. In a more specific embodiment, the configuration of the candela output for the notification appliance is via input proximate to the notification appliance (such as a manual setting of a switch, such as using cover 641 to manually set the candela output or via a near-field communication to the notification appliance). In another specific embodiment, the configuration of the candela output for the notification appliance is via input remote to the notification appliance (such as by the fire alarm control panel sending a command to configure the notification appliance to the candela output).

Further, in one embodiment, all of the potential candela outputs may be available in each of the different configurations of the notification appliance. For example, if the potential candela outputs are 15, 30, 75, and 110 candela, the notification appliance may output all of the potential candela outputs in either a fire notification configuration or in a mass notification configuration.

In an alternative embodiment, the potential candela ratings may be different depending on the configuration of the notification appliance. As discussed above, a fire notification appliance may use a clear lens and may emit a broad spectrum of light. Other types of notification appliances, such as a mass notification appliance, may have a colored lens and may emit a narrower spectrum of light. Because of the narrower spectrum, the notification appliance in the mass notification configuration may emit less light than the notification appliance in the fire notification configuration (with the drive current and PWM rate being equal). In certain configurations (such as in the mass notification configuration), the notification appliance may be unable to generate sufficient light to meet the candela requirements, such as at the highest candela setting (e.g., 110 candela). More specifically, the notification appliance may be unable to generate the drive current for a sufficient period of time to meet the candela setting at the narrower spectrum of light. In these situations, the notification appliance may have different available candela settings for different configurations. In the example of available candela settings of 15, 30, 75, and 110 candela, the notification appliance in the fire notification configuration may be configured to any of the available candela settings of 15, 30, 75, and 110 candela, whereas in the mass notification configuration may be configured to any of the available candela settings of 15, 30, and 75 (but not at the 110 candela setting). In this regard, the notification appliance in the mass notification configuration has a narrow set of available candela settings than in the fire notification configuration.

Further, in one embodiment, a notification may be generated in the event of an error in the candela setting. For example, in the event that the notification appliance is set to an unavailable candela setting, the notification appliance may generate an error signal. More specifically, in a notification appliance in which the 110 candela setting is unavailable in the mass notification configuration, and in the event that the notification appliance is in the mass notification configuration and the desired candela setting is set to 110 candela (either via a switch on the notification appliance or via a command to configure the candela setting set by a fire alarm control panel), the notification appliance may generate an error indication. The error indication may be output locally (such as on a display resident on the notification appliance) and/or may be output remotely (such as sending a communication to the fire alarm control panel indicating the error).

In addition to (or instead of) notifying of an error in the candela setting, the fire alarm control panel may notify of an error in the configuration of the notification appliance. As discussed above, the jumper, indicating the configuration of the notification appliance to the main PCB 614, may be installed at manufacture. After which, the notification appliance is installed at the site and the fire alarm control panel is programmed. The fire alarm control panel may thereafter poll one, some or all the notification appliances in the system for the respective configurations. For example, the fire alarm may send a command to a particular notification appliance, and, responsive to the command, the particular notification appliance may poll the jumper 611 to determine the configuration and send a response that includes an indication of the configuration, such as a mass notification configuration or a fire notification configuration. The fire alarm control panel may compare the configuration, as reported by the notification appliance, with the configuration, as programmed at the fire alarm control panel. In the event of a discrepancy in the comparison, the fire alarm control panel may indicate an error. For example, the fire alarm control panel may have programmed therein that notification appliance #20 is a fire notification appliance. In response to the fire alarm control panel polling notification appliance #20, the notification appliance may receive the configuration of notification appliance #20. In the event that notification appliance #20 responds with configuration information indicating a mass notification appliance, the fire alarm control panel may indicate an error. In this regard, the fire alarm control panel may perform testing to ensure that the proper equipment is installed.

As discussed above, the firmware may access the drive settings and/or PWM rates for the LED(s) 622 depending on the configuration and the candela setting of the notification appliance. In one example, a 2-dimensional look-up table may be used in order for the firmware to determine the correct drive currents and/or PWM rates. More specifically, inputs to the look-up table may include: (1) the notification appliance configuration (e.g., fire or mass notification configuration); and (2) the candela setting (e.g., 15, 30, 75 or 110). Responsive to the inputs, the look-up table may output an indication as to the drive current and/or PWM rate at which to operate the one or more strobe LEDs. For example, the look-up table may output an indication of a drive current, which may be used to drive the one or more strobe LEDs at the indicated drive current. In one embodiment, the look-up table may be resident in the notification appliance upon manufacture. In an alternate embodiment, the indication of the drive current and/or PWM rate may be received from a device external to the notification appliance. For example, responsive to receiving the notification appliance configuration and optionally the candela setting, the fire alarm control panel may send the notification appliance the drive current and/or PWM rate to produce the desired candela output for the notification appliance configuration. More specifically, in the instance where the candela setting is input locally to the notification appliance, the notification appliance may send both the notification appliance configuration and the candela setting to the fire alarm control panel. In response thereto, the fire alarm control panel may send the drive current and/or the PWM rate. In the instance where the candela setting is input via a command from the fire alarm control panel to the notification appliance, the notification appliance may send only the notification appliance configuration to the fire alarm control panel. In response thereto, the fire alarm control panel may send the indication of the drive current and/or the PWM rate.

FIG. 6B is a back view of LED notification device as assembled. FIG. 6B illustrates wire connecting mechanism 618, discussed below with respect to FIGS. 9B-D. FIG. 6B further illustrates inset 619. Inset 619 comprises an indentation, cutout, or channel in the back of back cover 616. Inset 619 may completely encircle a center portion of back cover. Adapter bracket 1200, discussed below with respect to FIGS. 12A-B, may mate with inset 619. In one embodiment, when adapter bracket 1200 is pressed against the back of back cover 616, adapter bracket sits flush with the back of the back cover. For example, another portion of back cover 616, such as at 617, and the adapter bracket may be in the same plane. In this regard, when adapter bracket 1200 connects between notification appliance and junction box, the notification appliance may at least partly abut or touch junction box. In one embodiment, the adapter bracket 1200 mating with inset 619 at least partly seals or weatherproofs a backside of the notification appliance. In an alternate embodiment, the adapter bracket 1200 mating with inset 619 fully seals or weatherproofs the backside of the notification appliance.

As discussed above, front housing 610 may be attached to back cover 616. Slot 643 illustrates one manner in which front housing 610 may be attached to back cover 616. Further, the escutcheon may be attached to front housing 610, such as using tabs 645, 647, 649, 651 on front housing.

Figure 6D:
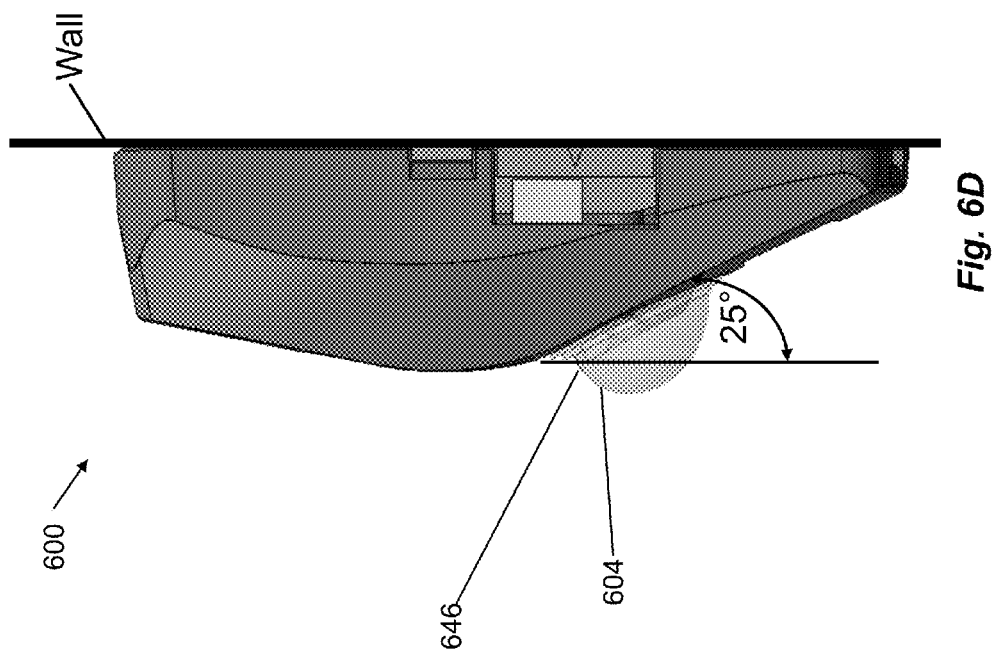
Figure 6E:
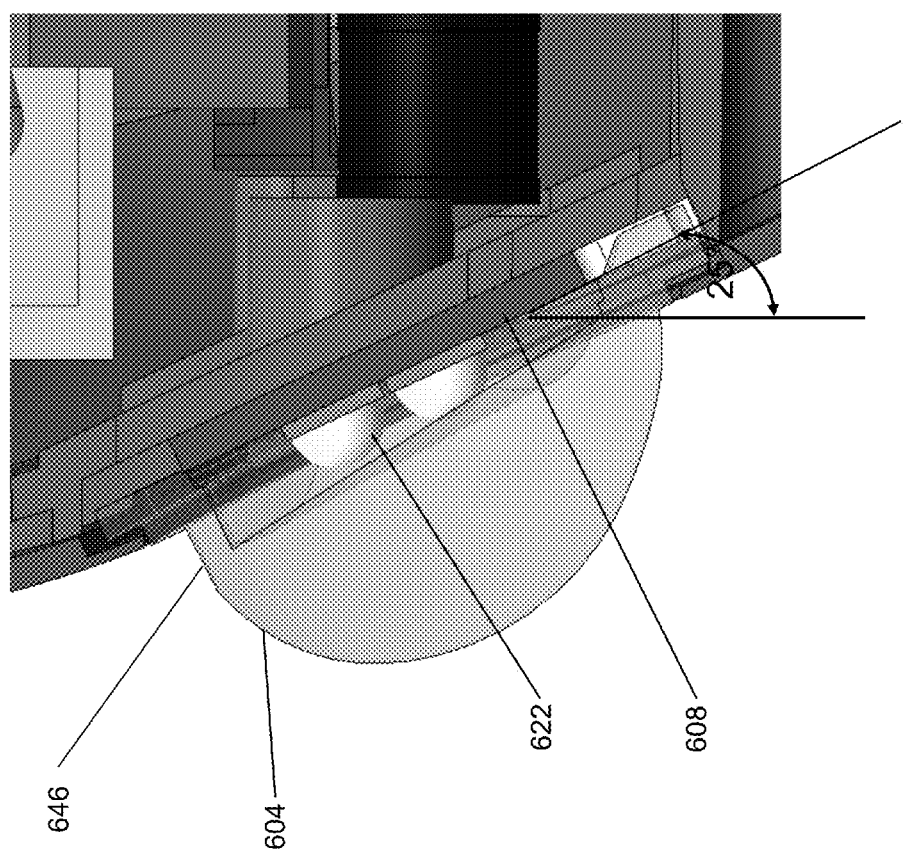
Figure 6F:
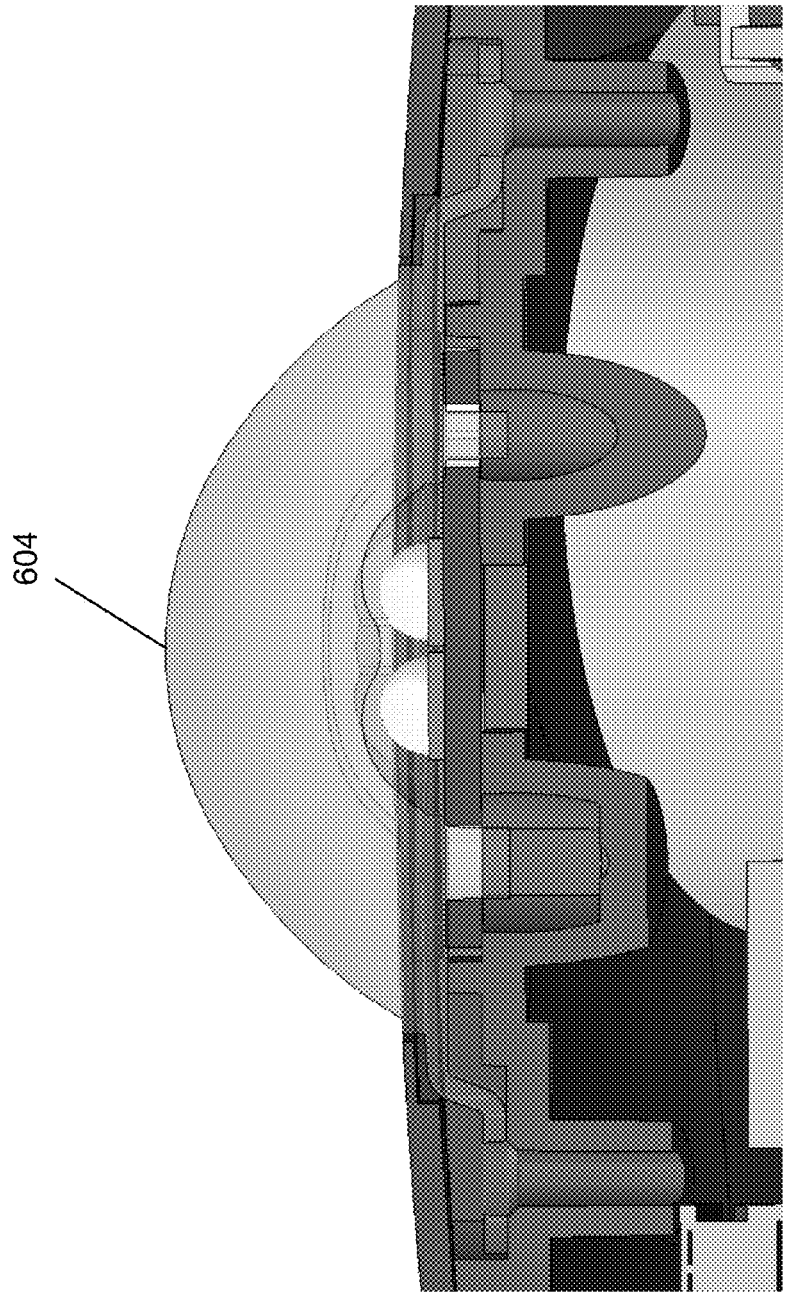
FIG. 6F illustrates a cross-section view of the optic as installed in the LED notification device of FIG. 6A.

FIGS. 6C-E illustrate side views of a wall mounted notification device, with FIG. 6C illustrating the notification device without the optic attached and FIG. 6D illustrating the notification device with the optic attached. FIG. 6E illustrates an expanded view of FIG. 6D. FIG. 6F illustrates a cross-section view of the optic as installed.

As discussed above, there may be requirements for a vertical dispersion of wall mounted strobes, such as illustrated in FIGS. 4C-D. In this regard, one manner in which to achieve a desired vertical dispersion is by configuring the notification device such that one or more of the LED strobe elements in the notification device is offset. As illustrated in FIGS. 6C-E, the LED strobe element in the notification device is offset at 25° below the vertical plane. Typically, the LED strobe element is positioned such that its mounting is perpendicular to the wall (i.e., 0° from vertical). In one embodiment, the angle of mounting is greater than 0°, such as equal to or greater than 5°, equal to or greater than 10°, equal to or greater than 15°, equal to or greater than 20°, equal to or greater than 25°, equal to or greater than 30° or equal to or greater than 35°.

There are various ways in which to achieve the desired angle of mounting of the strobe element. One way, illustrated in FIG. 6D, is to mount the one or more LED(s) 622, being used as the strobe element, perpendicularly onto a printed circuit board (PCB), such as LED PCB 608 illustrated in FIG. 6A. In this regard, the light emitted at companion angles across 180° (such as 45° and 135°) are the same. The LED PCB 608 may then be mounted at the desired offset (such as at 25° discussed above) so that the light emitted from the LED(s) (after the PCB is mounted) is at the desired offset angle. Another way is to mount the LED PCB such that the LED PCB (when the notification device is mounted to the wall) is parallel to the wall. The LEDs may be mounted to the LED PCB at the desired offset (such as at 25°). Thus, when installed, the LED(s) are at the predetermined offset. Still another way is to offset the mounting of the PCB and the LED(s) related to the wall.

Figure 6G:
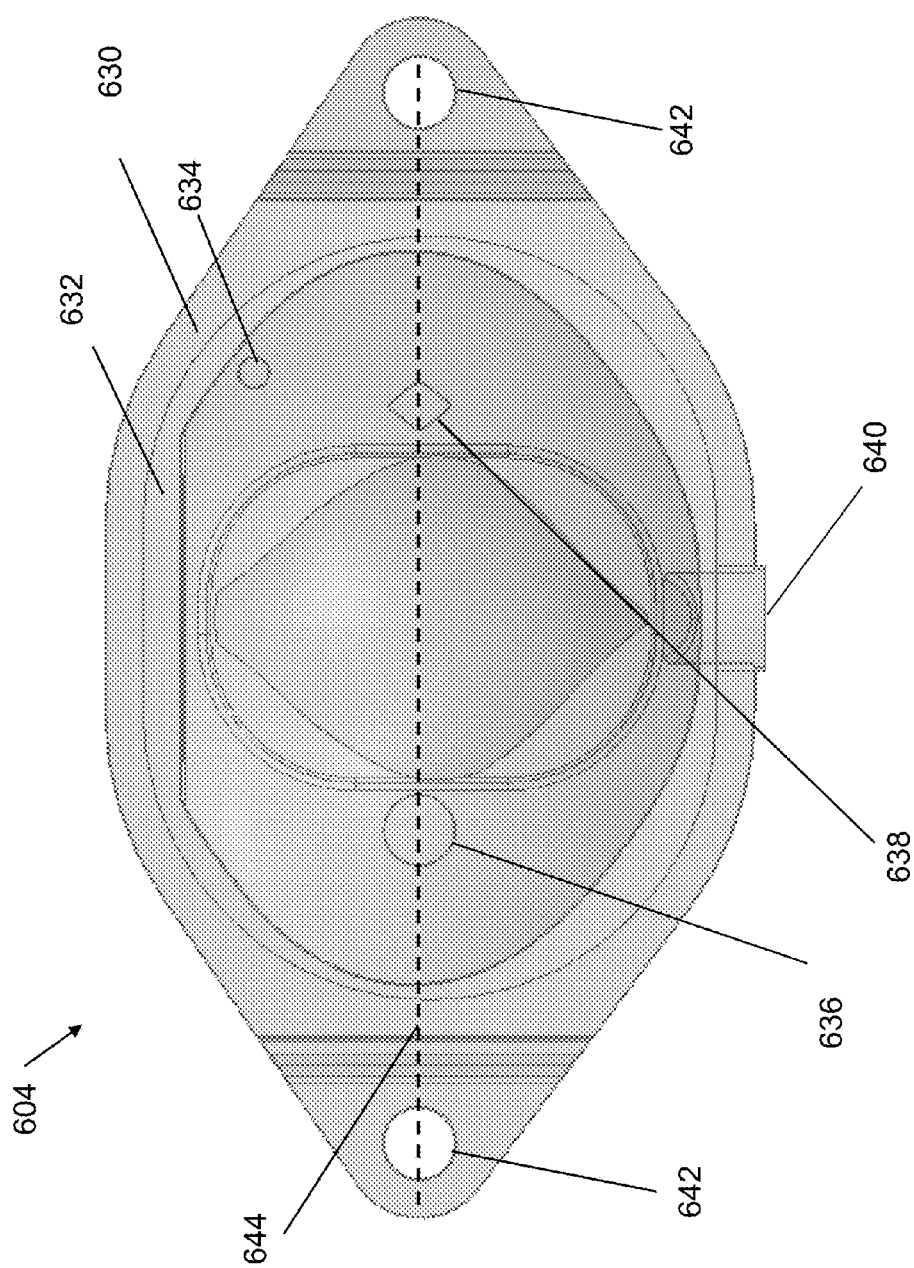
FIG. 6G illustrates a front view of the optic.
Figure 6H:
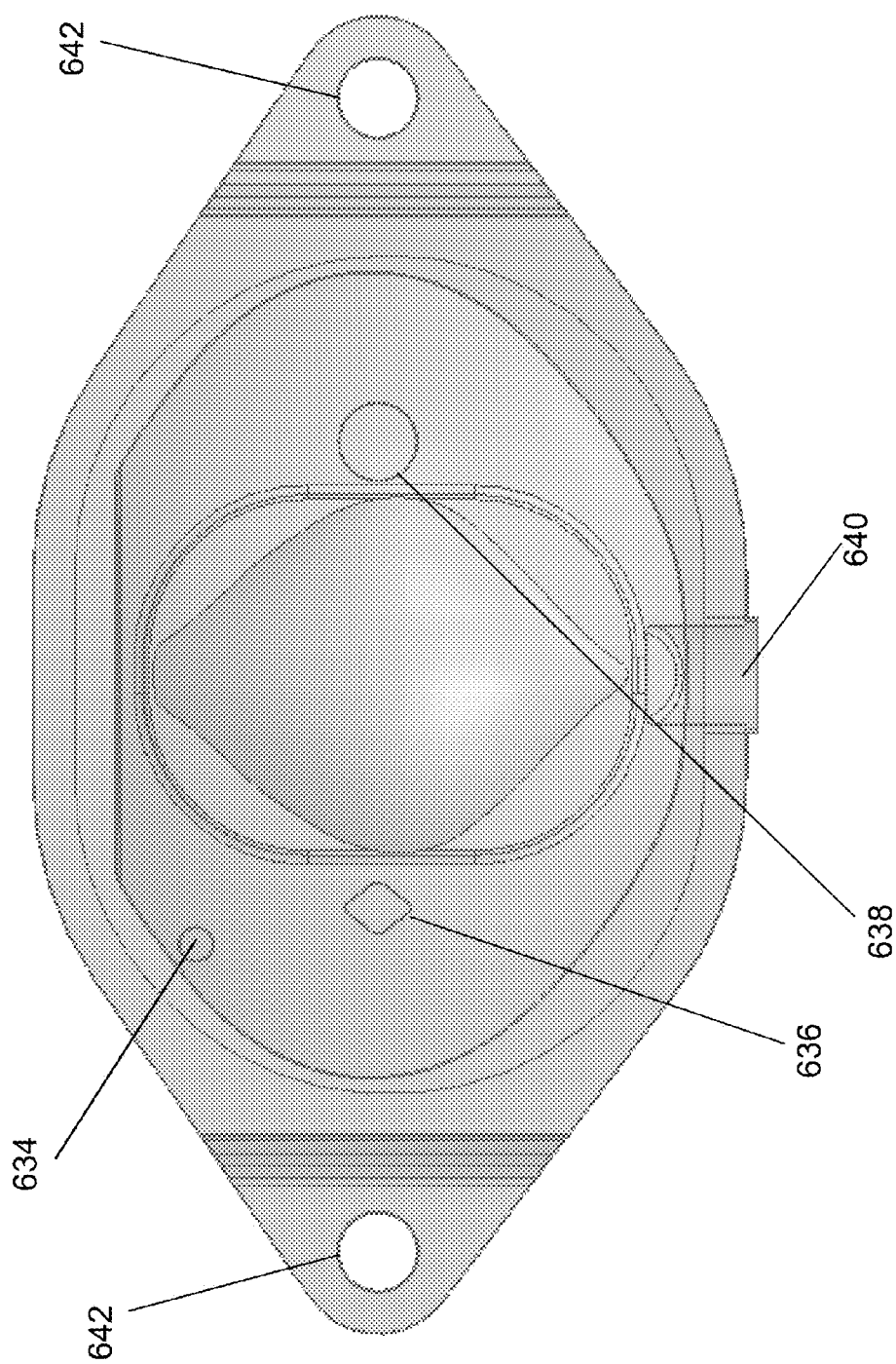
FIG. 6H illustrates a bottom view of the optic.
Figure 6I:
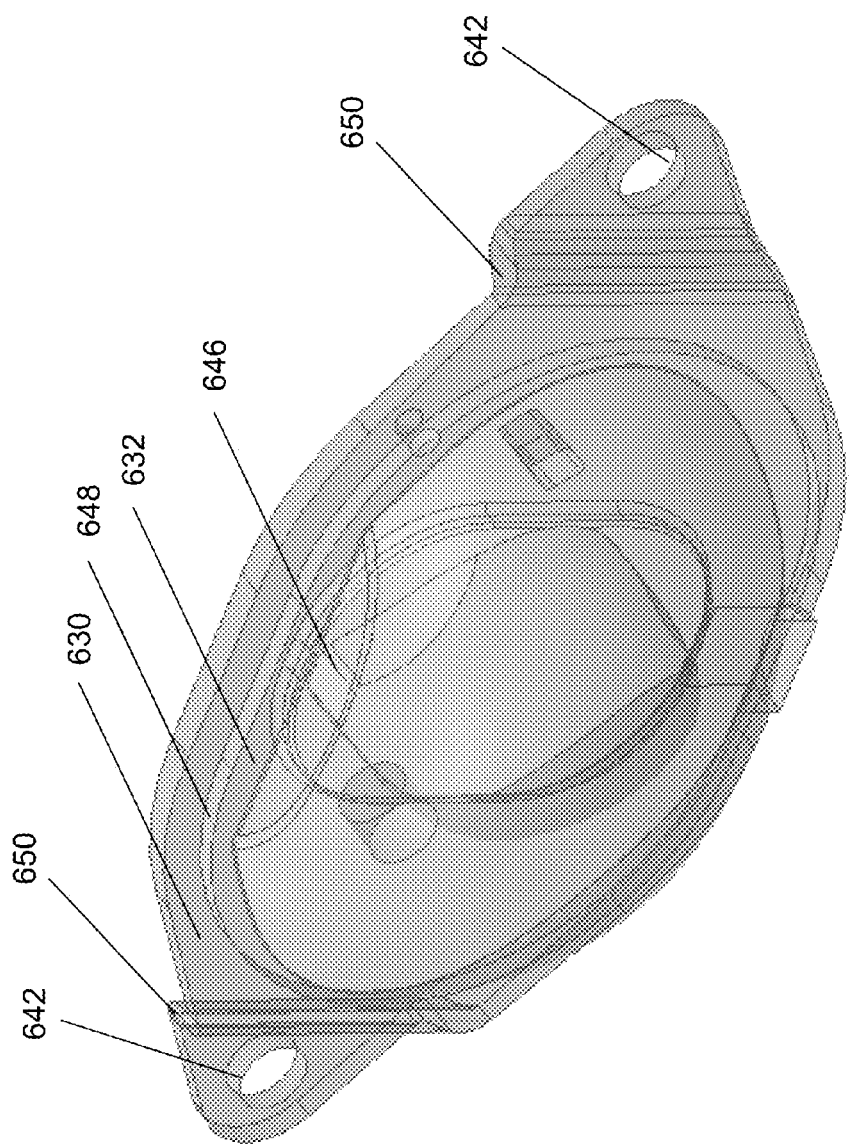
FIG. 6I illustrates a front perspective view of the optic.

As discussed above, the optic may be used in the notification device. Examples of the optic are illustrated in FIGS. 6C-I, 7A-B, 8A-C, 13, 17A-B, 19A-B and 21A. FIG. 6G illustrates a front view of the optic, FIG. 6H illustrates a bottom view of the optic, and FIG. 6I illustrates a front perspective view of the optic.

The optic 604 is configured to work in combination with one or more LEDs in order for the light to have a predetermined distribution. More specifically, the light, after emission through the optic installed at a certain angle below the vertical plane, such as 25° below the vertical plane (see FIGS. 6C-D), has a distribution at least as much as listed in FIGS. 4A and 4C. In this regard, the optic is shaped on the interior portion (e.g., when installed the surface of the optic closer to the LEDs) and/or on the exterior portion to generate the desired light distribution.

The optic 604 further includes one or more structures in order to accomplish one or both of the following objectives: correctly position the optic relative to the LED PCB 608; and correctly secure the LED PCB 608 to the notification device (such as to front housing 610 illustrated in FIG. 6A). The optic 604 includes one or more holes 642 configured to receive one or more screws, bolts or fasteners. The optic 604 may be placed on top of housing 610 (illustrated in FIG. 6A) and screws may be screwed through hole 642, and through hole 625 on front housing 610 to affix optic 604 to front housing 610. In this regard, when optic 604 is affixed to front housing 610, LED PCB 608 may be pressed against front housing 610 (shown in exploded view in FIG. 6A). Further, the optic 604 includes one or more keys configured for proper orientation of the optic 604. For example, FIGS. 6G and 6H illustrate posts 636 and 638. In one embodiment, posts 636 and 638 are in line with holes 642, as illustrated by dotted line 644.

Posts 636, 638 may act as locating structure configured to properly position or locate optic 604 in notification appliance. As shown, post 636 has a diamond shaped cross-section and post 638 has a circular shaped cross-section. In addition, LED PCB 608 includes slots or openings (one opening with a diamond shape to receive post 636 and one opening with a circular shape to receive post 638). In this regard, posts 636 and 638 ensure that the optic is in the proper orientation. More specifically, the optic 604 may be configured in a first orientation and a second orientation 180° from the first orientation. The posts 636 and 638 may be used to ensure a proper orientation. More specifically, in the event an operator attempts to install the optic 604 in an improper orientation (e.g., 180° out of alignment), the posts 636 and 638 will not fit properly into LED PCB 608, thereby indicating that the selected orientation is not proper.

In addition, one or both of posts 636 and 638 may perform functions other than proper orientation. In one embodiment, one or both of posts 636 and 638 may be used as a light guide. In one more specific embodiment, one or both of posts 636 and 638 may be in light communication with at least another part of the notification appliance. More specifically, one or both of posts 636 and 638 may guide light generated from strobe LED(s) back to main PCB 614. As discussed in more detail below, the light from the strobe LED(s) may be sensed by a circuit element on main PCB 614 in order to determine whether strobe LED(s) are operating correctly. In another more specific embodiment, one or both of posts 636 and 638 may guide light generated from a light source (such as a communication LED) on main PCB 614 to the optic. As discussed in more detail below, the optic may be used for multiple purposes, such as for shaping the light generated by the strobe LED(s), and also for outputting light from a communication LED. The communication LED may reside on main PCB 614, and transmit its light via a light pipe and via the post so that the light from the communication LED is visible by a technician viewing the optic. This is, for example, illustrated in FIG. 8C, in which posts 636 or 638 may guide light generated from strobe LED to a light pipe 704 or 802, and may also guide light generated by a communication LED to optic 700 or 800.

Optic 604 may further include gate 640. As discussed in more detail below, gate 640 may be used to locate optic with respect to LED PCB 608 (see FIG. 6J). Similar to posts 636 or 638, gate 640 may guide light to (or may receive light from) main PCB 614. For example, gate 640 may guide light generated from strobe LED(s) back to main PCB 614. As another example, gate 640 may receive light generated from a light source (such as a communication LED) on main PCB 614 to the optic.

As discussed above, the optic is configured to shape the light generated from the LED array into a light output distribution with at least a predetermined pattern. In this regard, a first optic may be used to shape the light output from a first LED array and a second optic may be used to shape the light output from a second LED array. For example, a 2×1 LED array may be mounted on the LED PCB (with 2 LEDs in a line). As another example, a 2×2 LED array may be mounted on the LED PCB (with 4 LEDs arranged in a square shape).

In one embodiment, the general shape of the optic (e.g., the footprint of the optic) used in combination with a first LED array is the same as the general shape of the optic used in combination with a second LED array. In the example given, the footprint of the optic for use with the 2×1 LED array is generally the same as the footprint for the optic for use with the 2×2 LED array. However, the optic used with the first LED array is different from the optic used with the second LED array in at least one aspect, such as the interior surface or the exterior surface. In the example given, the optic for the first LED array may have a different racetrack 632 or flange 630. In one embodiment, for example, the racetrack 632 for the optic for use with the 2×1 LED array is wider than the racetrack 632 for the optic for use with the 2×2 LED array. Similarly, the gate 640 for the optic for use with the 2×1 LED array is longer than the gate 640 for the optic for use with the 2×2 LED array.

Given that there are multiple optics with the same footprint, there is a possibility that the wrong optic may be installed. In the example given, an optic designed for installation with a 2×1 LED array may be mistakenly installed with a 2×2 LED array. To avoid a mistaken installation of the wrong optic, a key 634 may be used. The key 634 may have a companion opening with the LED PCB. For example, an optic designed for installation with a 2×1 LED array may have a key 634 at 2:00 (as illustrated in FIG. 6G). The LED PCB (upon which the 2×1 LED array is installed) may likewise have an opening to receive the key 634 on the optic. As another example, an optic designed for installation with a 2×2 LED array may have a key at 10:00. The LED PCB (upon which the 2×2 LED array is installed) may likewise have an opening to receive the key on the optic.

The optic thus may be used to seal one or more parts of the notification appliance. In one way, the optic may be used to press LED PCB 608 against front housing 610. In another way, the optic may be used to seal an opening on escutcheon. As discussed in more detail below, a part of the optic, such as racetrack 632, may be used to seal an underside of escutcheon.

Figure 6J:
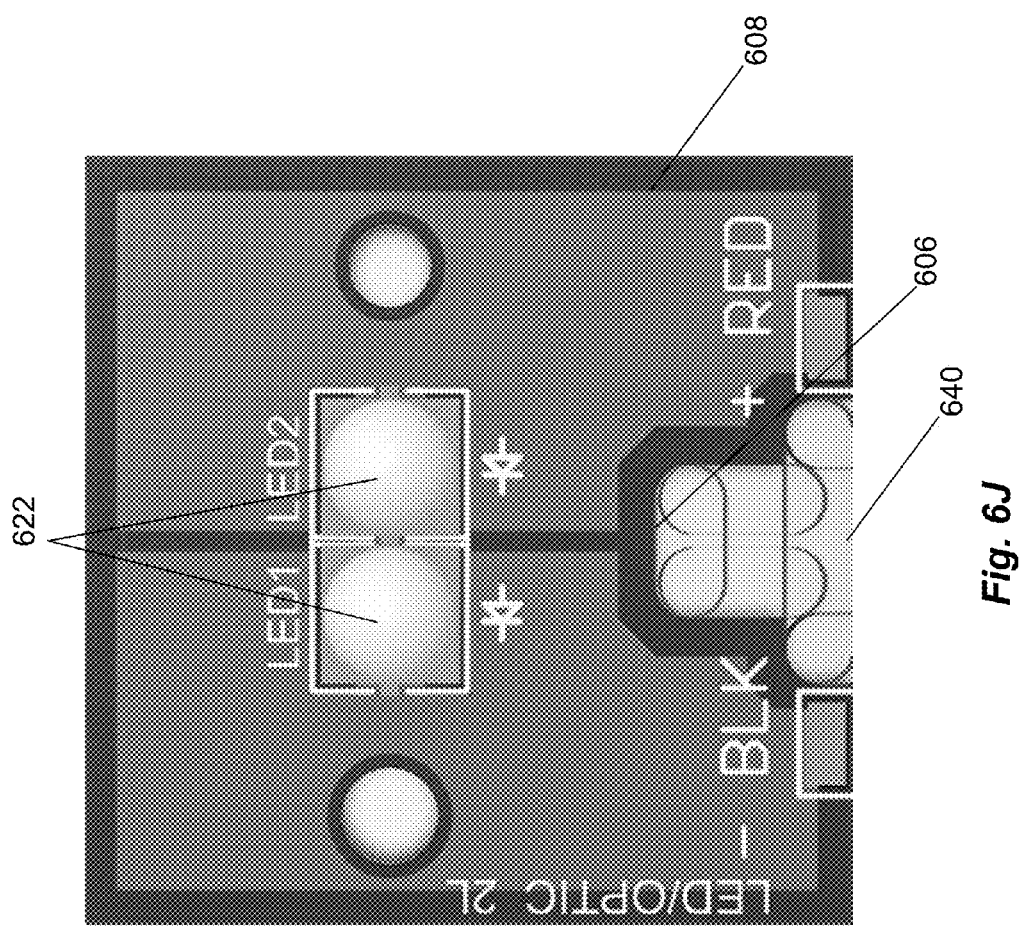
FIG. 6J illustrates the LED printed circuit board (PCB) and parts of the optic.

The optic includes a center portion, through which at least a part of the light generated from the mounted LED(s) is transmitted. Further, when mounted, the center portion of the optic is positioned proximate to and directly above the LED(s) 622 mounted to LED PCB 608. Further, as shown in FIGS. 6G-I, the optic includes a shaped surface on the interior of the optic (i.e., when installed, the surface of the optic closer to the mounted LED(s)) and a shaped surface on the exterior of the optic. At least one of the shaped surfaces, such as the shaped surface on the interior of the optic, may comprise an asymmetrical shape. For example, the center portion of the optic is skewed such that a top portion shape is different from a bottom portion shape. Optic 604 further includes flange 630, racetrack 632, and gate 640. Gate may be configured to abut or mate with a part of the LED PCB 608, such as illustrated in FIG. 6J. In this regard, gate 640 may be used as an alignment guide. Alternatively, or in addition, gate 640 may guide light generated from strobe LED(s) back to main PCB 614 and/or may guide light generated from a light source (such as a communication LED) on main PCB 614 to the optic.

When the escutcheon is mounted to front face 610, flange 630 is configured to seal with an underside of the escutcheon. This is discussed in more detail with respect to FIGS. 10C-D. In addition, it may be desirable that the optic 604 blends with the escutcheon. In this regard, the racetrack 632 may be configured so that it sits flush with an outer side of the escutcheon. To accomplish this, the amount of rise 648 between the flange 630 and the racetrack 632 may be selected such that the flange 630 seals the underside of the escutcheon and such that the racetrack 632 sits flush with the outer surface of the escutcheon.

Optic 604 may include flat surface 646. As discussed above, wall mounted notification appliances have a desired distribution, such as illustrated in FIG. 4D. In order to reduce the light traveling upward, flat surface 646 is used. Flat surface is horizontal with respect to optic 604. When optic is installed, such as illustrated in FIG. 6D, the flat surface is 25° from vertical.

Optic 604 further includes bends 650, 652 which may comprise a curved portion configured to conform to a curve in front housing 610.

As discussed above, the optic may be designed such that the optic's free form surfaces, including the shaped surface on the interior of the optic and/or the shaped surface on the exterior of the optic, may work in combination with the LED axis directed at 25° below the vertical plane. The luminous intensity distribution dictated by the UL specification in the vertical plane, shown in FIG. 4C, has a center weighting that is approximately 20° below the vertical plane. In this regard, if the LED axis is tipped further up or down from the 25° as illustrated, it may result in performance deterioration and may result in the optic thickness becoming too large to be molded.

One or more LED(s) may be housed in the notification device. In one embodiment, a single LED may be housed in the notification device. In an alternate embodiment, multiple LEDs may be housed in the strobe device. The multiple LEDs may be arranged in an array, such as a 2×1 array, a 2×2 array, etc. One example of an LED is Cree XM-L2 LED.

In the embodiment in which multiple LEDs are positioned proximate to one another, the extreme angle rays from either one of the LEDs are incident on the adjacent LED lens dome. This modifies the overall directional output characteristics.

FIG. 6J illustrates LEDs side by side (e.g., 2 LEDs side by side). The side by side LED configuration may be effective because in the horizontal plane where the effective source size is largest the rate of change of illumination is relatively small and in the vertical plane where the rate of change of illumination is much larger the effective source size is relatively small. With regard to horizontal beam distribution, the output of the strobe device that is configured for wall mounting is designed to meet or exceed the UL 1971 specification requirements as illustrated in FIG. 4A. To ensure that the output at 90° meets the required 25% of peak value (see FIG. 4A), some light is directed at angles greater than 90°. This extra coverage is a consequence of the emitting size of the LED. There is also a deliberate excess of light above the requirement at 90° to allow for the effect of positional tolerances which have a greater effect at 90° than on the axis.

Further, optic 604 may be designed to be attached to the strobe device in fixed relation to the one or more LED strobes. Optic 604 has a shaped inner surface, a shaped outer surface, and a predetermined distance between the inner and outer surfaces in order to distribute the light from the LEDs such that the output from the LEDs is at least (or exceeds) the UL 1971 specifications as detailed in FIGS. 4A-D (for wall mounted strobe devices) and in FIGS. 5A-B (for ceiling mounted strobe devices). At least a part of the optic, such as the flange 630 and/or the racetrack 632, may further be configured to act as a seal around the LED(s). The optic may be composed of Polycarbonate or other material with a predetermined refractive index (e.g., a high refractive index) that improves the amount of light that can be gathered by the optic.

Optic 604 in the notification device may be used for a variety of purposes. One purpose may be to channel light from one, or multiple, light generating devices. FIG. 7A illustrates one example block diagram of an optic 700 and multiple light generating devices, such as strobe LED 702 and communications LED 706. Strobe LED 702 and communications LED 706 are different in at least one aspect. For example, strobe LED 702 may be configured to generate a higher light output than communications LED 706 and/or may be configured to generate light in a different frequency spectrum than communications LED 706. More specifically, strobe LED 702 may be configured to generate light output in order to comply with UL Specification 1971. In contrast, communications LED 706 may be used for display only, such as providing a visual indicator indicative of a status of the strobe device. For example, the notification device may be configured to test itself. In response to a determination that a part of the notification device is faulty, the notification device may activate the communications LED 706 in order to provide a visual indication of the fault. As another example, communications LED 706 may blink when the notification device is being polled. An operator visually inspecting various notification devices may readily notice the light generated by the communications LED 706, and in turn recognize that the particular notification device is faulty. In order to assist the operator in noticing the light, the frequency spectrum of the communications LED 706 may be different from the strobe LED 702. For example, the communications LED 706 may output light in the red color frequency range.

Both strobe LED 702 and communications LED 706 may be positioned relative to the optic 700 such that light output from either strobe LED 702 or communications LED 706 may pass through the optic 700. In one embodiment, the light output from strobe LED 702 may be directed at a different portion of the optic than light output from communications LED 706. For example, the light output from strobe LED 702 may be directed to a center portion of the optic 700, and the light output from communications LED 706 may be directed to an off-center portion of the optic 700, such as the gate 640 of the optic.

Figure 7B:
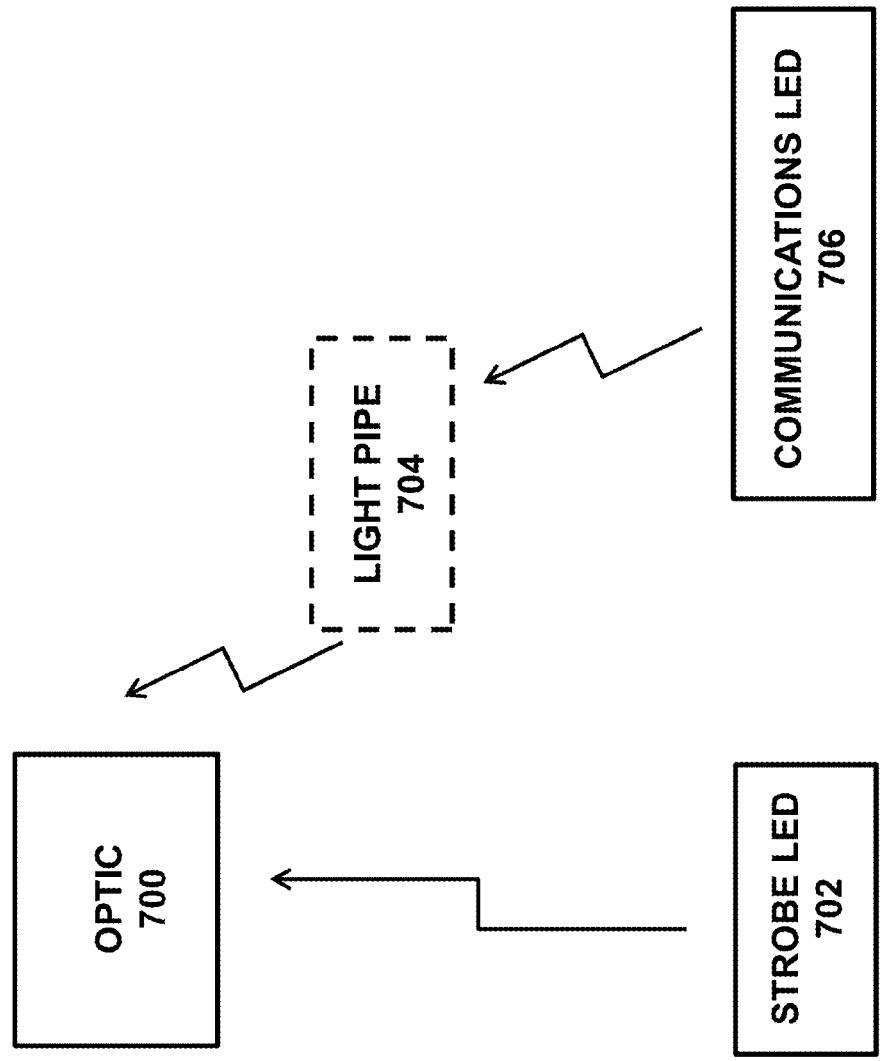
FIG. 7B illustrates another example block diagram of optic, strobe LED and communications LED, and light pipe.

FIG. 7B illustrates another example block diagram of optic 700, strobe LED 702 and communications LED 706, and light pipe 704. In this regard, FIG. 7B differs from FIG. 7A with the addition of light pipe 704. Light generated by communications LED 706 may be channeled to optic 700 using light pipe 704.

Another purpose of the optic may be to channel light to one or more sensors resident in the notification device. Sensor(s) may be used in order to determine various light levels, such as an indication of the amount of light emitted from the strobe LED and/or an indication of the amount of ambient light. In this regard, the optic may be used to transmit light generate by strobe LED and may also be used to channel light to the sensor. FIG. 8A illustrates one example block diagram of an optic 800, strobe LED 702 and sensor 804. As shown, the light from strobe LED 702 may be transmitted to optic 800. Light transmitted from strobe LED 702 is transmitted to optic 800, part of which is reflected back to sensor 804 and another part of which is transmitted through the optic 800.

Figure 8B:
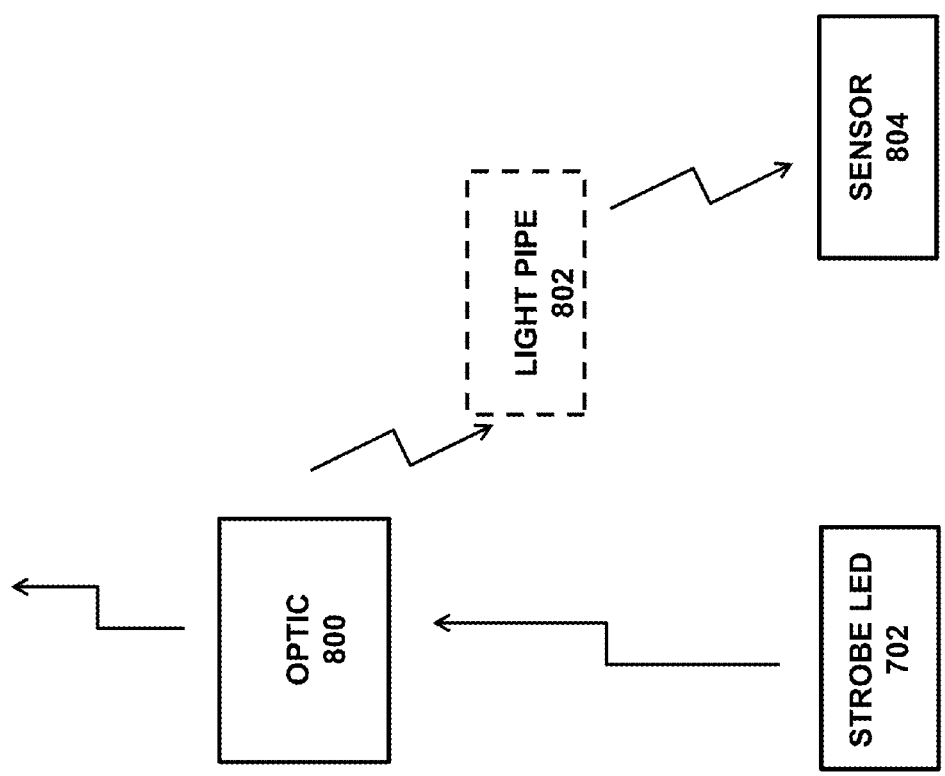
FIG. 8B illustrates another example block diagram of optic, strobe LED, sensor, and light pipe.

FIG. 8B illustrates another example block diagram of optic 800, strobe LED 702, sensor 804, and light pipe 802. In this regard, FIG. 8B differs from FIG. 8A with the addition of light pipe 804. Light reflected from optic 800 may be channeled to sensor 804 using light pipe 702.

Figure 8C:
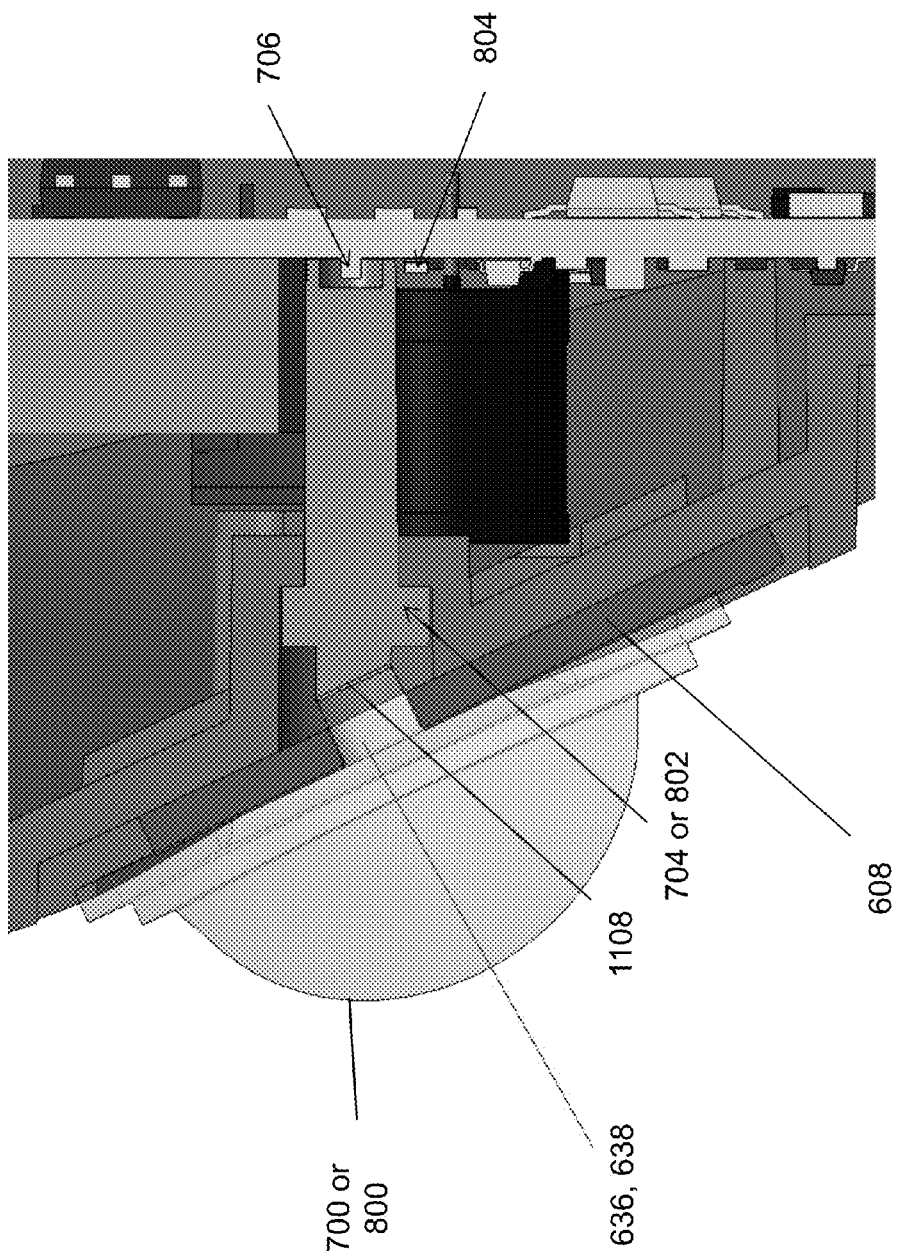
FIG. 8C is a cross-sectional view illustrating the optic, the light pipe, the communications LED and sensor.

FIG. 8C is a cross-sectional view illustrating the optic 700 or 800, the light pipe 704 or 802, the communications LED 706 and sensor 804. In one embodiment, the light pipe 704 or 802 may be used for a single purpose. For example, the light pipe 704 or 802 may be used to channel light generated from the communications LED 706 to optic 700. As another example, the light pipe 704 or 802 may be used to channel light reflected from optic 800 to sensor 804. Alternatively, the light pipe 704 or 802 may be used for multiple purposes. For example, the light pipe 704 or 802 may be used for both channeling light generated from the communications LED 706 to optic 700 or 800 and for channeling light reflected from optic 700 or 800 to sensor 804.

Figure 9A:
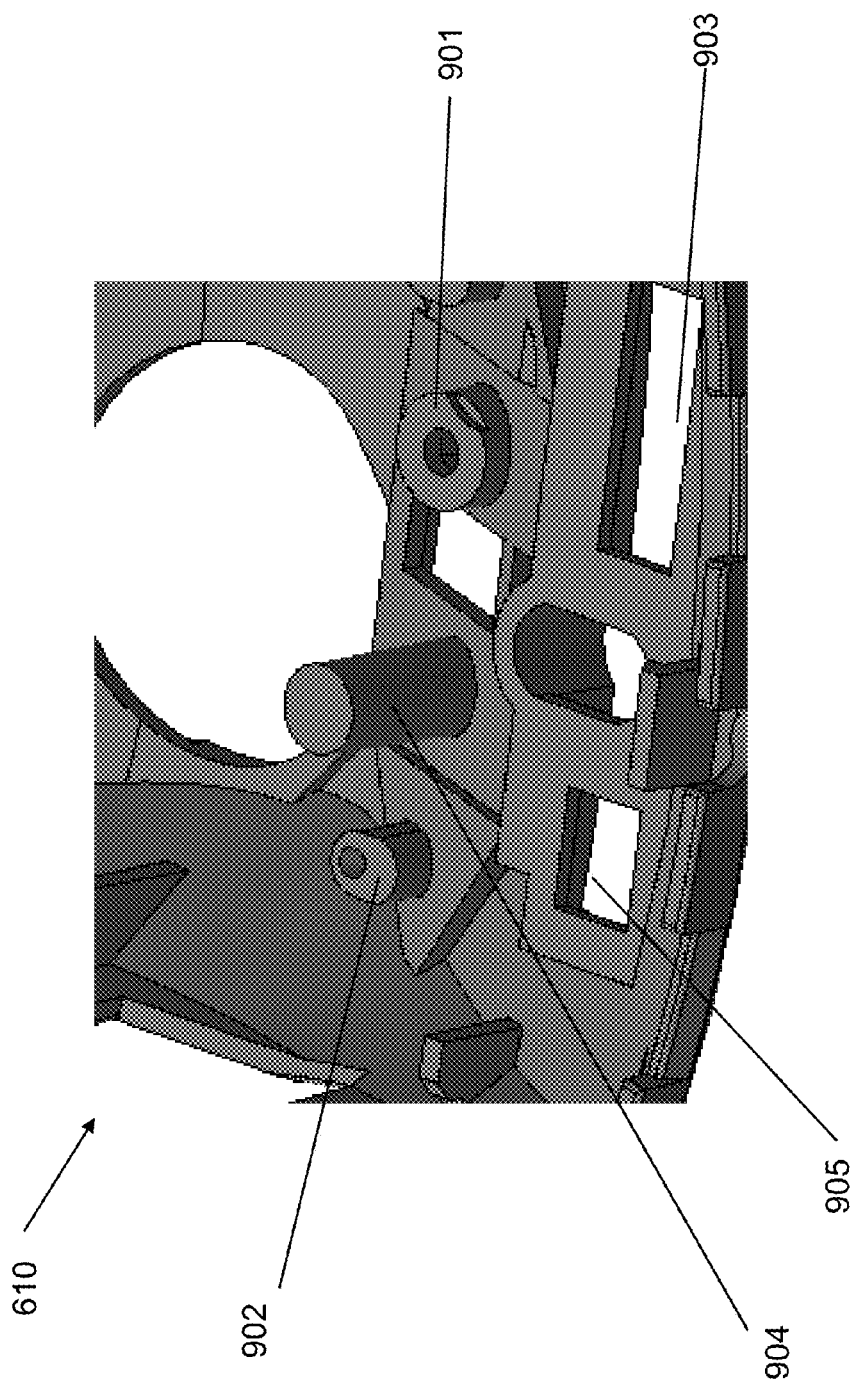
FIG. 9A illustrates an underside of the front housing of the notification device, illustrated in FIG. 6A.

FIG. 9A illustrates an underside of the front housing 610 of the notification device. As discussed above with regard to FIG. 6A, the notification appliance may include front housing 610. The underside of front housing 610 may include a post 904. The post 904 may provide structural support for front housing 610. Post 904 is configured to contact (or nearly contact) a part of main PCB 614. For example, post 904 is configured to contact at point 613 on main PCB 614, thereby touching at least a part of main PCB 614. As another example, when front housing 610, main PCB 614, and back cover 616 are connected, post 904 is configured to be proximate to point 613. In this regard, if excessive pressure is applied to main PCB 614 (such as by excessive force applied to wire connecting mechanism 618 opposite to point 613), post 904 may provide additional structural support to main PCB 614. Point 613 is inside four pins 615 on main PCB 614 (such as geometrically in the center of the four pins 615). Four pins 615 are used to connect wire connecting mechanism 618 (e.g., the terminal block) to main PCB 614. In use, pressure will be applied to wire connecting mechanism 618. Thus, since post 904 abuts one side of main PCB 614, the opposite side of which resides the wire connecting mechanism resides. In this regard, post 904 may provide additional structural support when pressure is applied to main PCB 614. Likewise, post 904 may provide support from pressure applied via the front face of the notification appliance. As discussed above, the front face of the notification appliance may include one or more elements through which to input information. For example, the elements may comprise switches or the like, such as illustrated in FIG. 13A. In this regard, the operator may apply force to the front face of the notification appliance when manually setting the switches. The post 904 may provide the additional structural support to withstand the operator's pressure applied to the front face.

The underside of the front housing 610 may further include a slot 902 which may receive a light pipe, such as light pipe 704, 802. Also, the underside of the front housing 610 may further include slot 901 for light pipe (FIG. 11B illustrates light pipe 1100 being inserted into slot 901). Slot 902 comprises a screw receptacle in which a screw, such as screw 602 in FIG. 6A, is inserted through hole 642 of optic and is mounted into slot 902.

FIG. 9A further illustrates holes 903, 905. When front housing is connected to main PCB 914 and/or back cover 616, at least a part of the electronics on main PCB 914 may be accessible via holes 903, 905. In one embodiment, the electronics may comprise manually configurable input devices (such as switches or the like). FIG. 13A illustrates examples of manual configurable input devices 1302, 1304.

Figure 9B:
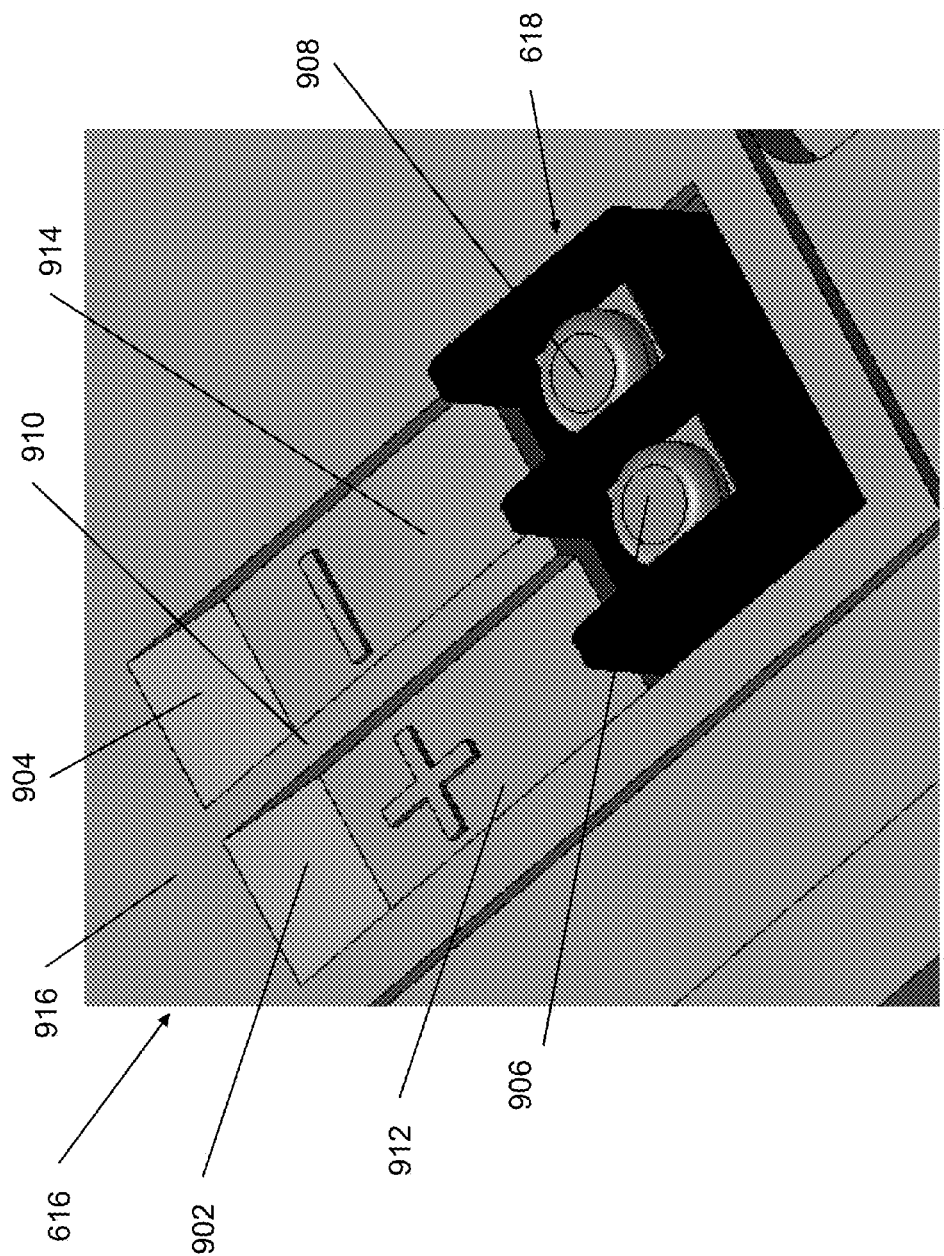
FIGS. 9B and 9C illustrate different views of wire connecting mechanism on the back cover of the notification device, illustrated in FIG. 6A.
Figure 9C:
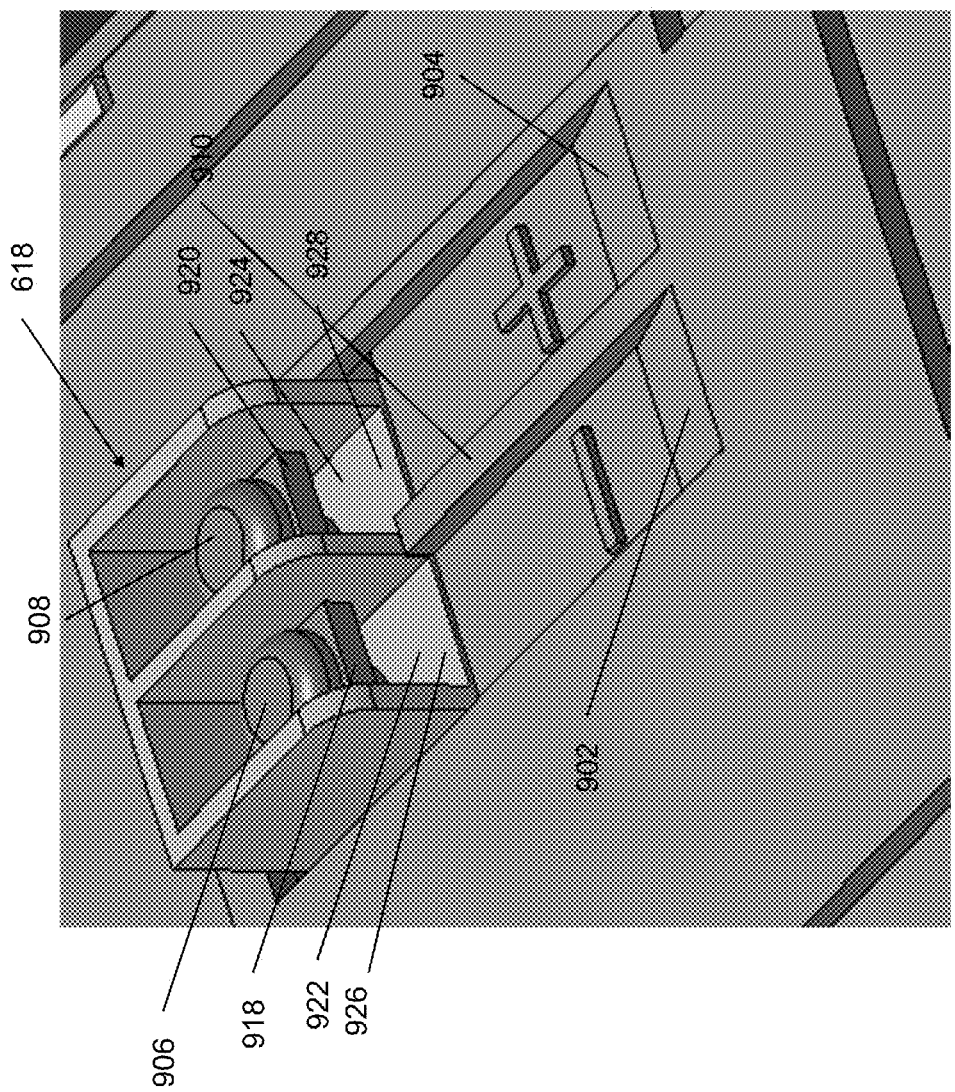

FIG. 9B illustrates a first view of wire connecting mechanism 618 on the back cover 616 of the notification device, illustrated in FIG. 6A. FIG. 9C illustrates a second opposing view of wire connecting mechanism 618 on the back cover 616 of the notification device. In one embodiment, wire connecting mechanism 618 may be part of main PCB 614. In this regard, when main PCB 614 is connected to back cover 616, wire connecting mechanism 618 is pushed through hole 654 of back cover 616. Main PCB 614 may include one or wire connecting mechanism 618 in which wires may be connected. One example of wire connecting mechanism comprises a terminal block. The wire may be held within the terminal block by the tightening of a screw. The wire may be wrapped directly under the head of a screw or may be held by a metal plate forced against the wire by a screw.

FIGS. 9B-C illustrate wire connecting mechanism 618 in which two separate wires may be connection. Alternatively, wire connecting mechanism 618 may be configured with a single slot for insertion of only a single wire, or may be configured with a plurality of slots for insertion of multiple wires, such as 2 slots for insertion of two wires (see FIGS. 9B and 9C), 3 slots for insertion of three wires, etc. Wire connecting mechanism 618 includes screws 906, 908, which may be turned (such as turned counter-clockwise) in order to enable the sliding of a wire into hole (illustrated in FIG. 9D). Upon insertion of the wire into the hole, the screw 906, 908 may be turned (such as turned clockwise) in order to press the screw against the inserted wire. In this regard, electrical contact with the inserted wire may be made.

Figure 9D:
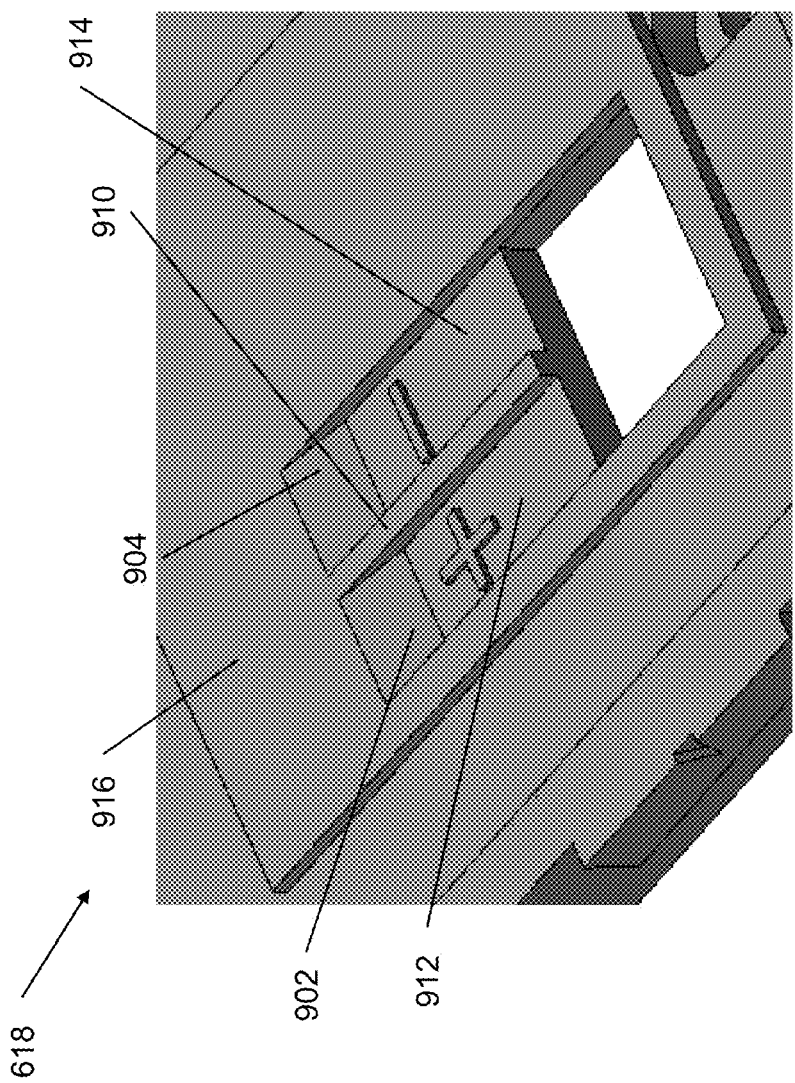
FIG. 9D illustrates the back cover of the notification device, illustrated in FIG. 6A, with wire connecting mechanism removed.

Insertion of wires into the hole(s) of wire connecting mechanism 618 may be difficult. In one embodiment, back cover 616 may include a ramp and/or a valley may be used in order to assist in the insertion of the wires into hole(s) of wire connecting mechanism 618. More specifically, FIGS. 9B-D illustrate a section of back cover 616 that includes ramps 902, 904, valleys 912, 914, and wall 910. Ramps 902, 904 may provide a gradual decline from an upper surface 916 to the valley 912, 914. In order to ease the insertion, ramps 902, 904 may be used. Further, wall 910 may separate valleys 912, 914 in order to assist in the insertion of a wire into the respective slot.

FIG. 9C illustrates screws 906, 908 unscrewed so that wire connecting mechanism 618 includes holes 922, 924 through which wires may be inserted. After insertion of the wires, screws 906, 908 may be screwed down in order to hold wires in place and maintain electrical contact. As shown in FIG. 9C, bottom 926, 928 of terminal block is level with valleys 912, 914. Thus, there is no bump or obstruction when inserting wires into wire connecting mechanism 618. Alternatively, bottom 926, 928 may be lower than valleys 912, 914.

Figure 10A:
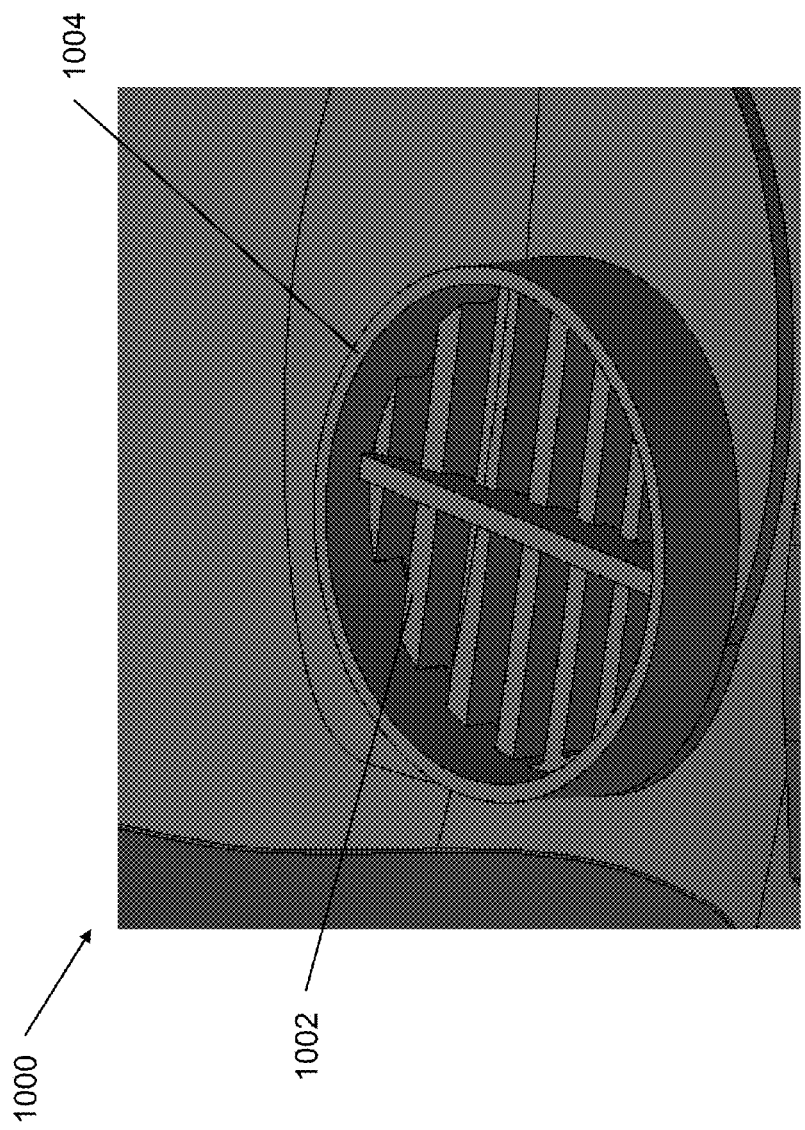
FIG. 10A illustrates a part of an underside of the front housing illustrated in FIG. 6A.

FIG. 10A illustrates a part of an underside of the escutcheon 1000, which is configured to connect with the front housing 610 illustrated in FIG. 6A. The underside of escutcheon 1000 includes a speaker grille 1002 and a raised lip 1004. The speaker grille 1002 is configured to protect the speaker, which is mounted on main PCB 614, from dust or dirt, and may be in a variety of patterns. The raised lip 1004 may be around part, or all, of the perimeter of the speaker grille 1002. As shown in FIG. 10A, the speaker grille 1002 is circular in shape. In this regard, the raised lip 1004 may likewise be circular in shape. Similarly, the speaker grille 1002 may be rectangular in shape, with the raised lip following the rectangular shape.

Figure 10B:
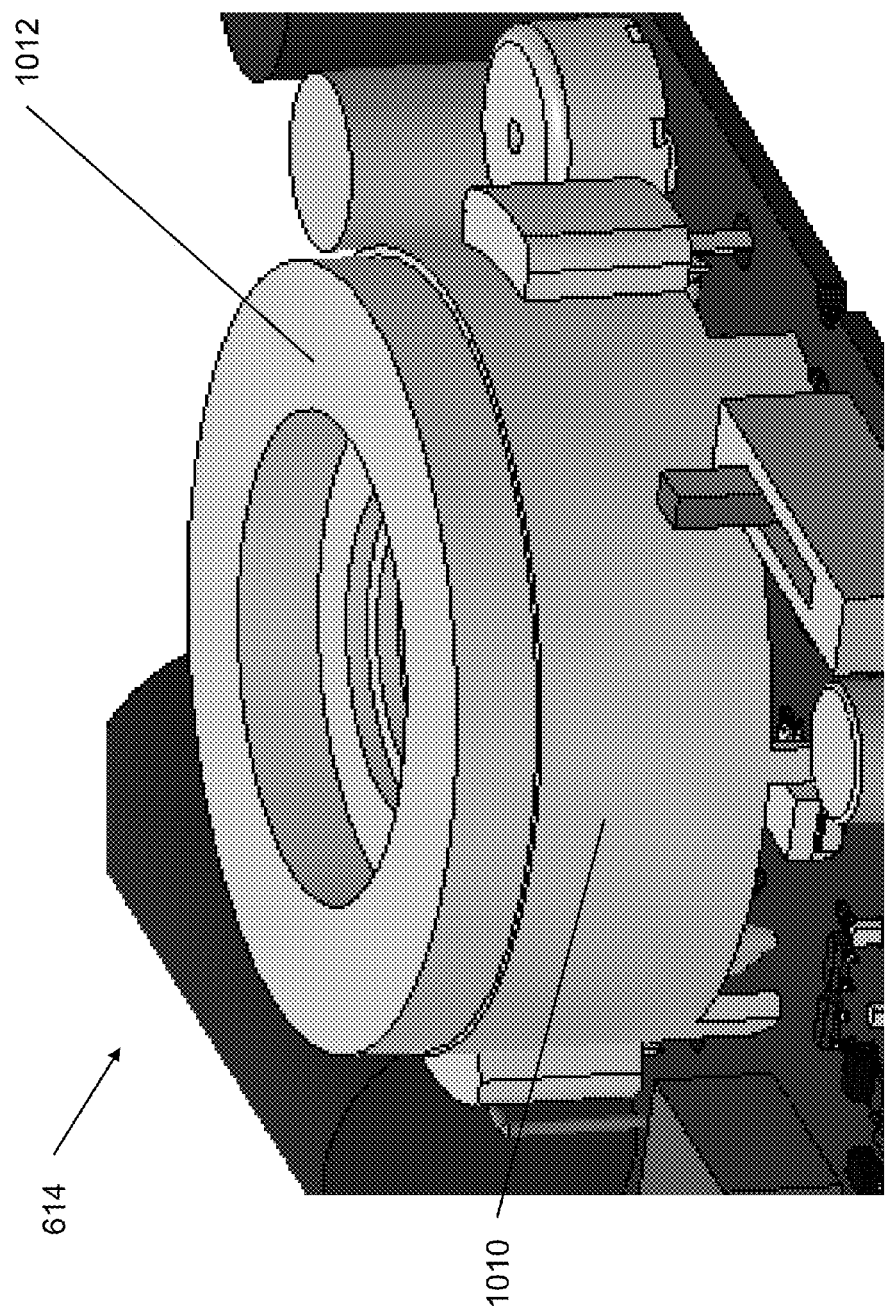
FIG. 10B illustrates a part of the main PCB illustrated in FIG. 6A.

FIG. 10B illustrates a part of the main PCB 614 illustrated in FIG. 6A. As illustrated in FIG. 10B, the speaker 1010 is fitted with a gasket 1012. Gasket 1012 may be composed of rubber or other flexible material. As shown, gasket 1012 covers an entire perimeter of the upper side of speaker 1010. Alternatively, gasket 1012 may cover less than all of the perimeter of the upper side of speaker 1010.

When the escutcheon 1000 attached to front housing 610, the raised lip 1004 may contact the gasket 1012. In this regard, contact between the raised lip 1002 and the gasket 1012 may form a seal, thereby reducing the likelihood of dirt or debris entering an interior of the notification device.

Figure 10E:
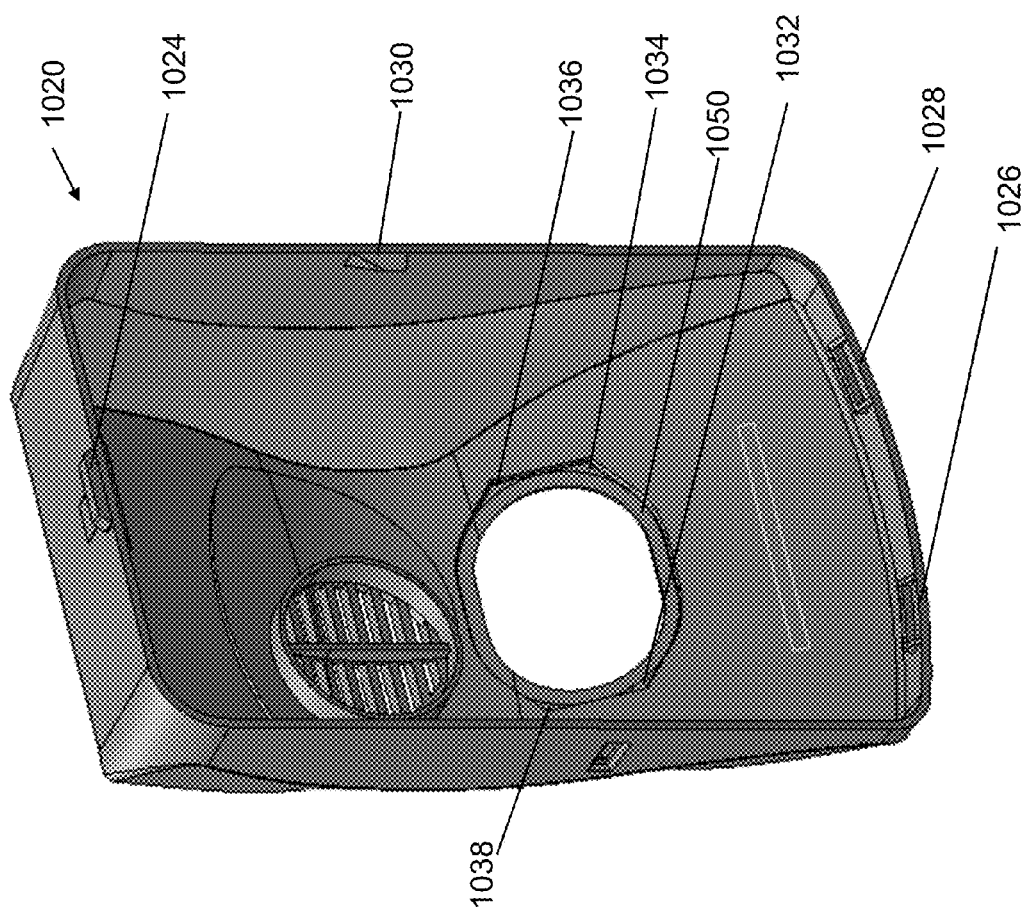
FIG. 10E illustrates an underside of the escutcheon without a gasket.

FIG. 10C illustrates another view of an underside of the escutcheon 1020 with gasket 1022. As discussed above, the escutcheon 1020 is configured for mounting to front housing 610. The underside of the escutcheon 1020 includes gasket 1022. In this regard, the gasket 1022 may act as a shaped piece or ring sealing the junction between the escutcheon 1020 and the optic 604. Gasket 1022 may be composed of rubberized or other type of sealing material. FIG. 10E illustrates another view of an underside of the escutcheon 1020 without gasket 1022. As illustrated in FIG. 10E, the underside of the escutcheon 1020 includes an inset 1050 or cutout in which the gasket 1022 may be seated. In one embodiment, when the gasket 1022 is seated in inset 1050, the gasket is flush with the surrounding area on the underside of the escutcheon 1020. In an alternate embodiment, when the gasket 1022 is seated in inset 1050, the gasket is not flush with the surrounding area on the underside of the escutcheon 1020.

As illustrated in FIGS. 10C and 10E, the inset 1050 includes one or more corners (three of which are illustrated in FIG. 10C as 1032, 1034, and 1036 and four of which are illustrated in FIG. 10E as 1032, 1034, 1036, 1038). The corners may be formed such that a part on the optic other than flange 630 may engage the underside of the escutcheon 1020. More specifically, gasket 1022 may form a seal with flange 630. In addition, corners 1032, 1034, 1036, 1038 may engage with edges 1040, 1042, 1044 of optic 604. In this way, the optic 604 may be held more securely in position by using two different points of contact to optic 604.

In one embodiment, gasket may have a width that matches the width of flange 630 of optic 604. Upon mounting, the gasket contacts a part of the optic 604, such as the flange 630 of optic 604. FIG. 10D illustrates the contact of gasket 1022 with flange 630 of optic 604. The sealing may thus prevent water or the like from entering via the escutcheon opening.

FIG. 10C further illustrates the manner in which the escutcheon 1020 may be attached to the front housing 610. Escutcheon 1020 includes one or more ways in which to be attached to the front housing 610. For example, clasps 1024, 1030 may be used to snap into a part of front housing 610, such as into tabs 649, 651. Further, holes 1026, 1028 may likewise be slotted into or mate with protrusions on front housing 610, such as into tabs 645, 647, 1326. In this regard, the escutcheon 1020 may be connected to the front housing 610 in one or multiple ways.

Figure 11A:
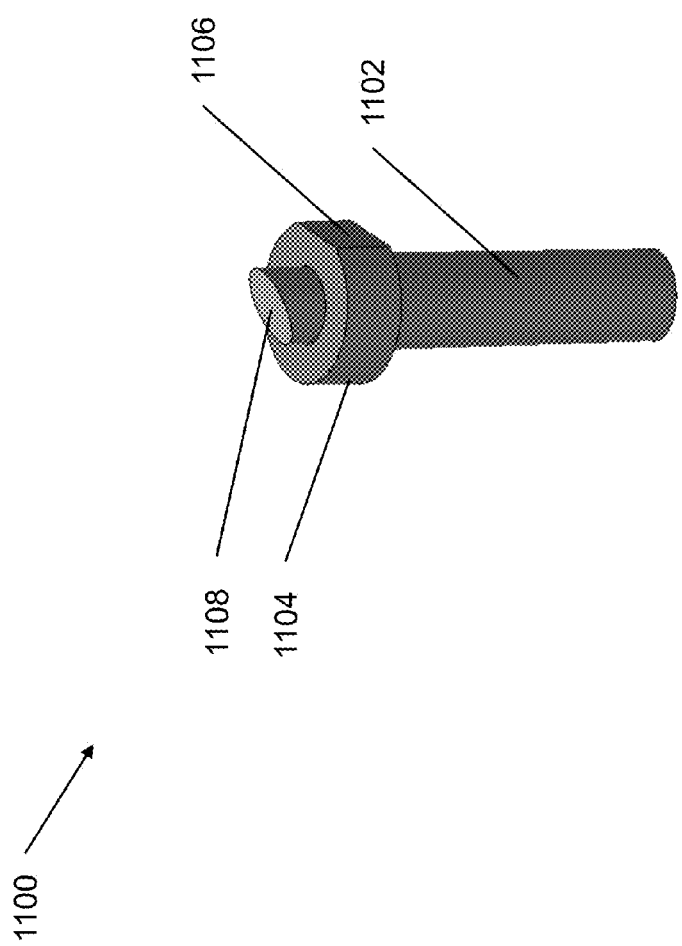
FIG. 11A illustrates a perspective view of the light pipe.
Figure 11B:
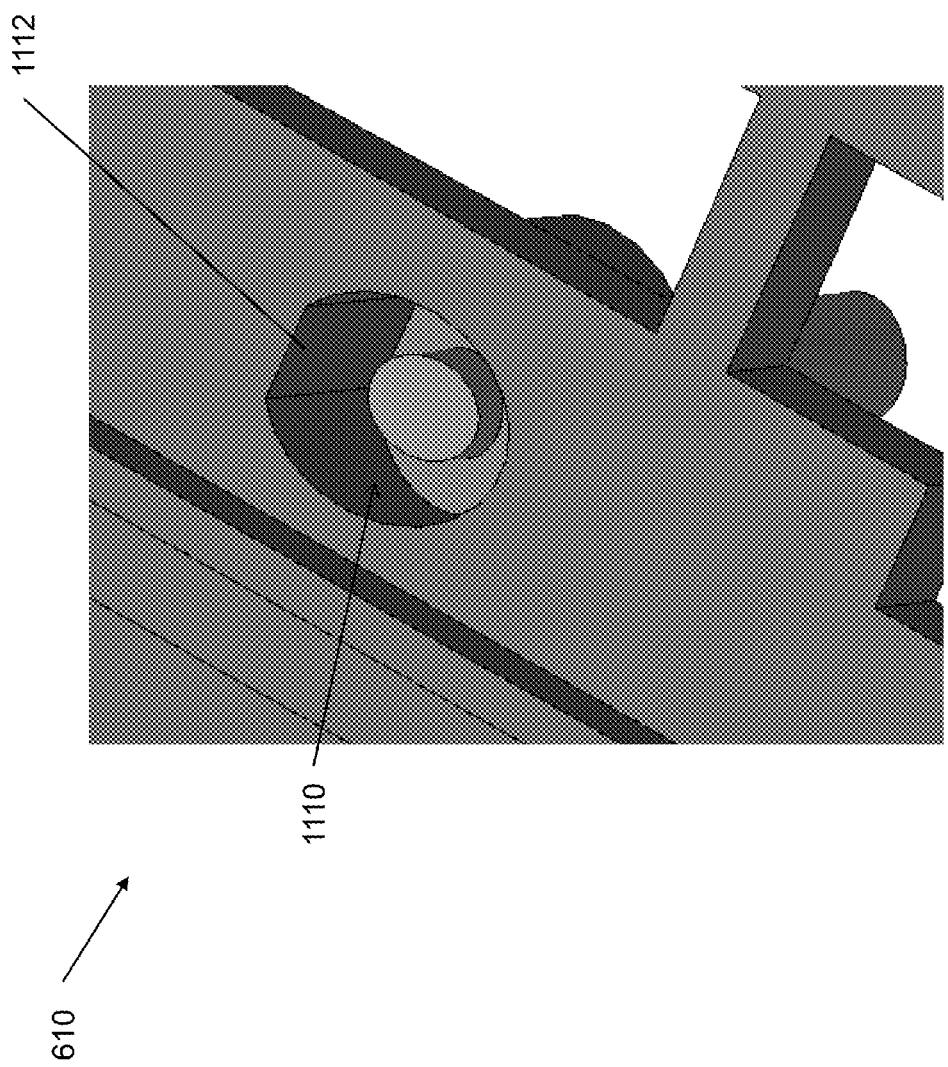
FIG. 11B illustrates light pipe seated in hole of front housing illustrated in FIG. 6A.

FIG. 11A illustrates a perspective view of the light pipe 1100. Light pipe 1100 may be the light pipe 704 illustrated in FIG. 7B or may be the light pipe 802 illustrated in FIG. 8B. As discussed above, the light pipe may serve one function or multiple functions. For example, the light pipe 1100 may be used to channel light generated from the communications LED to an optic and/or may be used to channel light reflected from the optic to a sensor. The light pipe 1100 includes a shaft 1102 through which light is channeled. One end 1108 of the shaft 1102 may angled. The angle of the one end 1108 may be similar, or match the angle of the LED PCB. For example, FIG. 8C illustrates the plane formed by end 1108 is perpendicular to the plane formed by LED PCB.

Further, the light pipe 1100 includes a collar 1104, which may be positioned toward a top of the light pipe 1100. The collar 1104 may be shaped to mate with a part of the front housing 610 of the notification device. For example, the collar 1104 may include one or more sides 1106, which may mate a hole 1110 on front housing 610. FIG. 11B illustrates light pipe 1100 seated in hole 1110 of front housing 610 illustrated in FIG. 6A. As shown, hole 1110 includes a flat face 1112. For installation, the light pipe 1100 may be rotated until the flat face 1106 on collar of light pipe 1100 matches the flat face 1112 of hole 1110. When slotted properly, the end 1108 is parallel to the LED PCB. The shape of the collar 1104 and of hole 1110 are merely for illustration purposes. Other shapes are contemplated such that light pipe 1100 seats properly in hole 1110.

An electrical junction box is a container for electrical connections. The electrical junction box may be used to conceal the electrical connections from sight and to deter tampering. The electrical junction box may be installed in walls or in ceilings, such that the electrical junction box is recessed into the wall or the ceiling or flush with the wall or the ceiling. Electrical junction boxes may vary in size depending on the geographic location. For example, the size electrical junction boxes in the United States may differ from the size of electrical junction boxes in Europe or the Middle East. An example of a single gang electrical junction box for the United States is illustrated in FIGS. 13B-E, discussed below. As shown, the notification appliance is connected at the top and the bottom of the junction box (i.e., at 12:00 and 6:00). However, different types of junction boxes may be configured differently.

Instead of configuring different notification appliances to connect to different junction boxes, a notification appliance may be designed to connect to a single type of junction box (such as the single gang electrical junction box for the United States), and an adapter bracket 1200 may be used so that the notification appliance may be connected to other types of junction boxes. In this regard, rather than connecting the notification device directly to the junction box, an intermediate piece, such as adapter bracket 1200, may be used to connect the notification appliance to the junction box 1210.

Figure 12A:
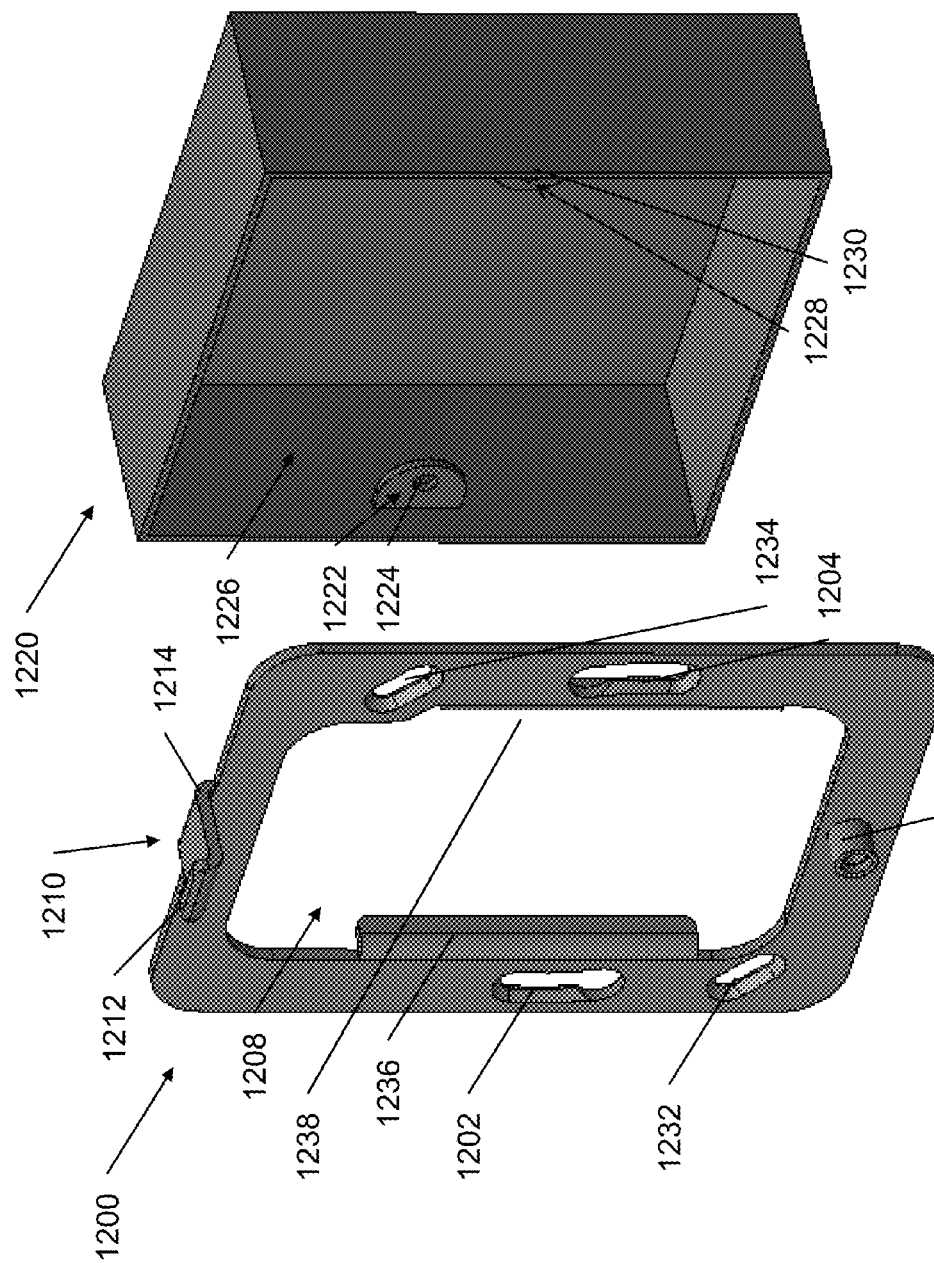
FIG. 12A is an exploded view of the adapter bracket and electrical junction box.
Figure 12B:
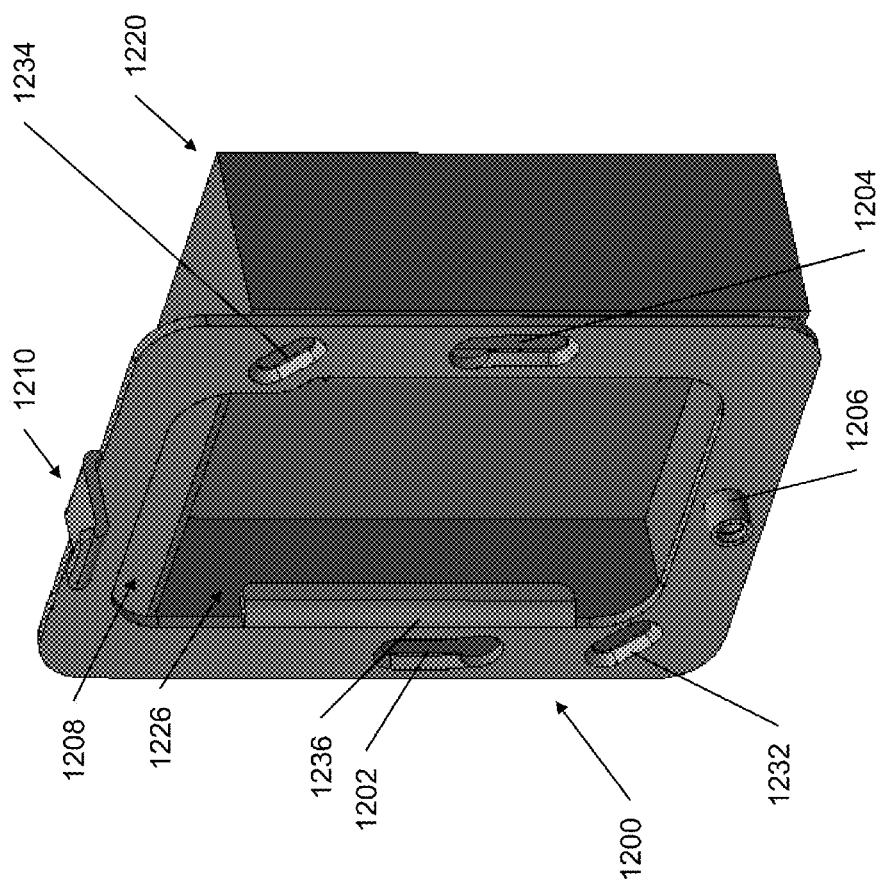
FIG. 12B is a view of the adapter bracket and electrical junction box abutting one another.

Adapter bracket 1200 includes one or more holes that enable connection of the adapter bracket 1200 to junction box 1220. FIGS. 12A-B illustrate one type of junction box 1220, which is rectangular in shape and includes holes 1224, 1230. Other types of junction boxes may have different shapes, such as circular, and may have different placement of holes (such as at 2:00 and 8:00).

Adapter bracket 1200 may include one set of holes to mate with the holes in the junction box. Alternatively, adapter bracket 1200 may have multiple sets of holes in which to mate with the holes in different types of junction boxes. For example, as shown in FIGS. 12A-B, adapter bracket 1200 includes holes 1202, 1204, which match (or nearly match) the size of holes 1224, 1230 on the connection elements 1222, 1228. Holes 1202, 1204 may comprise keyholes for ease of installation. When the adapter bracket 1200 abuts the junction box 1220, such as illustrated in FIG. 12B, screws may be screwed through holes 1202, 1204 and 1222, 1228, respectively. Adapter bracket may further include holes 1232, 1234, which may match (or nearly match) holes for a type of junction box not illustrated in FIGS. 12A-B (in which the holes in the junction box are at 2:00 and 8:00). As shown in FIGS. 12A-B, holes 1232, 1234 are not keyholes. In an alternative embodiment, holes 1232, 1234 may be keyholes.

Adapter bracket 1200 may further include one or more sidebars 1236, 1238. As shown in FIGS. 12A-B, two sidebars 1236, 1238 are shown, which are proximate to holes 1202, 1204. In this regard, sidebars 1236, 1238 may provide additional strength or rigidity to the portion of adapter bracket 1200 near or proximate to holes 1202, 1204. Alternatively, only one sidebar may be included. In still an alternate embodiment, sidebars may be included on each side of adapter bracket 1200.

Junction box 1220 includes an opening 1226. As shown in FIGS. 12A-B, the opening 1226 of the junction box 1220 is rectangular. Alternatively, the opening of the junction box may be square in shape. Likewise, the adapter bracket 1200 includes an opening 1208. As shown in FIGS. 12A-B, the opening 1208 of the adapter bracket 1200 is rectangular. Alternatively, the opening of the adapter bracket may be square in shape. The opening 1208 of the adapter bracket 1200 may be sized differently than the opening 1226 of the junction box 1220. In one embodiment, the opening 1208 of the adapter bracket 1200 has a dimension that is different from a dimension of the opening 1226 of the junction box 1220. In a more specific embodiment, at least one dimension of the opening 1208 of the adapter bracket 1200 is larger than the dimension of the opening 1226 of the junction box 1220. For example, the opening 1208 may be larger in the x-direction, may be larger in the y-direction, or may be larger in both the x-direction and the y-direction. As illustrated in FIGS. 12A-B, the opening 1208 is larger in the y-direction only. Further, a total area of the opening 1208 may be larger than a total area of the opening 1226. Alternatively, the opening 1208 of the adapter bracket 1200 may be smaller than the opening 1226 of the junction box 1220. As discussed in more detail below, the different dimensions of openings 1208, 1226 enables the adapter bracket 1200 to install notification appliances with different types of junction boxes.

In one embodiment, adapter bracket includes two different types of connection elements by which to connect the notification appliance to the adapter bracket. For example, adapter bracket 1200 includes standoff 1206, which may be a threaded standoff through which a screw may be inserted, and tab 1210, using which the notification appliance may be hooked to the adapter bracket 1200. Standoff 1206 may be a through-hole or a raised screwhole. In one embodiment, standoff 1206 is mounted on a solid part of bracket. Alternatively, standoff 1206 is mounted on a hole so that a screw may be screwed through standoff 1206 and into junction box 1220.

With regard to standoff 1206, a part of the notification appliance, such as back cover 616, may likewise include a hole. A screw may be inserted through the hole on the back cover 616, and through standoff 1206 in order to attach the notification appliance to the adapter bracket 1200 (and in turn to junction box 1220). Alternatively, instead of attaching a part of the notification appliance to standoff 1206 of adapter bracket 1200, the hole (or holes) on the back cover 616 may be positioned such that the hole (or holes) line up with holes 1202, 1204 and 1222, 1228. In this regard, the screws may pass through each of the holes on the back cover 616, through holes 1202, 1204 on adapter bracket 1200, and through holes 1222, 1228 on junction box 1220.

Adapter bracket 1200 further includes tab 1210. Tab 1210 may have at least one curved portion. As shown in FIGS. 12A-B, tab 1210 includes two curved portions 1212, 1214. In this regard, the tab may engage a hole on a back part of the notification appliance, such as a hole (or other opening) on the back cover 616 of the notification appliance. In a specific embodiment, the hole on the back cover 616 of the notification appliance may comprise a keyhole opening. When the tab, with its one or more curved portions, is engaged in the hole of the notification appliance, the tab acts to hook the hole, resulting in one or both of the following: the tab at least partly supports or holds up the notification device; and the tab reduces the possibility that the notification appliance can be pulled away from the wall or ceiling.

In practice, the notification appliance may be hooked to adapter bracket 1200 using tab 1210. After which, one or more screws may be used to attach the notification appliance to the adapter bracket 1200 (such as inserting a screw through standoff 1206). In this regard, in one embodiment, only a single screw is needed for attachment of the notification appliance to adapter bracket 1200. Further, there may be instances where it is inadvisable to have the screw, which engaging standoff 1206 does not enter an interior of the junction box. In this regard, the single screw, when engaged in standoff 1206, is not inserted into an interior of the junction box since the screwhole is raised. Alternatively, in the event that a hole (instead of a standoff 1206 is used), when a screw is screwed through the hole, the screw is inserted into an interior of the junction box. As discussed above, the junction box 1220 may be installed flush with the wall or ceiling. Thus, in instances where the notification appliance is larger than the opening of the junction box, the adapter bracket enables the insertion of the single screw, which is in the interior of the junction box. Further, tab 1210 does not require an additional screw, thereby avoiding inserting a screw into the wall or ceiling outside of the junction box 1220.

The adapter bracket 1200 may sit flush between the junction box 1220 and the backside of the notification appliance. In this regard, the adapter bracket may be inconspicuous when the notification appliance is installed. Further, a gasket may be used to seal the backside of the notification appliance in order to weatherproof the notification appliance.

As illustrated in FIGS. 12A-B, a single junction box is shown. Alternatively, there may be multiple junction boxes, such as two junction boxes abutting one another, four junction boxes abutting one another in a square configuration, etc.

FIG. 13A illustrates the notification device 1300 without the escutcheon, which may include front housing 610, optic 604, LED PCB 608, input devices 1302, 1304, speaker 1306, and keyhole openings 1308, 1310. The input devices 1302, 1304 may be manually configurable. For example, the input devices 1302, 1304 may comprise manual switches (e.g., 2 position switches) in order for a technician to configure the notification device. As illustrated in FIG. 13A, the number of switches for input device 1302 is different than the number of switches for input device 1304. Alternatively, the number of switches for input device 1302 may be the same as the number of switches for input device 1304. In one embodiment, input device 1302 may be for input of the address of the notification device, and input device 1304 may be for input to configure the audio output, in the event that the notification appliance includes an audio output, such as a horn. In this regard, the controller of the notification device may poll both of input device 1302, 1304 in order to determine the address and the audio configuration of the notification device, respectively. Thereafter, the address and the audio configuration of the notification device may be stored in a memory within notification device and/or may be transmitted external to the notification device (e.g., to a fire alarm control panel responsive to a command from the fire alarm control panel querying the notification device).

The speaker 1306 may be positioned in one of several places in the notification device. As one example, the speaker 1306 may be positioned off-center from the front housing. More specifically, the speaker 1306 is shown in FIG. 13A as being off-center in the X-direction. As another example, the speaker 1306 may be positioned out of alignment with respect to the positioning of the LEDs 622 on LED PCB 608. More specifically, the LEDs 622 on LED PCB 608 are shown as being centered in the X-direction, whereas the speaker 1306 is shown in FIG. 13A as being off-center in the X-direction.

Front housing 610 may further include holes, such as keyholes 1308, 1310. In one embodiment, keyholes 1308, 1310 may be in different orientations (such as keyhole 1308 being disposed horizontally and keyhole 1310 being disposed vertically). In an alternate embodiment, keyholes 1308, 1310 may be a same orientation (such as keyholes 1308, 1310 both being disposed horizontally or both being disposed vertically). Screws 1312, 1314 may thus be inserted through keyholes 1308, 1310 to connect to the junction box. In this regard, in addition to connecting front housing 610 to back cover 616 (discussed above), front housing 610 may likewise be connected to junction box via screws 1312, 1314. More specifically, front housing 610 may be squeezed or forced against junction box using screws 1312, 1314, which may provide structural support separate from attaching housing to back cover 616. More specifically, screws 1312, 1314 may press the front housing 610 against one or both of main PCB 614 or back cover 616. Further, in one embodiment, connection of main PCB 614 to back cover 616, such as via 635, 637, 639, may be considered temporary or sufficient only until installation of the notification appliance to the junction box via screws 1312, 1314. Screws 1312, 1314, pressing the notification appliance together (including pressing front housing 610 against main PCB 614 onto back cover 616), may thus hold various parts within the notification appliance (such as main PCB 614) more permanently.

Figure 13B:
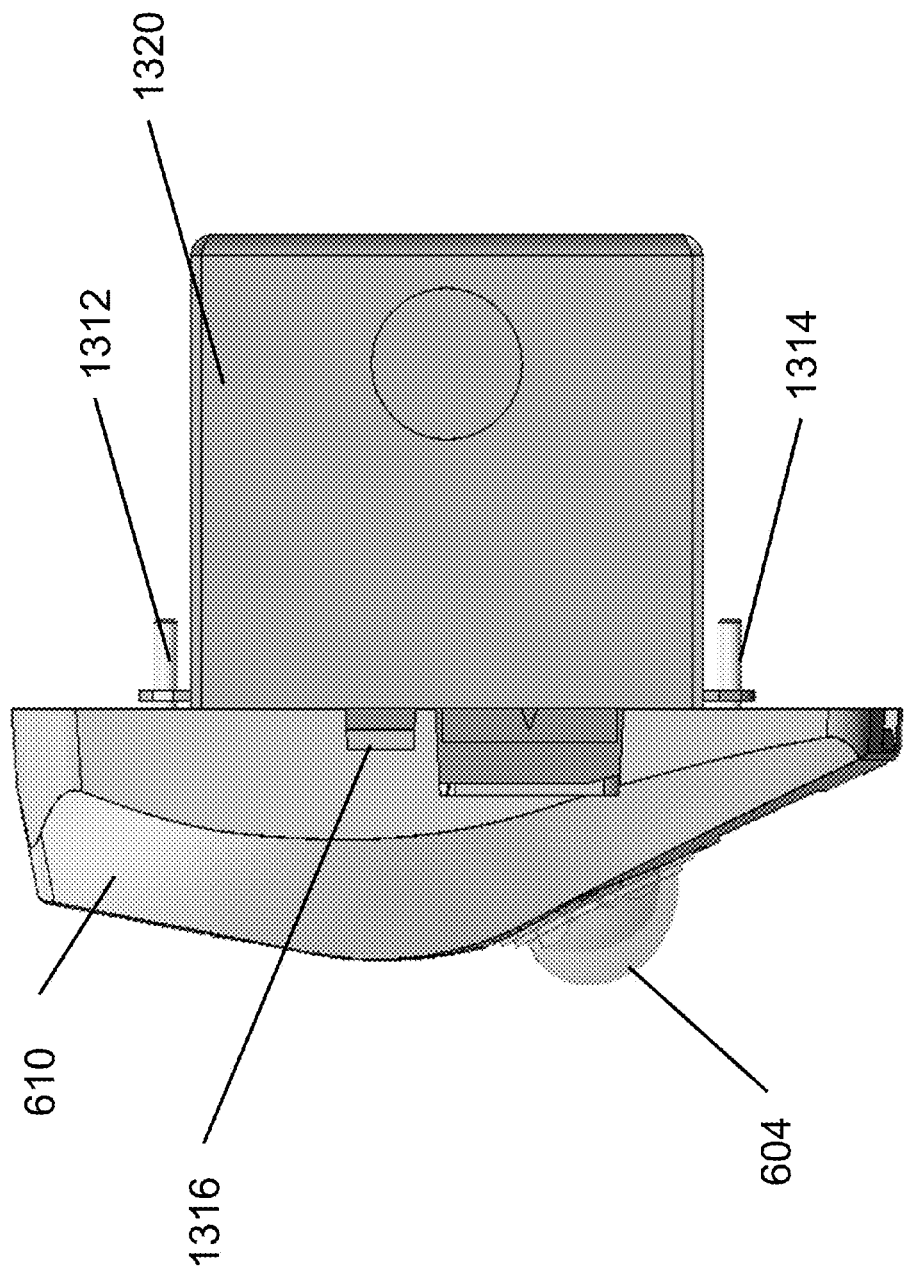
Figure 13C:
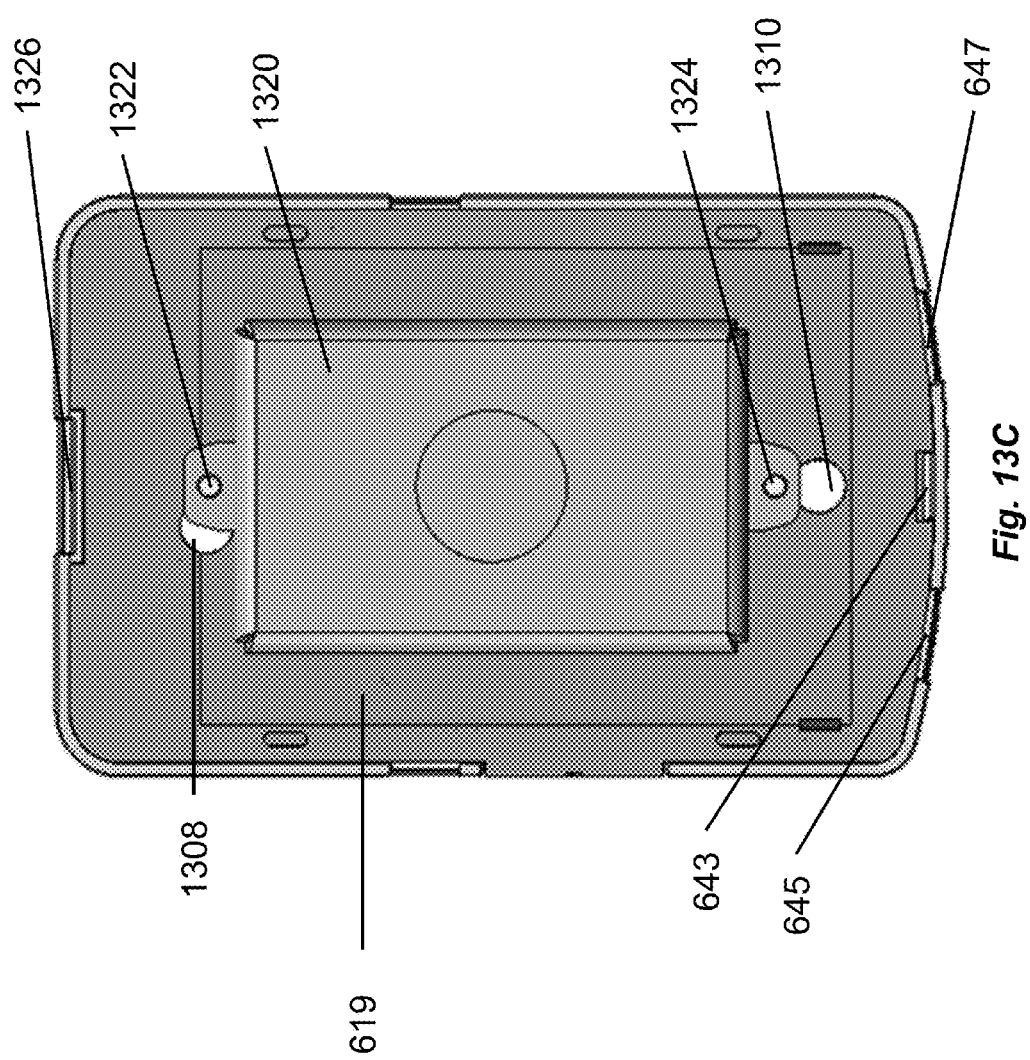
Figure 13D:
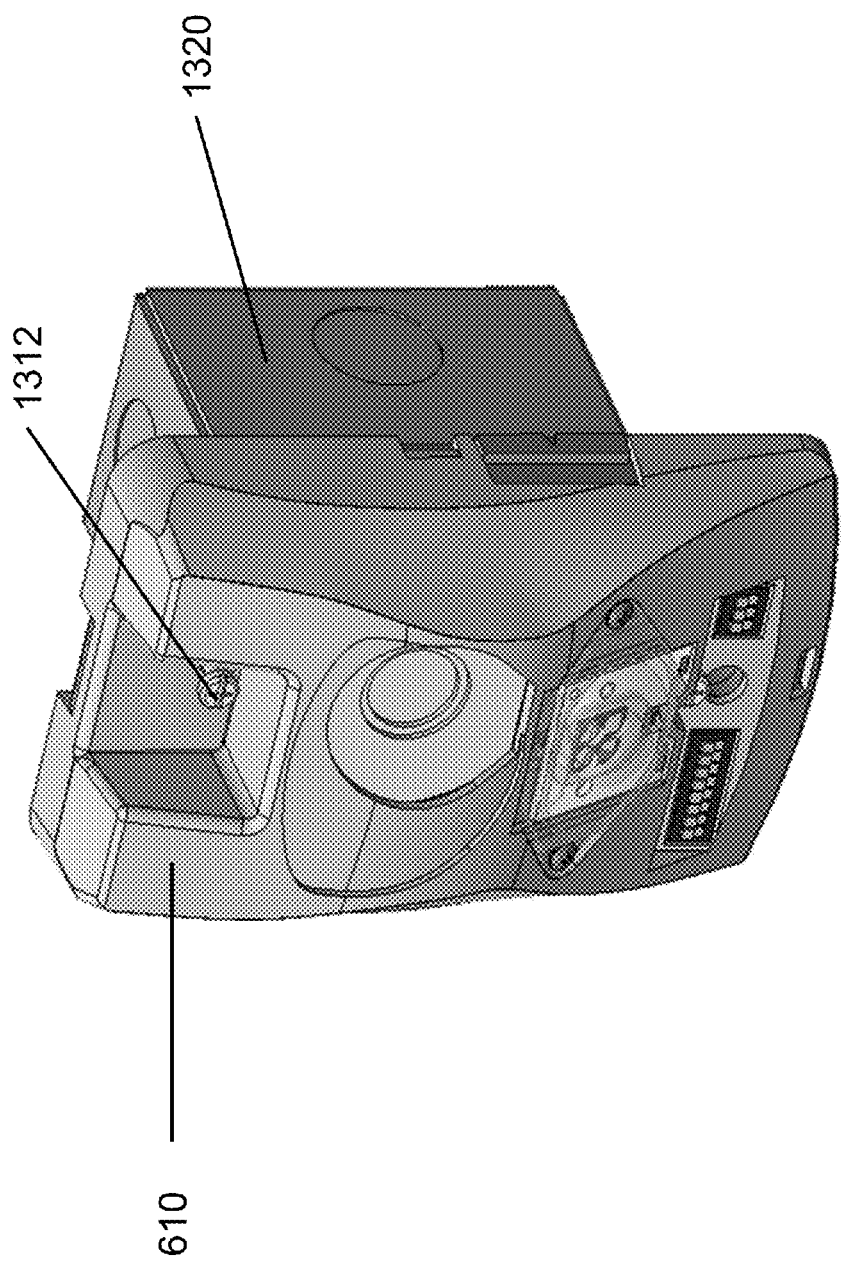
Figure 13E:
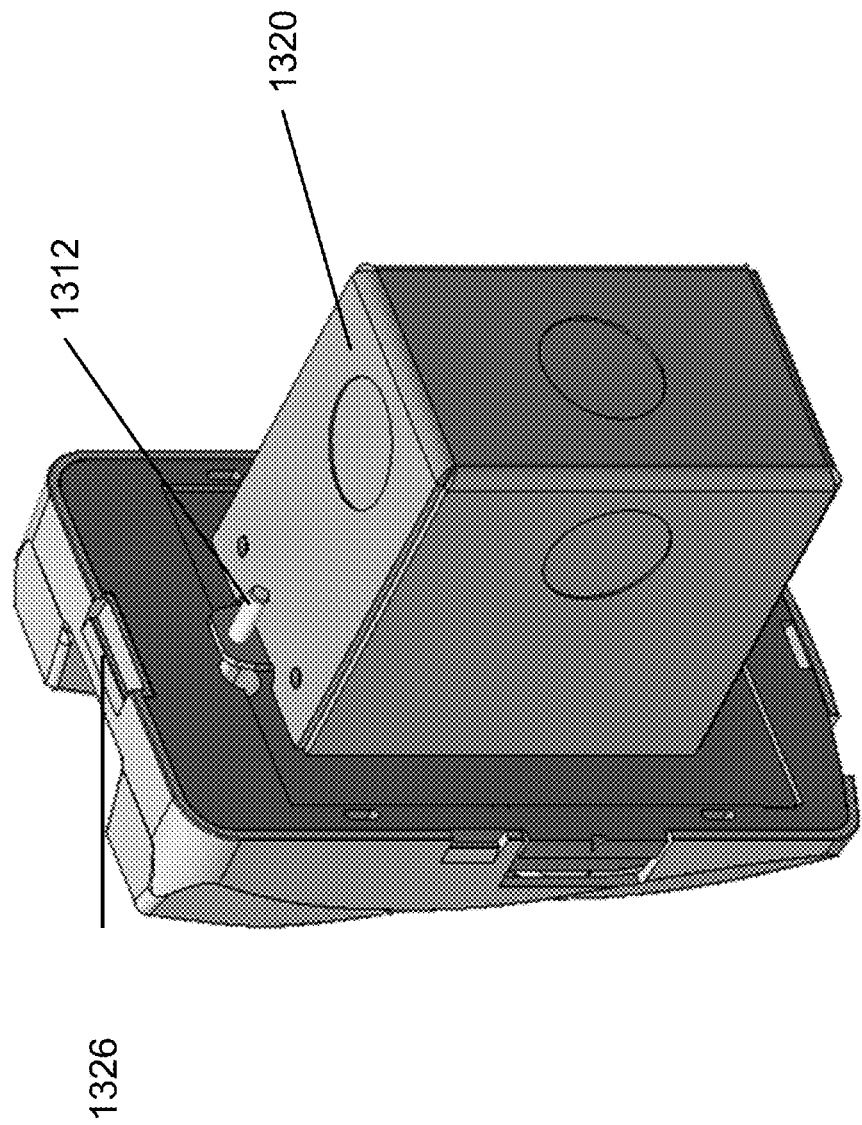

As discussed above, escutcheon (such as escutcheon 1020) may be connected to front housing 610 via one or more tabs, such as tab 1316 shown in FIG. 13B.

FIGS. 13B-E illustrating the side view, the back view, the front perspective view, and the back perspective view of FIG. 13A. The notification appliance 1300 is connected to junction box 1320. Junction box 1320 is a different type of junction box than junction box 1220 illustrated in FIGS. 12A-B.

In practice, the keyholes 1308, 1310 enable the screws 1312, 1314 to be inserted or screwed at least partly into the screw receptacles of junction box 1320 prior to the notification appliance 1300 being affixed to the junction box 1320. More specifically, junction box 1320 may include wires for connection to a part of the notification appliance 1300, such as to the terminal block of the notification appliance. After the wires from the junction box 1320 are connected to the notification appliance 1300, the notification appliance 1300 is connected to the junction box 1320. In one embodiment, the notification appliance 1300 includes back cover 616, main PCB 614, front housing 610, LED PCB 608, and optic 604. In this regard, after inserting screws 1312, 1314 into the junction box, the major portions of the notification appliance (including back cover 616, main PCB 614, front housing 610, LED PCB 608, and optic 604) may be threaded through screws 1312, 1314 via holes 1308, 1310. In this instance, the mounting of the notification appliance may be made easier since the screws are already at least partially installed into the junction box before pressing the notification appliance onto the junction box for mounting. Further, since the entire assembled unit (e.g., all of the parts of the notification appliance 1300 except for the escutcheon) may be threaded through the already mounted screws 1312, 1314, installation of the notification appliance is made easier. More specifically, because the screws 1312, 1314 are already partly screwed into the screw receptacles of junction box 1320, the notification appliance 1300 may be maneuvered using keyholes 1308, 1310 so that the notification appliance 1300 is connected to the junction box 1320. Thereafter, the screws 1312, 1314 may be tightened so that notification appliance 1300 is securely fastened to the junction box 1320. In one embodiment, the screws 1312, 1314 are affixed only partly (and not wholly screwed into) receptacles of the junction box 1320 prior to the wires emanating from the junction box 1320 are attached to the terminal block of the notification appliance 1300. In an alternate embodiment, the screws 1312, 1314 are affixed only partly (and not wholly screwed into) receptacles of the junction box 1320 after the wires emanating from the junction box 1320 are attached to the terminal block of the notification appliance 1300.

This process of partly screwing the screws 1312, 1314 (and then threading the screws 1312, 1314 through holes 1308, 1310 of the notification appliance) is in contrast to positioning the notification appliance 1300 adjacent to the junction box 1320 (and lining holes 1308, 1310 with screw receptacles of the junction box 1320, and inserting screws 1312, 1314 through holes 1308, 1310 into the screw receptacles of the junction box 1320). In the latter case, it may be difficult to line up holes 1308, 1310 with screw receptacles of the junction box 1320 and thread screws through the lined-up holes 1308, 1310 and screw receptacles of the junction box 1320.

Figure 13F:
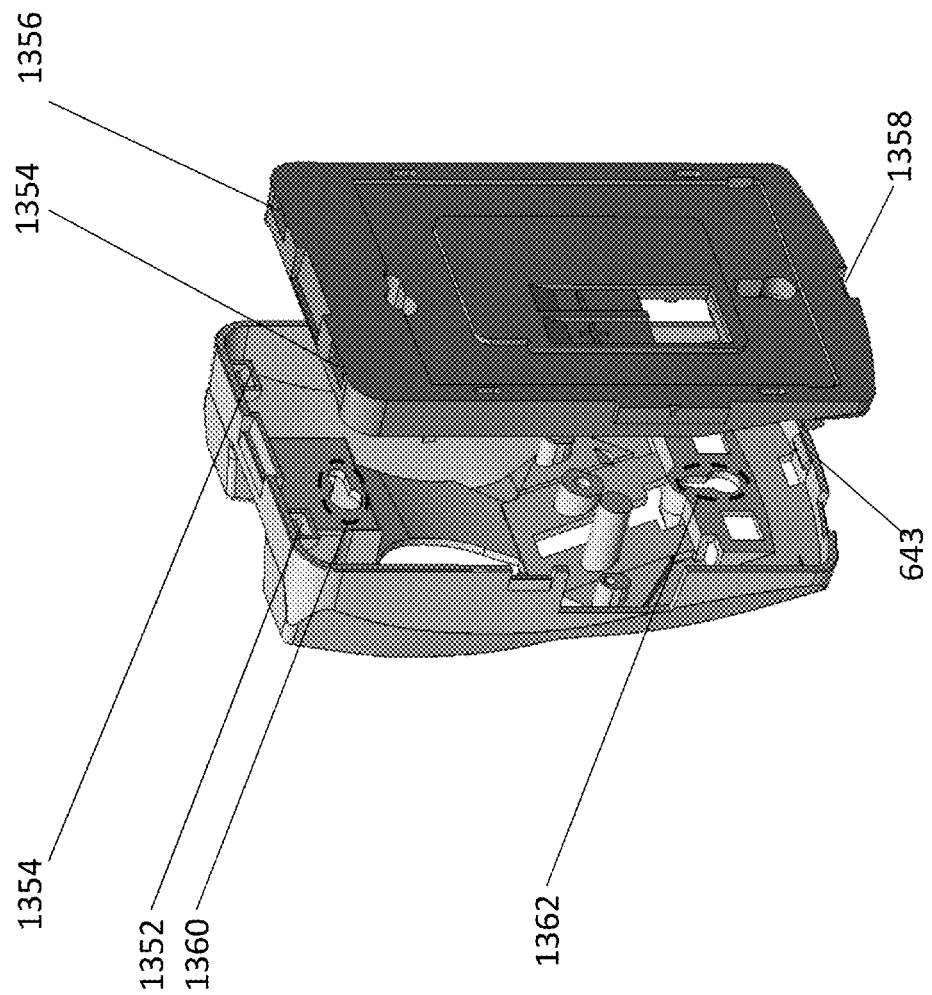
FIG. 13F illustrates the connection of the front housing 610 to the back cover 616.

FIG. 13F illustrates the connection of the front housing 610 to the back cover 616. Front housing 610 includes two features 1350, 1352, such as protrusions, and back cover 616 includes two recesses 1354, 1356. In connecting the front housing 610 to back cover 616, the two features 1350, 1352 of front housing 610 are dropped down into recesses 1354, 1356 of back cover 616 when the front housing 610 is at an angle to back cover 616. Then, front cover 610 is swung toward back cover 616 until the bottom latch 643 of front housing 610 engages the cutout 1358 in back cover 616.

Figure 14B:
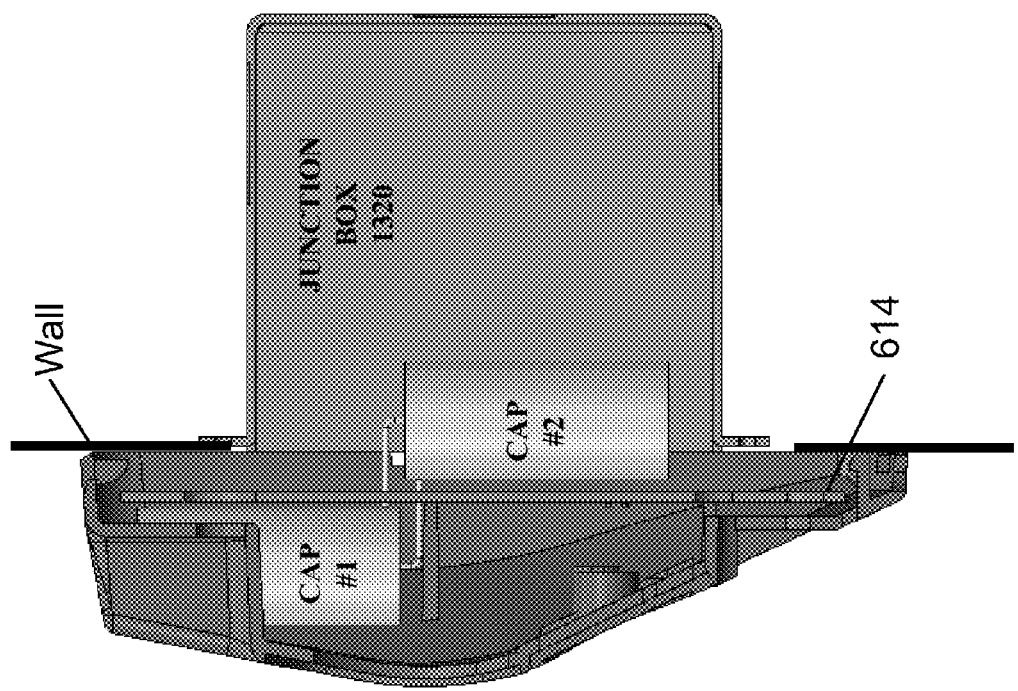
FIG. 14B illustrates the notification device being connected to junction box.

FIG. 14A illustrates a side view of the LED PCB 608. FIG. 14B illustrates the notification device being connected to junction box 1320 (either directly or using adapter bracket 1200). As discussed above, in one embodiment, multiple LEDs are used in the notification device (such as 2 LEDs, 4 LEDs, etc.). In order to drive the multiple LEDs, an extra energy storage device (such as an extra capacitor) may be used. For example, FIG. 14A shows LED PCB 608 including multiple energy storage devices, illustrated as Capacitor #1 (Cap #1) and Capacitor #2 (Cap #2).

In one embodiment, Capacitor #1 and Capacitor #2 may have the same capacitance and be in parallel, thereby doubling the capacitance. Alternatively, the capacitors may have different capacitance and/or may be in a series configuration. In operation, the notification device will flash the LEDs for a predetermined period (such as 20 mSec) every 1 second or every 2 seconds. The capacitors provide the current to the LEDs for the LEDs to produce the flash.

In order to stay in the same footprint, at least a part of the electronics of the notification device, upon attachment to the junction box 1320, is within the junction box or resides in an interior of the junction box 1320. For example, the additional capacitor may be positioned on the LED PCB 608 such that upon installation of the notification appliance, at least a part of the energy storage device is within the junction box 1320. In one embodiment, to stay in the same footprint, Capacitor #1 is installed on one side of LED PCB 608 and Capacitor #2 is installed on an opposite side of LED PCB 608, such as illustrated in FIGS. 14A-B. In this regard, upon installation of the notification device, at least a part of the electronics of the notification device, such as the energy storage device, is at least partly within the junction box 1320. Alternatively, both capacitors may be installed on an underside of the LED PCB 608 such that, upon installation of the notification appliance, both capacitors at least partly are within the junction box 1320. In still an alternative embodiment, the capacitor may reside entirely within junction box 1320 upon installation of the notification device.

Figure 15A:
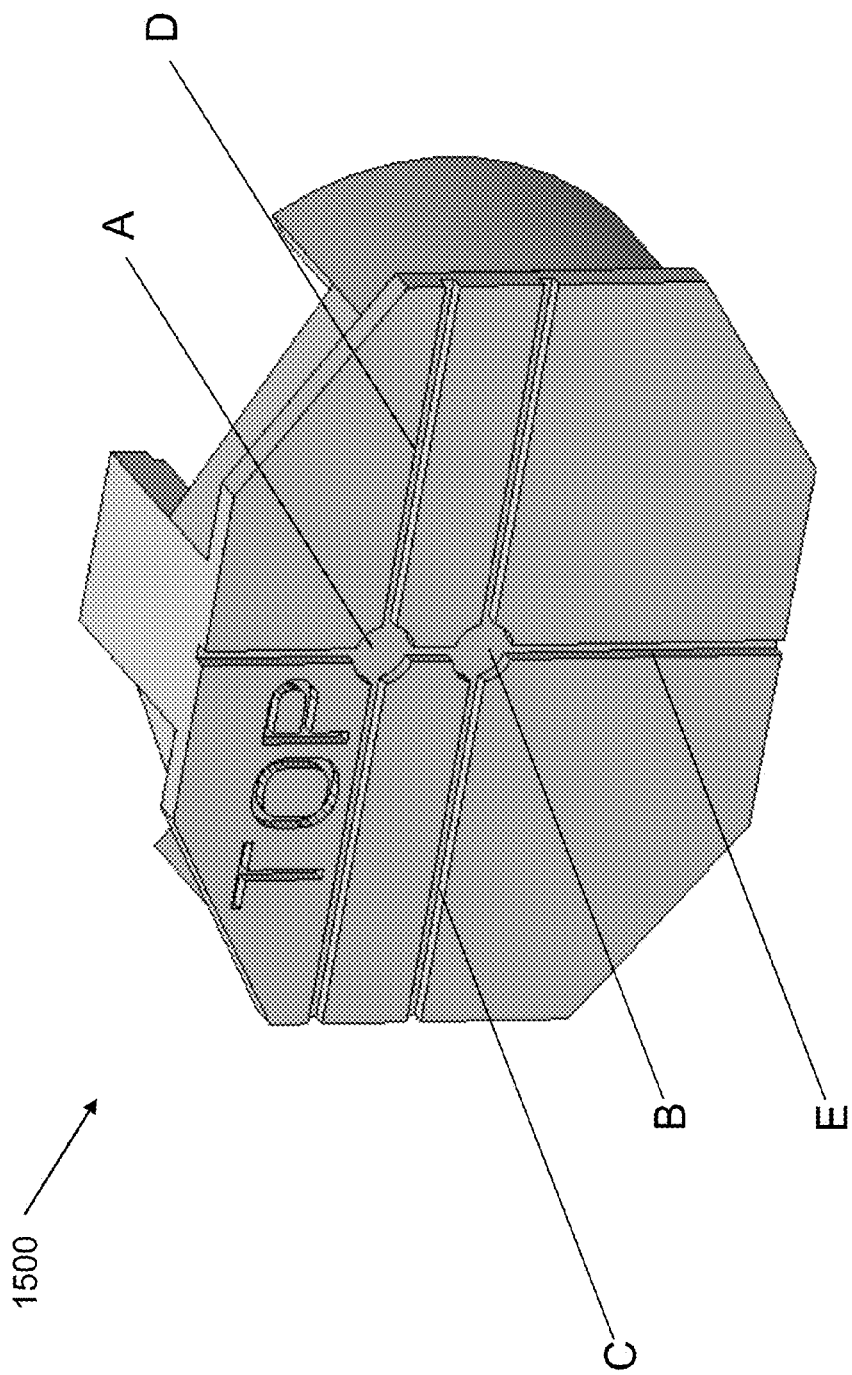
FIG. 15A illustrates a front perspective view of optical alignment tool.
Figure 15B:
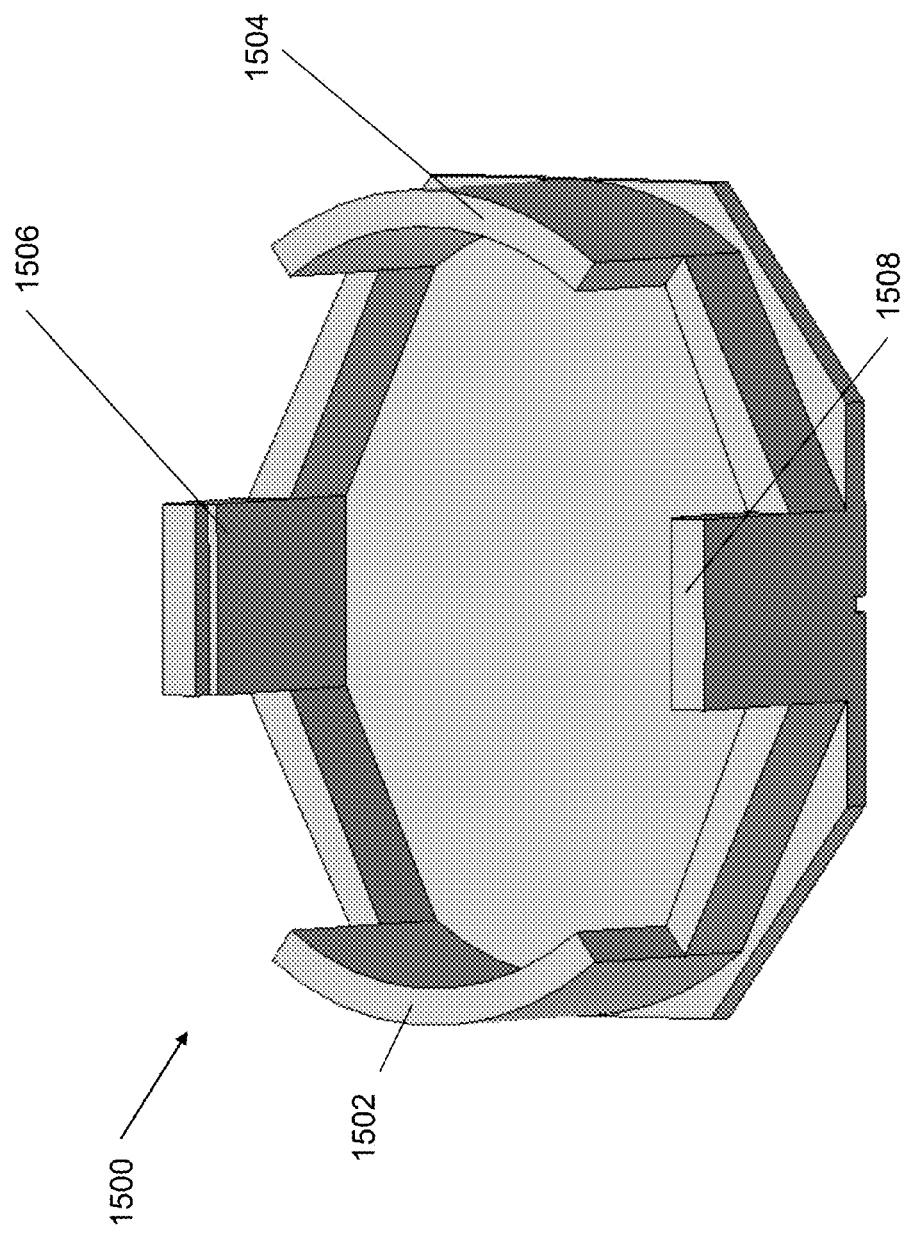
FIG. 15B illustrates a bottom perspective view of optical alignment tool.
Figure 15C:
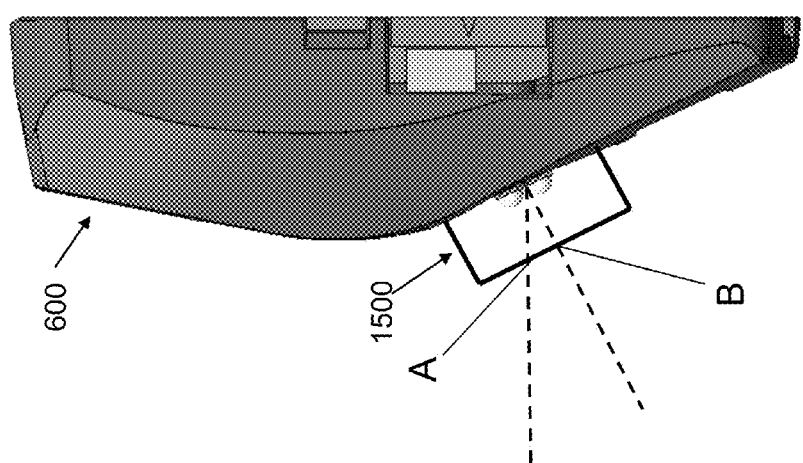
FIG. 15C illustrates optical alignment tool as installed in the notification device illustrated in FIG. 6A.

There are instances where it is desirable to test the light output of the notification device. For example, certain standards, such as UL, dictate the light output at certain angles from the LED PCB, such as 0°. However, it may be difficult to determine where the certain angles are. In order to assist in the determination, an optical alignment tool 1500 may be used. FIG. 15A illustrates a front perspective view of optical alignment tool 1500. FIG. 15B illustrates a bottom perspective view of optical alignment tool 1500. FIG. 15C illustrates optical alignment tool 1500 as installed in notification device 600.

Optical alignment tool 1500 includes one or more legs that are configured to connect or snap onto a part of notification device 600. FIG. 15B illustrates four legs 1502, 1504, 1506, 1508. Alternatively, fewer or greater number of legs may be used. As illustrated in FIG. 15B, optical alignment tool 1500 includes two pairs of opposing legs, with 1502 and 1504 being curved, and with 1506 and 1508 being straight.

Front face of optical alignment tool 1500, illustrated in FIG. 15A, include one or more indicia to indicate different angles or points respective to the LED(s) in notification device 600. For example, line "E" is indicative of the vertical centerline of the LED(s). Line "C" is indicative of the horizontal centerline of the LED(s). Line "D" is indicative of a line that is in the same horizontal plane as the LED(s) when installed at an angle. Point "A" is the intersection of line "D" and line "E". Point "B" is the intersection of line "C" and line "E". Thus, using the optic alignment tool 1500 enables easier determination as to various points of potential measurement with respect to the LED(s). The various lines and points illustrated on front face of optical alignment tool are merely for illustration purposes only. The specific lines and points of interest depend on the LED(s) on the LED PCB and also on the angle of installation of the LED PCB.

In one embodiment, it may be advantageous to change the color of the light output from the notification device. For example, the color of the light output may indicate different types of notification. More specifically, a white light output may indicate a fire emergency, whereas an amber light output may indicate an intruder on the premises (or a similar type of mass notification). Rather than have two separate notification devices that output a predetermined and non-changeable frequency range of light (e.g., a first notification device that outputs white light and a second notification device that outputs amber light), the notification device may be configured to dynamically change the frequency range of the light output.

The notification device may be configured to dynamically change the frequency range of the light output in one of several ways. In one embodiment, the change of frequency range may be achieved by mechanically changing optics (e.g., mechanically positioning an optic of amber color on top of the LED(s)). In a second embodiment, the change of the frequency range may be achieved by electrically changing optics (e.g., changing the color of the optic by sending a current through the optic).

Figure 16A:
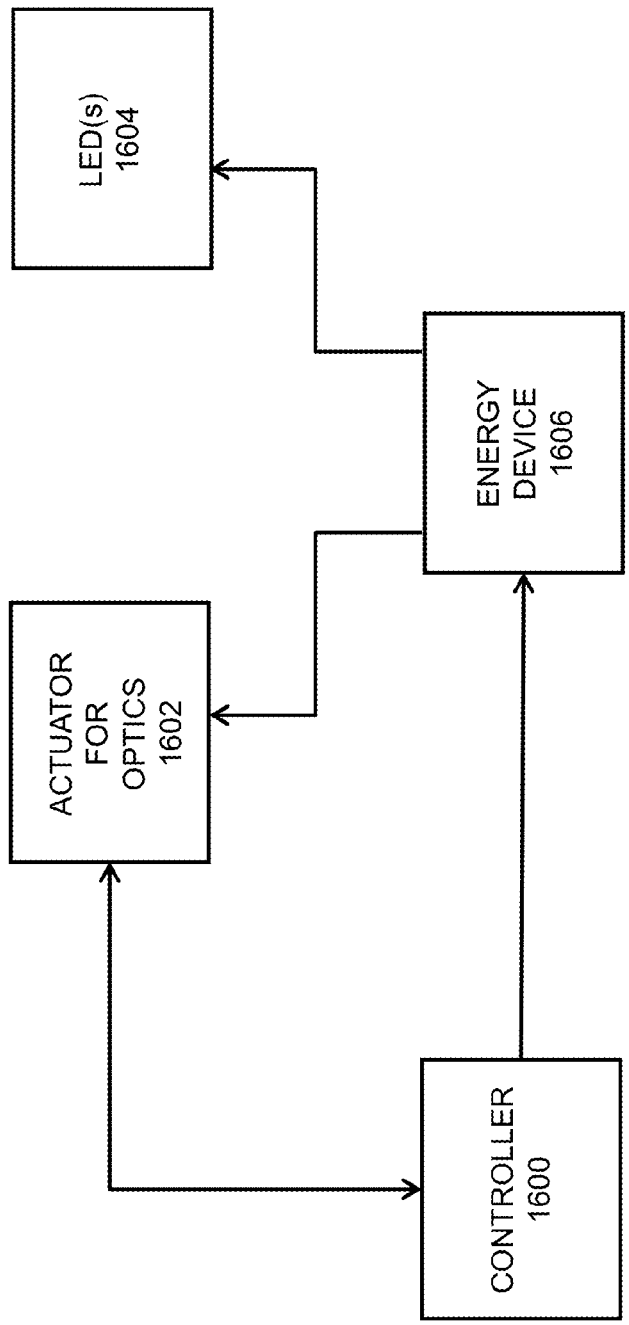
FIG. 16A illustrates a block diagram configured to dynamically change the frequency range of the light output by mechanically changing optics.
Figure 16B:
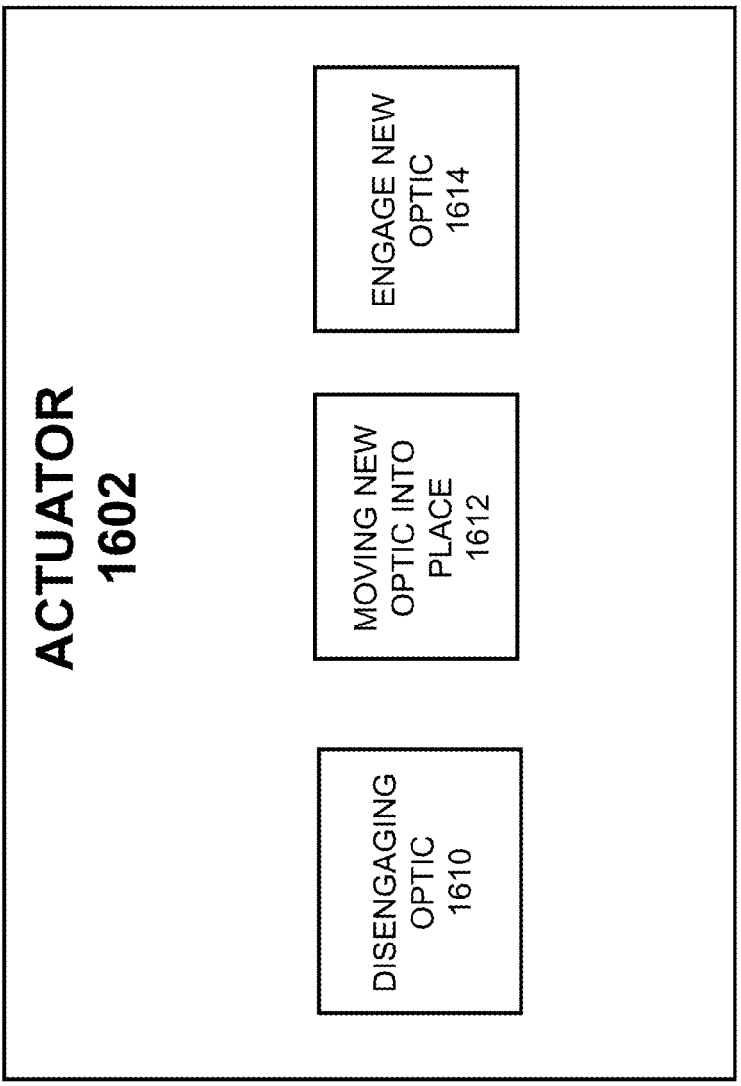
FIG. 16B illustrates an expanded block diagram of actuator for optics illustrated in FIG. 16A.

FIG. 16A illustrates a block diagram configured to dynamically change the frequency range of the light output by mechanically changing optics. Controller 1600 is configured to send a command to energy device 1606 in order for energy device to power either actuator for optics 1602 and/or LED(s) 1604. FIG. 16B illustrates an expanded block diagram of actuator for optics 1602. Energy device 1606 may comprise capacitor(s), or the like. As illustrated in FIG. 16A, energy device 1606 may power both actuator for optics 1602 and LED(s).

The controller 1600 may receive a command, such as from a fire alarm control panel, from a switch on the notification device, and/or from an operator controlled wireless handheld proximate to the notification device. The command may indicate a particular wavelength band. In response to receiving the command, the controller may command the actuator 1602 to effect the command.

The notification device may include a plurality of optics, such as a clear optic, an amber optic, and a blue optic. The plurality of optics may be positioned on a movable wheel, whereby a selected optic may be pressed into contact with LED PCB 608. As illustrated, for example, in FIGS. 6E-F, the LEDs may be proximate to the optic. In this regard, when mechanically moving the optic, one may first disengage the optic, such as by moving the optic in a direction perpendicular to the plane formed by the LED PCB 608. In this regard, when it is desired for another optic to be pressed into contact with LED PCB 608, functionality for disengaging the optic 1610 may be used to disengage the current optic from contact with LED PCB 608. Thereafter, functionality for moving new optic into pace 1612, which may comprise a cam or a solenoid, may move the movable wheel (either clockwise or counter-clockwise) until the desired optic is positioned over LED PCB 608. Finally, functionality for engaging the new optic 1614 may then press the desired optic into contact with LED PCB 608 to engage the desired optic with LED PCB 608.

As discussed above the notification device may include an escutcheon, which may sit on top of front housing 610, may likewise move. Thus, when moving the optic, at least a part of the escutcheon may move as well. For example, the escutcheon may include a flap, which may be moved upward (e.g., in the direction perpendicular to and away from the plane formed by the LED PCB 608). The new optic may be moved into position, and then engaged. Similar, upon engaging the new optic, the flap of the escutcheon may likewise move back into place (e.g., in the direction perpendicular to and toward the plane formed by the LED PCB 608).

Figure 16C:
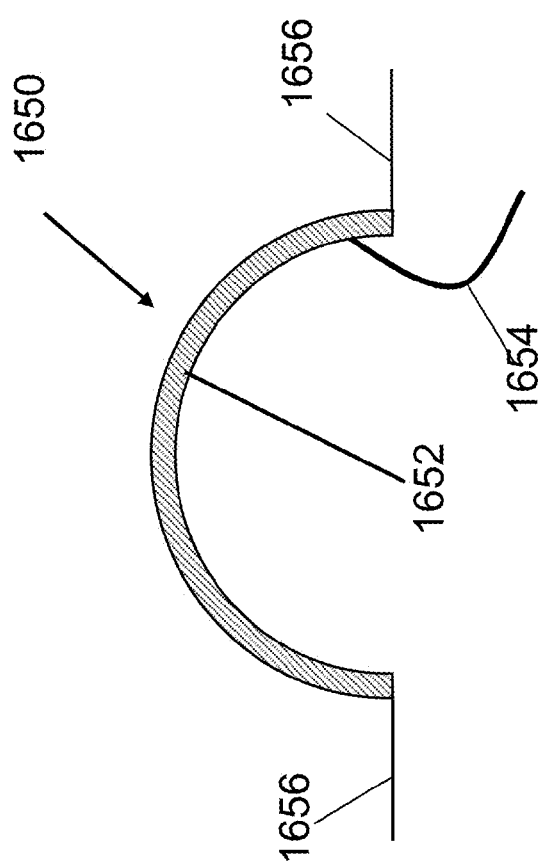
FIG. 16C illustrates using an electrically alterable lens in order to configure the strobe to operate at one of the first wavelength band or the second wavelength band.
Figure 16D:
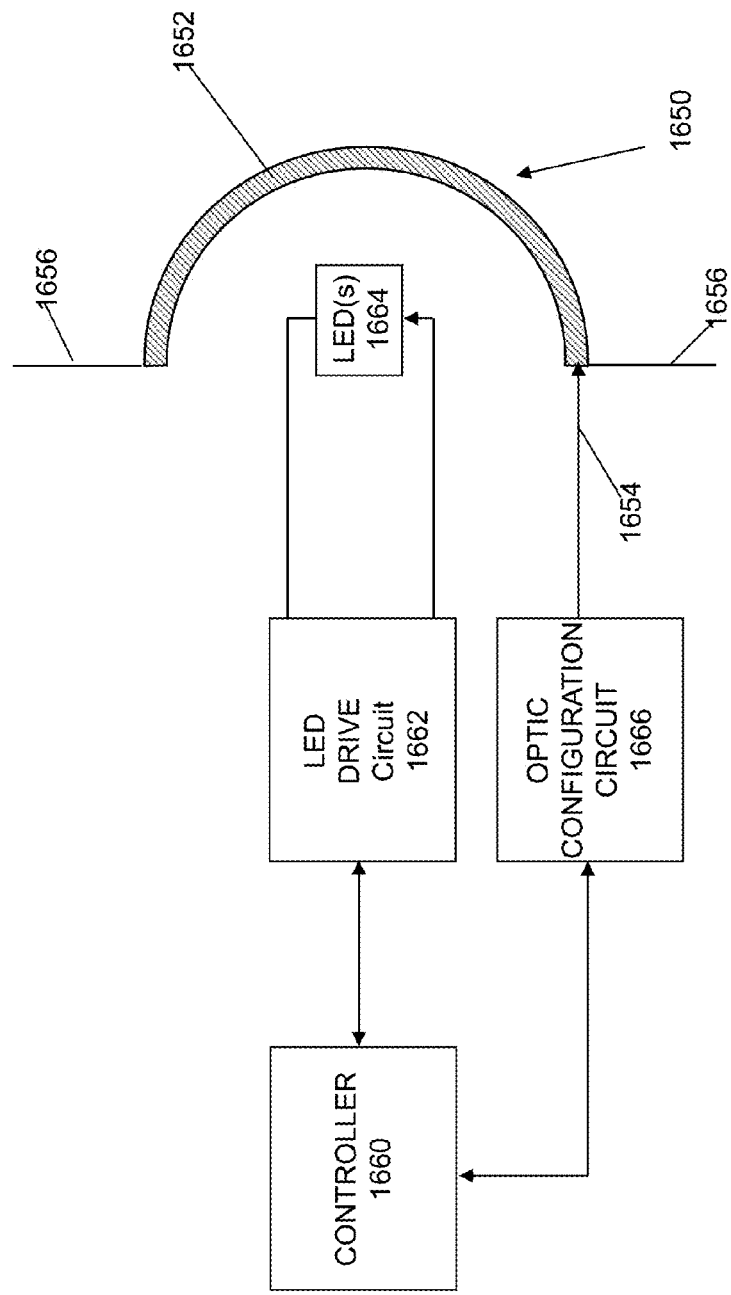
FIG. 16D illustrates the notification device using the electrically alterable optic depicted in FIG. 16C in order to configure the notification device to operate at one of the first wavelength band or the second wavelength band.

As discussed above, another manner in which to change the color of the light output is by modifying the color of the optic electrically. FIG. 16C illustrates using an electrically alterable lens in order to configure the strobe to operate at one of the first wavelength band or the second wavelength band. FIG. 16D illustrates the notification device using the electrically alterable optic depicted in FIG. 16C in order to configure the notification device to operate at one of the first wavelength band or the second wavelength band.

Optic 1650 may include an electrically alterable layer 1652. For example, the optic 1650 may comprise a liquid layer (such as 1652) sandwiched between two layers of glass or other suitable material. Alternatively, a film (instead of a liquid layer) may be used, comprising a treated material applied to the film or a chemical layer between two films. The color of the optic 1650 may be controlled via a control wire 1654 attached to the layer. For example, the electrically alterable layer 1652 may be heated using control wire 1654, causing a molecular change in the liquid, and thereby allowing different light wave lengths to pass and to be blocked. Alternatively the color of the optic could be altered by a current flowing through the film layer via control wire 1654, causing a molecular change in the film allowing different light wavelengths to pass and to be blocked. Thus, the control wire 1654 may cause tinting or shading of the optic 1650.

As discussed above, the command may indicate a particular wavelength band. The controller 1660 may send a signal to an optic configuration circuit 1666 indicating the wavelength band or color for the optic 1650. Based on the signal from the controller 1660, the optic configuration circuit 1666 may generate a control signal and send it on the control wire 1654. The control wire 1654 may then be used to change the color of the optic 1650 from clear to amber or amber to clear. Though amber and clear colors are described, other colors may be used as well. Further, as shown in FIG. 16D, the notification appliance may only consist of one or multiple LEDs 1664 and a single LED drive circuit 1662 to drive the one or multiple LEDs 1664. Thus, the electronics necessary for the notification device are less than a traditional strobe that requires multiple LEDs and multiple LED drive circuits to output light at different wavelengths.

The command to configure the strobe lens may be received at the notification device along with the command to activate the notification device. In that instance, the controller 1660 may first configure the optic 1650, and then immediately thereafter activate the notification device (such as by sending a command to the LED drive circuit 1662, which in turn, activates the one or multiple LEDs. Or, the command to configure the optic may be received at the notification device before the command to activate the notification device. In that instance, the command to configure the optic 1650 may be implemented immediately upon receipt at the notification device. Or, the command may be stored and implemented thereafter (such as when a subsequent command to activate the notification device is received). For example, a control signal may be sent (such as in a broadcast to multiple notification devices that are non-addressable) in which the control signal is a predetermined pattern indicative of the wavelength band for output on the multiple notification devices.

In notification device that are addressable, this process of changing the color of the optic 1650 may be initiated via communications from the fire alarm control panel 14. In a non-addressable strobe device, this process of changing the color of the optic 1650 may be initiated via an additional wire from the control panel.

As discussed above, the notification device may be installed in a variety of environments and in a variety of ways. For example, the notification device may be installed on a wall, such as illustrated in FIG. 14B. As another example, the notification device may be installed on a ceiling. FIG. 17A illustrates an exploded view of one example of a notification device 1700 configured for ceiling mount. The notification device 1700 includes a cover 1702, optic 1704, LED PCB 1706, housing 1708, speaker 1710, driver board 1712, insulator 1718, and transformer board 1722. Cover 1702 may be attached to the notification appliance via connection with housing 1708. For example, housing 1708 may include protrusion(s) 1724 that mate with an underside of cover 1702. In one embodiment, there are a plurality of protrusions 1724, such as at 12:00, 3:00, 6:00 and 9:00. One type of mating comprises a snap-fit, whereby protrusion(s) comprise a small lip for hole(s) in cover 1702 to engage. Using a snap-fit allows for attachment without the use of screws, making attachment easier (no tools are required) and less obtrusive.

Figure 17B:
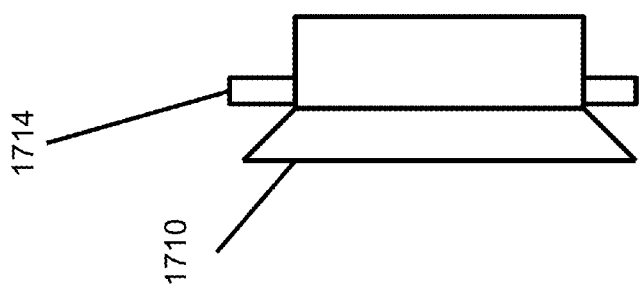
FIG. 17B illustrates a side view of the speaker and the driver board installed in the notification device of FIG. 17A.

FIG. 17A illustrates that the substrate 1714 of the driver board 1712 is crescent moon shaped. In this regard, the driver board 1712 is configured such that, when the speaker 1710 and driver board 1712 are installed in the notification device 1700 (illustrated in FIG. 17B), the speaker 1710 breaks the plane defined by the substrate 1714 of the driver board 1712. Further, because the speaker 1710 is installed off-center from the housing (see FIG. 18A), the driver board 1712 may be installed. In one embodiment, the speaker 1710 is installed to one side of the housing, and the driver board 1712 may be installed to another side of the housing (e.g., the center of the speaker 1710 may be off-center of the housing on one side and the center of the driver board may be off-center on an opposite side). In an alternate embodiment, the speaker 1710 is installed to one side of the housing, and the driver board 1712 may be installed such that the driver board 1712 is centered in the housing. Thus, at least a part of the driver board 1712 is around at least a part of the speaker (e.g., the substrate 1714 at least partly encircles a part of the speaker). This allows for a more compact assembly of the notification device 1700, and thereby a smaller depth notification device. Further, the speaker 1710 may be offset (such as discussed below with respect to FIGS. 21A-B), thereby allowing the driver board to be positioned in a larger area around the speaker 1710.

The electronics may be arranged on the substrate 1714 of the driver board 1712 such that the speaker 1710 can break the plane defined by the driver board 1712. For example, capacitor(s) 1716 may be arranged on an underside (relative to the speaker 1710) of the substrate 1714. When installed, parts of the driver board 1712 (such as the capacitor(s) 1716)

and at least a part of the speaker 1710 may sit within a cavity 1720 of insulator 1718. Insulator 1718 may be configured to insulate various parts of the notification device, such as the capacitor(s) 1716 and the magnet within speaker 1710 from the electrical junction box. For example, FIG. 17A shows capacitor(s) 1716 are stood up on the underside of the substrate 1714. The insulator 1718 may be molded such that the capacitors may sit within insulator 1718. In this regard, the insulator creates an electrical barrier between electrical components installed on the driver board 1712 from wiring in the junction box. More specifically, insulator 1718 may keep transformer board 1722 and part or all of driver board 1712 (such as capacitors 1716) conductively separate. In one embodiment, when installed within the electrical junction box, at least a part of the capacitor(s) 1716 may be contained within the electrical junction box, such as illustrated in FIG. 14B.

Figure 17C:
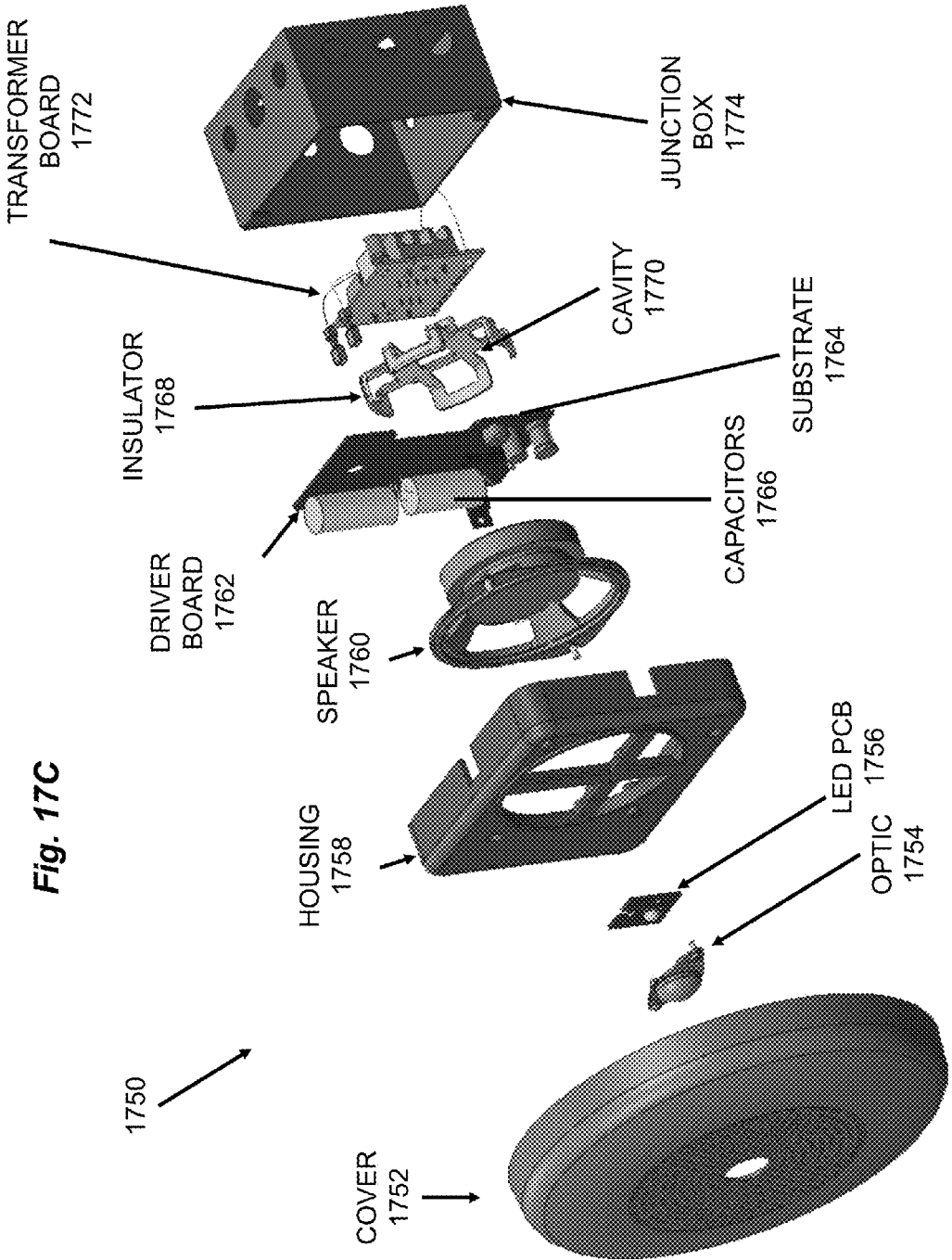
FIG. 17C illustrates an exploded view of another example of a notification device configured for ceiling mount.

FIG. 17C illustrates an exploded view of another example of a notification device 1750 configured for ceiling mount. The notification device 1750 includes a cover 1752, optic 1754, LED PCB 1756, housing 1758, speaker 1760, driver board 1762, insulator 1768, transformer board 1772, and junction box 1774.

The substrate 1764 of the driver board 1762 is rectangular shaped with a small cutout. In this regard, the driver board 1762 is configured such that, when the speaker 1760 and driver board 1762 are installed in the notification device 1750, the speaker 1760 breaks the plane defined by the substrate 1764 of the driver board 1762.

FIG. 17C illustrates an arrangement of the electronics on the substrate 1764 of the driver board 1762 slightly different from the arrangement illustrated in FIG. 17A. The capacitor(s) 1766 may be arranged on a topside (relative to the speaker 1760) of the substrate 1764. When installed, a part of the speaker 1710 (but not a part of the driver board 1762) may sit within a cavity 1770 of insulator 1768.

Transformer board 1772 may include on a backside (the side that faces the junction box) one or more switches to configure the notification appliance. The switches may be used to configure part or all of the notification appliance. For example, in a notification appliance that includes a speaker, such as illustrated in FIG. 17C, the speaker settings may be programmed using the switch(es) on the backside of transformer board 1772.

FIG. 18A illustrates a front view of the notification device with the cover 1702 removed. As discussed above, the notification device may include one or more input devices. FIG. 18A illustrates multiple input devices 1802 (dip switch input configured to set an address), 1804 (candela switch configured to input the candela setting). The housing device of the notification device allows for easy access to the various input devices 1802, 1804. FIG. 18B illustrates a part of the notification device with the front cover 1702. A hole in the front cover 1702, 1752 enables viewing of the candela setting on input device 1804.

The housing 1708 may be modeled such that a part of the housing includes one or more light pipes. FIG. 19A illustrates front view of the housing 1708 of the notification device 1700. FIG. 19B illustrates an expanded view of a portion of FIG. 19A, including light pipe 1904, which may be a part of the housing. In one embodiment, the housing 1708 may be a single molded piece that include the light pipe 1904. For example, the housing 1708 may be partly or completely composed of clear plastic to act as a light pipe 1904 in designated areas. In this regard, the light pipe 1904 may provide at least some structural support to the housing 1708. The light pipe 1904 may be configured to transmit light from LED PCB 1706 and optic 1704 to a light sensor (not shown) on the driver board 1712.

FIG. 20A illustrates a back view of the housing 1708 of the notification device 1700. FIG. 20B illustrates an expanded view of a portion of FIG. 20A, including light pipe 2002, which, similar to light pipe 1904, may be a part of the housing. The light pipe 2002 may transmit light from a communications LED (e.g., an LED indicator) on the driver board 1712, through the cover 1702, to a person inspecting the notification device 1700.

Figure 21A:
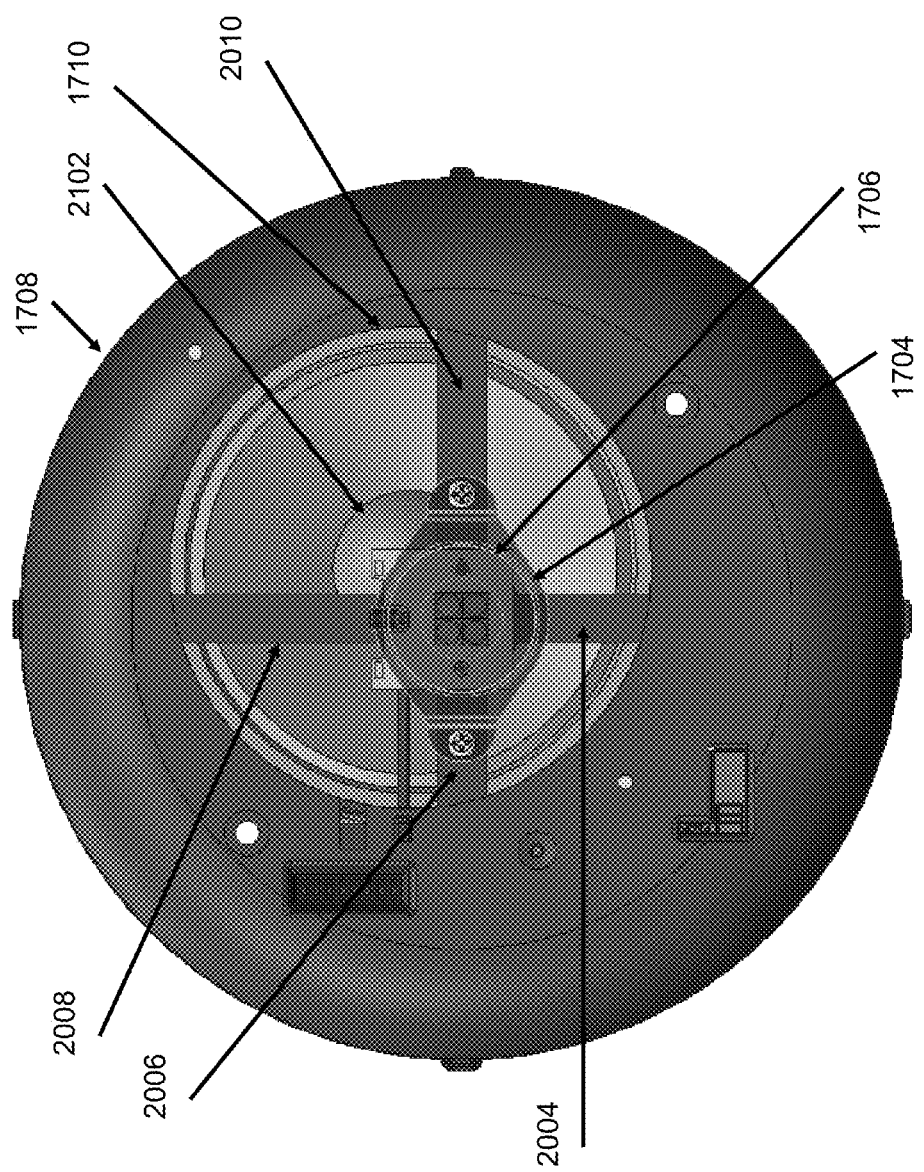
FIG. 21A illustrates a front view of the housing and the speaker of the notification device in FIG. 17A.

FIG. 21A illustrates a front view of the housing 1708 and the speaker 1710 of the notification device 1700. The housing may include one or more support elements. FIGS. 20B and 21A illustrate a plurality of support elements, such as 2004, 2006, 2008, 2010, 2012. The speaker 1710 is mounted behind the housing 1708. In this regard, the output from the speaker 1710 is at least partly blocked by the various parts within the notification device 1700, such as parts of the housing (e.g., 2004, 2006, 2008, 2010, 2012), the optic 1704, and the LED PCB 1706. In order to reduce blocking the output from the speaker 1710, the speaker 1710 is positioned within the notification device 1700 to be off-center. As shown in FIG. 21A, speaker 1710 includes a center portion 2102. The center portion 2102 typically is the position where the voice coil of the speaker resides. In this regard, the center portion 2102 is typically the part that generates the most audio output. Offsetting the positioning of the speaker 1710 reduces blockage of the center portion 2102 from different parts of the notification device 1700, thereby increasing the effective output of the speaker 1710.

Figure 21B:
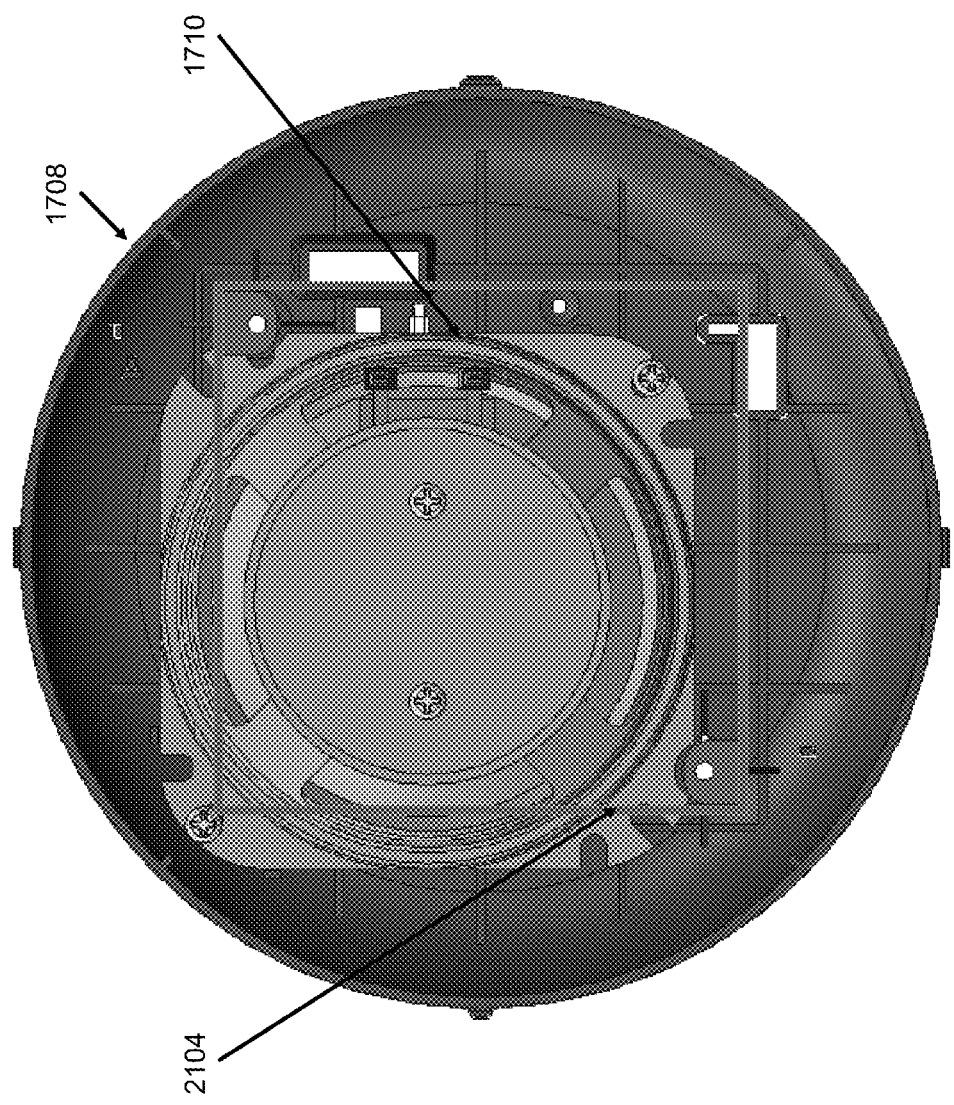
FIG. 21B illustrates a back view of the electrical junction box and the notification appliance of FIG. 17A, including the housing and the speaker of the notification device.

FIG. 21B illustrates a back view of the electrical junction box 2104 and the notification appliance 1700, including the housing 1708 and the speaker 1710 of the notification device 1700. The positioning of the speaker 1710 within the notification appliance enables improvement of use of the interior space within the electrical junction box 2104. As discussed above, various parts of the notification appliance 1700 may be contained within the electrical junction box 2104, such as part of the driver board 1712 (e.g., at least a part of capacitor(s) 1716) and/or at least a part of speaker 1710 (e.g., the back part of the speaker 1710 that includes the magnet). Using the configuration as illustrated in FIGS. 17A-B and 21A-B enables a more efficient placement of different parts of the notification device into the volume within the electrical junction box 2104.

Figure 22:
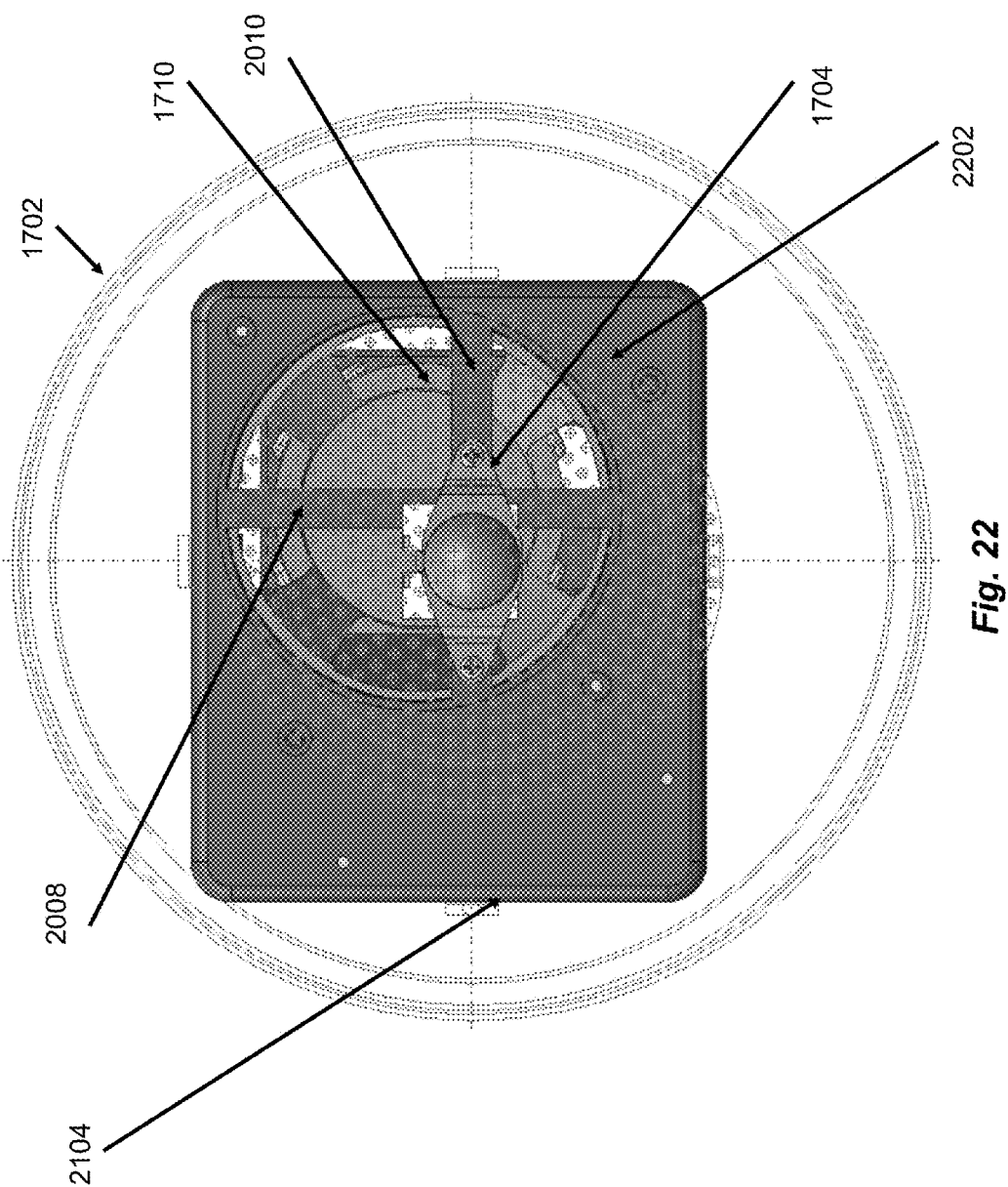
FIG. 22 illustrates the notification device of FIG. 17A with the cover attached and installed within the electrical junction box.

FIG. 22 illustrates the notification device 1700 with the cover 1702 attached and installed within the electrical junction box 2104. The cover 1702 includes holes 2202 which may be dispersed symmetrically around the cover 2104. As shown, the speaker 1710 is positioned off center. In this regard, the position of the speaker 1710 is asymmetrical with respect to the cover 2104 and with respect to the holes 2202 in the cover 2104.

The ceiling mounted notification appliance may likewise be weatherproofed in one of several ways. In one way, the optic Similar to the wall-mounted notification appliance (See FIGS. 10C-D), the ceiling mounted notification appliance may include a seal (such as gasket 1022) between the optic and the escutcheon.

While the invention has been described with reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A notification appliance comprising:
   one or more strobe LEDs;
   one or more communication lights mounted on a circuit board;
   a sensor mounted on the circuit board;
   an optic mounted proximate to the one or more strobe LEDs, the optic comprising:
      a shaped inner surface;
      a shaped outer surface;
   a light pipe comprising a shaft through which light is channeled, the shaft comprising an axis, the one or more communication lights positioned between the circuit board and the shaft, the sensor positioned off the axis of the shaft;
   a controller in communication with the one or more strobe LEDs and the sensor, the controller configured to control the one or more strobe LEDs in order to strobe light output generated by the one or more strobe LEDs and to control the one or more communication lights,
   wherein the sensor is positioned relative to the optic in order to sense light generated by the one or more strobe LEDs or exterior ambient light traversing the optic and channeled via the light pipe to the sensor, and
   wherein the light pipe is configured to channel light generated by the one or more communication lights to the optic in order to output the light via the optic.

2. The notification appliance of claim 1,
   wherein the light pipe is mounted flush with the circuit board.

3. The notification appliance of claim 1, further comprising a front housing; and
   wherein the light pipe includes a collar, the collar shaped to mate with a part of the front housing of the notification appliance.

4. The notification appliance of claim 3, wherein the collar includes one or more sides which mate with a hole on the front housing.

5. The notification appliance of claim 1, wherein the one or more communication lights comprises one or more communication LEDs.

6. The notification appliance of claim 1, wherein the light pipe is configured to channel light generated by the one or more strobe LEDs, reflected by the optic, in order to be sensed by the sensor.

7. The notification appliance of claim 1, wherein the light pipe is configured to channel ambient light traversing the optic in order to be sensed by the sensor.

8. The notification appliance of claim 1, further comprising a front housing comprising a slot; and
   wherein the light pipe is inserted into the slot of the front housing.

9. The notification appliance of claim 8, wherein the light pipe includes a collar; and
   wherein the collar mates with the slot of the front housing.

10. The notification appliance of claim 1, wherein the one or more communication lights are positioned on-axis of the shaft.

11. The notification appliance of claim 1, further comprising a LED printed circuit board, wherein the one or more strobe LEDs are mounted on the LED printed circuit board;
    wherein the LED printed circuit board defines a first plane
    wherein the circuit board defines a second plane;
    wherein the first plane defined the LED printed circuit board is not parallel to the second plane defined by the circuit board; and
    wherein one end of the shaft is parallel to the first plane.

12. The notification appliance of claim 11, wherein the shaft includes a first end and a second end;
    wherein the first end is closer to the one or more communication lights; and
    wherein the second end is parallel to the first plane.

13. The notification appliance of claim 1, wherein the light pipe includes an inset; and
    wherein the one or more communication lights are positioned at least partly within the inset.

* * * * *